United States Patent
Garland et al.

(10) Patent No.: US 6,289,502 B1
(45) Date of Patent: Sep. 11, 2001

(54) MODEL-BASED SOFTWARE DESIGN AND VALIDATION

(75) Inventors: Stephen J. Garland; Nancy A. Lynch, both of Brookline, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/052,396

(22) Filed: Mar. 30, 1998

Related U.S. Application Data

(63) Continuation-in-part of application No. 08/938,103, filed on Sep. 26, 1997, now abandoned.
(60) Provisional application No. 60/060,196, filed on Sep. 26, 1997.

(51) Int. Cl.[7] ....................................................... G06F 9/45
(52) U.S. Cl. ....................................................... 717/2; 717/1
(58) Field of Search .................................... 395/702, 701; 717/1, 2

(56) References Cited

U.S. PATENT DOCUMENTS

| | | | |
|---|---|---|---|
| 5,500,941 | * 3/1996 | Gil ............................................ | 714/38 |
| 5,754,760 | * 5/1998 | Warfield .................................. | 714/38 |
| 5,781,726 | * 7/1998 | Pereira .................................... | 709/200 |
| 5,799,193 | * 8/1998 | Sherman et al. ....................... | 395/703 |
| 5,828,869 | * 10/1998 | Johnson et al. ........................ | 713/501 |
| 5,831,853 | * 11/1998 | Bobrow et al. ........................ | 364/191 |
| 5,910,897 | * 6/1999 | Dangelo et al. ................... | 395/500.2 |
| 5,920,711 | * 7/1999 | Seawright et al. .................... | 395/500 |

OTHER PUBLICATIONS

Kukimoto. Introduction to Formal Verification. http://vlsi.colorado.edu/~vis/doc/VisUser/vis-user/node4.html, Feb. 1996.*

Sun et al. Program Developing System With Theorem Prover Embedded In. Journal of Shanghai Jiaotong University, vol. 32. No. 10, Abstract. Oct. 1998.*

Berry et al., "The Esterel synchronous programming language: Design, semantics, implementation", Manuscript.

Chandy et al., "Parallel Program Design: A Foundation", Addison–Wesley Publishing Co., Reading, MA, 1988, chapters 2 and 3.

(List continued on next page.)

*Primary Examiner*—Mark Powell
*Assistant Examiner*—Wei Zhen
(74) *Attorney, Agent, or Firm*—Fish & Richardson P.C.

(57) ABSTRACT

A new computer language, which is based on a formal, mathematical state-machine model, and which is used both to validate and to generate code for a distributed system, in general, enables developing a system using multiple related system specifications, for instance, using system specifications at multiple levels of abstraction or using multiple system decompositions into parallel combinations of interacting systems, and allows use of validation tools to verify properties of these systems and their relationships. The language includes constructs for specifying non-deterministic actions, and for specifying constraints on those non-deterministic choices. Several well-defined sub-languages of the full computer language are also defined. These sub-languages are used to specify the input of some tools, in particular, of some code generators. One method for developing a software implementation of a distributed system using the present invention includes accepting a design specification for the distributed system, and applying a validation procedure to the design specification to verify that the system has desired properties. This validation includes applying a theorem proving procedure to the design specification. The method also includes applying a code generating procedure to the specification to generate multiple software implementations for components of the distributed system.

29 Claims, 17 Drawing Sheets

OTHER PUBLICATIONS

Chenier, O., "Implementation and evaluation of an eventually–serializable data service", Master's thesis, Dept. of Electrical Engineering and Computer Science, MIT, Cambridge, MA, 1997.

Cleaveland et al., "The Concurrency Factory—practical tools for specification, simulation, verification, and implementation . . . ", Specification of Parallel Algorithms, DIMACS Workshop, pp. 75–89, 1994.

Engberg et al., "Mechanical verification of concurrent systems with TLA", Proceedings of the Fourth ICCAV, 663:44–55, 1992, Springer–Verlag, Proc. 4th Inter. Conference, CAV'92.

Goldman, Kenneth J., "Distributed Algorithm Simulation . . . ", Ph.D. thesis, Dept. of Electrical Engineering and Computer Science, 1990.

Goldman et al., "The Programmer's Playground: I/O abstraction fir user–configurable distributed applications", IEEE Transactions on Software Engineering 21:735–746, 1995.

Harel, David, "Statecharts: A Visual formalism for complex systems", Science of Computer Programming 8:231–374, 1987.

Holzmann, Gerald J., "Design and Validation of Computer Protocols", Prentice Hall Software Series, New Jersey, 1991.

INMOS Ltd: OCCAM 2 Reference Manual, Editor C.A.R. Hoare, Prentice Hall Series in Computer Science, 1988.

ISO/IEC 9074, Information Processing System—Open Systems Interconnection, Estelle—A Formal Description Technique based on . . . , 1989.

Karr, David J., "Specification, Composition, and Automated Verification of Layered Communication Protocols", Technical Report CORNELLCS:TR97–1623, Cornell Univ., Ithaca, NY, 1997.

Krietz, Christopher, "Formal Reasoning about Communication Systems . . . ", Technical Report CORNELLCS:TR97–1637, Cornell Univ., Ithaca, NY, 1997.

Lamport, Leslie, "The temporal logic of actions", ACM Transactions on Programming Languages and Systems, 16:872–923, 1994.

Luchangco et al., "Verifying timing properties of concurrent algorithms", Formal Description Techniques VII: Proceedings of the . . . , pp. 259–273, 1995.

Luchangco, Victor, "Using simulation techniques to provide timing properties", Master's thesis, Dept. of Electrical Engineering and Computer Science, MIT, Cambridge, MA, 1995.

Lynch et al., "Atomic Transactions", Morgan Kauffman Publishers, Inc, San Mateo, CA, 1994.

Lynch, Nancy, "Distributed Algorithms", Morgan Kauffman Publishers, Inc., San Mateo, CA, 1996, chapters 8 and 23.

Ostroff, Jonathan S., "A Visual toolset for the design of real–time discrete event system", IEEE Transactions on Control Systems Technology, vol. 5, 1997.

Petrov et al., "Computer–assisted verification on an algorithm for concurrent timestamps", Formal Description Techniques IX: Theory, Applications . . . , pp. 29–44, 1996.

Pnueli et al., "Tools and Algorithms for the Construction and Analysis of Systems", Lecture Notes in Computer Science, 1384:151–166, 1988.

Sogaard–Anderson et al., "Computer–assisted simulation proofs", Lecture Notes in Computer Science, 697:305–319, 1993.

Soylemez, Ekrem, "Automatic verification of the timing properties of MMT automata", Master's thesis, Dept. of Electrical Engineering and Computer Science, MIT, Cambridge, MA, 1994.

Staskaukas, M.G., "Formal derivation of concurrent programs: An example from industry", IEEE Transactions on Software Engineering 19:503–528, 1993.

Zohar Manna et al., "STeP: The Stanford Temporal Prover", Technical Report STAN–CS–TR–94–1518, Dept. of Computer Science, Stanford Univ., Stanford, CA, 1994.

Zohar Manna et al., "Temporal Verification of Reactive Systems: Safety", Springer–Verlag, New York, 1995, chapter 0.

* cited by examiner

MODEL-BASED SOFTWARE DESIGN AND VALIDATION

CROSS REFERENCE TO RELATED APPLICATIONS

This application is a continuation-in-part of U.S. Utility Application Ser. No. 08/938,103, filed on Sep. 26, 1997, now abandoned and also claims priority from U.S. Provisional Application Ser. No. 60/060,196, filed on Sep. 26, 1997. Utility Application 08/938,103 and Provisional Application 60/060,196 are incorporated herein by reference.

STATEMENT AS TO FEDERALLY SPONSORED RESEARCH

Funding for the work described herein was provided in part by the federal government, which may have certain rights in the invention.

BACKGROUND

The invention relates to software design and validation.

An important aspect of software development involves validating that an implementation of a design will function correctly and have desired operating properties. Over time, software systems have become increasingly complex and validation of these systems has become increasingly difficult. This is particularly true of distributed systems that are formed from multiple interacting and asynchronously operating components. Distributed systems include not only physically distributed architectures in which components execute on physically separated computers coupled by communication paths, for example, over data networks, but also include architectures in which multiple components execute on a single computer and are controlled as distinct tasks (e.g., processes or threads). In order to validate such software systems, ad hoc approaches to testing cannot in general be relied on due to the complexity of the overall system.

Formal specifications for abstracted designs of software systems have been used to validate properties of the abstracted designs. One approach to specifying such designs uses the formalism of Input/Output (I/O) Automata, as described in Chapter 8 of the textbook, *Distributed Algorithms*, by Nancy Lynch (Morgan Kaufmann Publishers, 1996, ISBN 1-55860-348-4), which is incorporated herein by reference. An I/O automaton is a labeled transition system model (i.e., a state machine with labeled state transitions) for one or more components of a system, and can be used to model components of an asynchronous concurrent system.

One method of validating properties of a system design, in particular of system designs specified using I/O automata, uses a theorem proving approach. In such an approach, properties of the system design that are to be validated are expressed as logical assertions (predicates), and underlying statements about the system design are expressed as logical axioms. The axioms generally relate to the detailed operation of the system, while the assertions relate to the overall aspects of its desired behavior. A user then verifies by hand that the properties are necessarily true given the axioms, or may possibly use a user-assisted program, such as a theorem proving program, to aid in this verification.

Other methods for validating system properties can also be used. One approach, known as "model checking," is based on exhaustive checking of all states in an instance of a system design in which the size of the system (i.e., the number of states) is restricted. Another approach is based on simulation of the operation of the system, in which a typically more complex (e.g., larger number of states) instance of the system is checked by examining a sample sequence of states or of transition labels ("actions") resulting from execution of the system.

SUMMARY

The present invention uses a new computer language which is based on a formal, mathematical state-machine model, and which is used both to validate and to generate code for a distributed system. In general, use of this new language enables developing a system using multiple related system specifications (i.e., precise descriptions), for instance, using system specifications at multiple levels of abstraction or using multiple system decompositions into parallel combinations of interacting systems, and allows use of validation tools to verify properties of these systems and their relationships. The language includes constructs for specifying non-deterministic actions, and for specifying constraints on those non-deterministic choices. Several well-defined sub-languages of the full computer language are also defined. These sub-languages are used to specify the input of some tools, in particular, of some code generators.

In one aspect, in general, the invention is a method for developing a software implementation of a distributed system. The method includes accepting a design specification for the distributed system, including accepting specifications of multiple state machines, and accepting a specification of desired properties of the state machines. The method also includes applying a validation procedure to the design specification to verify that the state machines have the desired properties, including applying a theorem proving procedure to the design specification, and also includes applying a code generating procedure to the specifications of the state machines to generate multiple software implementations for components of the distributed system.

The invention can include one or more of the following features.

The state machines can include node state machines and channel state machines, and applying the code generating procedure to the specifications of the state machines can include, for each of the node state machines, applying a translation procedure to the specification of the node state machine to generate a software implementation of that node state machine.

The specification of each state machine can include a specification of a multiple state variables, the values of which determine the state of the state machine, and also include a specification of multiple state transitions. Each specification of a state transition includes a specification of values of the state variables in a state in which the transition can be taken, and a specification of an effect on the values of the state variables when that transition is taken. Furthermore, the specification of the effect on the values of the state variables can include an instruction to set one of the state variables to a non-deterministic choice of values, as well as a logical constraint on the values of the state variables resulting from taking the transition.

The specifications of the properties of the state machines can include a logical assertion involving states of the state machines.

The step of applying the theorem proving procedure to the design specification can include translating the design specification into a logical language of a theorem prover and providing the translated design specification to a theorem prover, such as a software based theorem proving program. The theorem prover can be an equational theorem prover.

Applying the validation procedure can include applying a simulation procedure to one of the state machines, including determining a sequence of states of the state machine, and verifying one of the desired properties in each of the sequence of states. Applying the validation procedure can further include applying a model checking procedure to one of the plurality of state machines, including enumerating the states of the state machine, and verifying one of the desired properties in each of the enumerated states. Applying the validation procedure can also include deriving a second design specification from the accepted design specification, wherein the derived design specification has a property, such as deterministic behavior or specification using a single state machine, that the accepted design specification does not have, and then applying a second validation procedure to the derived design specification.

In another aspect, in general, the invention is a method for developing a software implementation of a distributed system. The method includes accepting a first design specification including accepting specifications of a first set of state machines, and accepting a specification of a first set of desired properties of the first set of state machines. The method also includes applying a first validation procedure to the first design specification to verify that the first set of state machines has the first desired properties, including applying a theorem proving procedure to the first design specification. The method also includes accepting a second design specification, including accepting specifications of a second set of state machines, and accepting a specification of a desired relationship between the first set of state machines and the second set of state machines. The method further includes applying a second validation procedure to the second design specification to verify that the first set of state machines and the second set of state machines have the desired relationship, and for each of the second set of state machines, applying a code generating procedure to the specification of the state machine to generate a software implementation of that state machine.

This aspect of the invention can include one or more of the following features.

The method can further include the step of refining the first design specification to yield the second design specification, for example, by expressing the specification of the second set of state machines using a restricted sublanguage of the language used to express the specification of the first set of state machines. The first set of state machines can include a specification of non-deterministic behavior of the state machines, and the restricted sublanguage does not permit specification of non-deterministic behavior.

Accepting a specification of a desired relationship between the first set of state machines and the second set of state machines can include accepting a desired relationship between a first one of the first set of state machines and a second one of the second set of state machines, including accepting an association of the states of the first state machine and states of the second state machine, and accepting an association of state transitions of the first state machine and sequences of one or more state transitions of the second state machine.

In another aspect, in general, the invention is software stored on a computer readable medium including instructions for causing a computer to perform multiple procedures, each of the procedures including accepting a design specification for a distributed software system, the design specification including a specification of a plurality of state machines, and a specification of desired properties of the state machines, wherein the multiple procedures include a theorem proving procedure for verifying that the plurality of state machines has a desired plurality of properties and a code generator for translating the design specification into a plurality of software implementations for components of the distributed software system.

In yet another aspect, in general, the invention is a system for iterative development of a software implementation of a distributed system, including a means for accepting a first design specification for the distributed system, wherein the first design specification includes specifications of a first plurality of state machines, and includes a specification of desired properties of the plurality of first state machines. The system also includes a means for verifying that the first state machines have the desired properties, a means for accepting a second design specification, wherein the second design specification includes specifications of a second plurality of state machines, and includes a specification of a desired relationship between the first plurality of state machines and the second plurality of state machines, a means for verifying that the first plurality of state machines and the second plurality of state machines have the desired relationship, and a code generator for producing a plurality of software implementations of components of the distributed system from the specifications of the second plurality of state machines.

An advantage of the invention is that it allows software developers to produce implementations of distributed software designs with significantly fewer defects than typically possible with previously available techniques.

Another advantage of the invention is that errors introduced during manual translation of a system specification are reduced. In a prior approach, a specification of an abstracted system design is first developed and this abstract design is then validated. However, the implementation of that design then requires a manual phase including translation into a specification of an implementation of the design in a target computer programming language. Establishing that the final implementation exhibits the same essential properties as the abstract design is not straightforward due, at least in part, to the possibility of errors being introduced in the manual translation phase. In another prior approach, an implementation in a target computer language (e.g., C++) is first developed. This implementation does not require any further manual translation steps where errors may be introduced. The specification in this computer programming language is not well matched as an input to validation tools, and therefore, manual steps may be needed to adapt the specification in the computer programming language to a form that is well matched to validation tools. However, such a manual step puts in question the relationship of the input to validation tools and the implementation of the system, due in part to the possibility of errors being introduced. An advantage of the present invention is that if a final manual translation step is needed before automatic translation or code generation, the specification that results form the final manual translation step can be used as an input to validation tools, such as a theorem prover, model checker, or simulator, in addition to as input to translation or code generation tools which produce software in computer programming languages which can be interpreted, executed directly, or compiled to executable forms. As the same final specification is input to both the validation tool and the translation tool without any additional manual translation step that cannot be easily validated, validity of the final implementation is significantly more certain.

Another advantage of this invention is that it enables use of multiple related design specifications, for example some being refined versions of others. The software developer can validate relationships between the specifications, for example, that they exhibit the same external behavior. This allows developing a series of refined specifications, and validating the refinement steps themselves. The final specification may have characteristics that allow straightforward translation into the target language, while earlier specifications in the series may have characteristics that allow straightforward validation of particular properties. For example, a required property of a system can be established using an abstract specification, and a final detailed specification can be shown to be related to that abstract specification in a way that guarantees that the required property is still satisfied by the detailed specification. This indirect approach is, in many instances, significantly simpler than the alternative of establishing the required property based on the detailed specification alone.

Another advantage of the invention is that it enables use of multiple design specifications using various decompositions into sets of parallel interacting systems. In a similar manner as in the use of multiple refinements of a system specification, multiple decompositions can allow validation of properties using particular decompositions, and validating the relationships between decompositions. For example, one specification can be in terms of a single autonomous system while another can be in terms of several interacting systems, and, using this invention, a property can be established for the autonomous system and the interacting systems can then be shown to formally implement the single autonomous system. Furthermore, in a final decomposition, some of the parallel interacting systems can correspond to systems, such as communication systems or services, that are provided by the hosting software environment (e.g., operating systems) for the implementations of the other component system.

Another advantage of the invention is that it allows using multiple design specifications where one specification can use all the features of a specification language while a second specification uses a restricted sub-language. The full specification language is more expressive than a restricted sublanguage. However, use of a restricted sub-language has the advantage that automated code generation, simulation, and model checking can be easier, for example, due to some expressive elements of the full language that may be difficult to translate or to simulate being omitted from the restricted sublanguage. Developing two specifications and establishing an explicit relationship between them provides advantages of both an expressive language as well as an easily translated language, which would have been unachievable with a single specification in a single language.

Another advantage is that implementations using different target computer programming languages can be verified to have the same or related properties.

Other features and advantages of the invention will be apparent from the following description, and from the claims.

DESCRIPTION

Figure 1A:
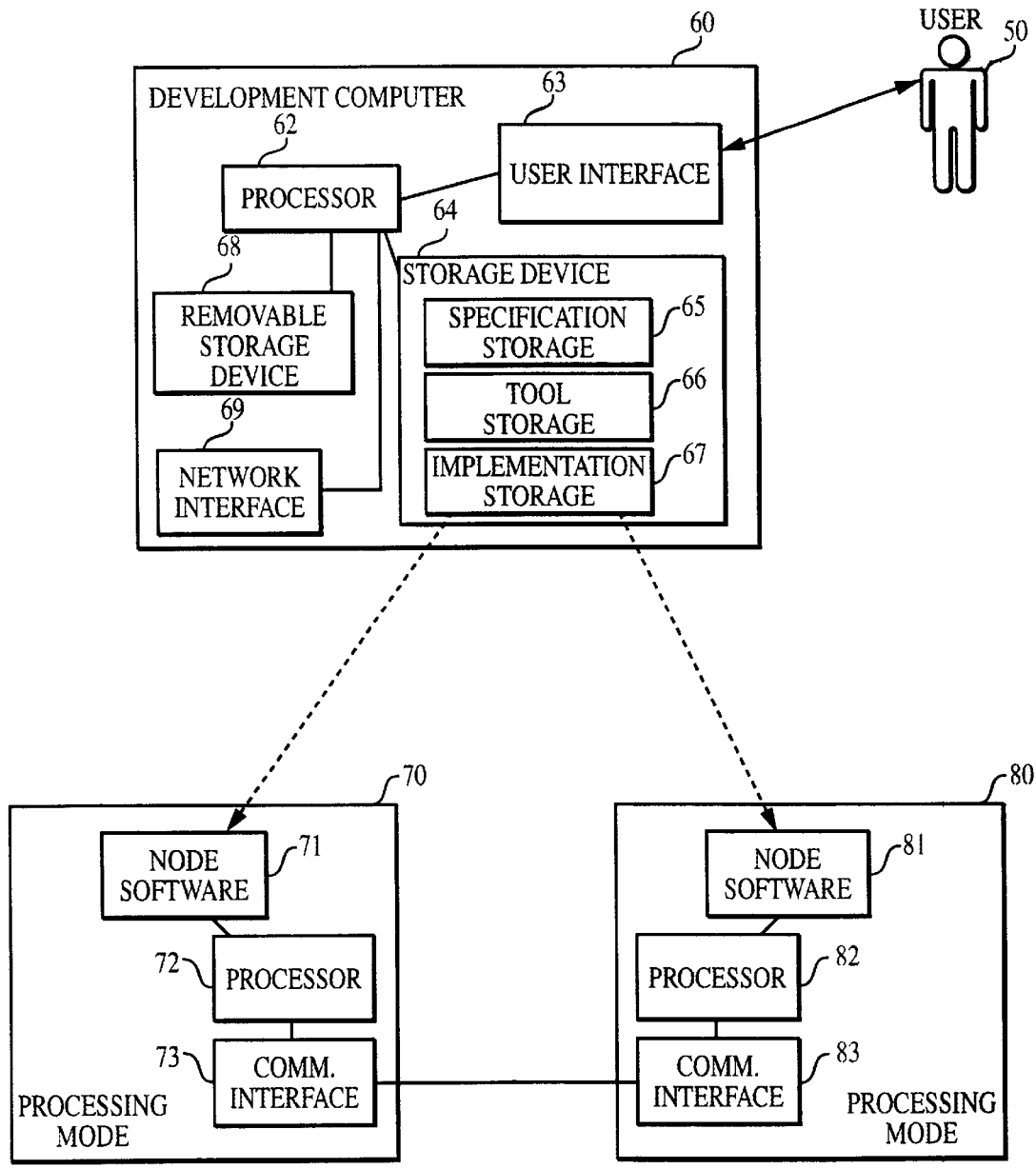
FIG. 1A is a development computer used by a user to develop software for execution on multiple processing nodes.

Referring to FIG. 1A, a user 50, a software developer or designer, develops software using a development computer 60. Development computer 60 includes a processor 62 coupled to a user interface 63, such as a graphical display, keyboard, and mouse, through which user 50 interacts with the computer. Development computer 60 also includes a storage device 64 that includes specification storage 65, tools storage 66, and implementation storage 67. Rather than including storage device 64, development computer can alternatively use other storage systems, such as storage accessible through a network interface 69. Specification storage 65 includes storage for the specification of the system being developed by the user, for example, multiple text files in a computer file system. Tools storage 66 includes storage for procedures or tools that can be executed on processor 62. User 50 can invoke these tools through user interface 63. Tools can be stored as executable files (that is, files containing instructions that can be executed directly by processor 62), or can include instructions that can be interpreted or executed using another program such as a programming language interpreter, or a virtual machine (such as a Java Virtual Machine). Using these tools, user 50 creates a software implementation that is stored in implementation storage 67. Portions of this software implementation are transferred to typically multiple processing nodes for execution, shown in FIG. 1A as processing nodes 70 and 80. If necessary, the software implementations are compiled into machine instructions prior to or after transfer to the processing nodes. Node software 71 and 81 is executed on processors 72 and 82. In this illustration, processors 72 and 82 on processing nodes 70 and 80 are coupled through communication interfaces 73 and 83, for example, data network interfaces. Development computer 60 can also include a removable storage device 68, such as a CD-ROM, for providing development tools that are then stored in tool storage 66. These tools could equivalently be provided to development computer 60 over a data network or some other communication interface.

Figure 1B:
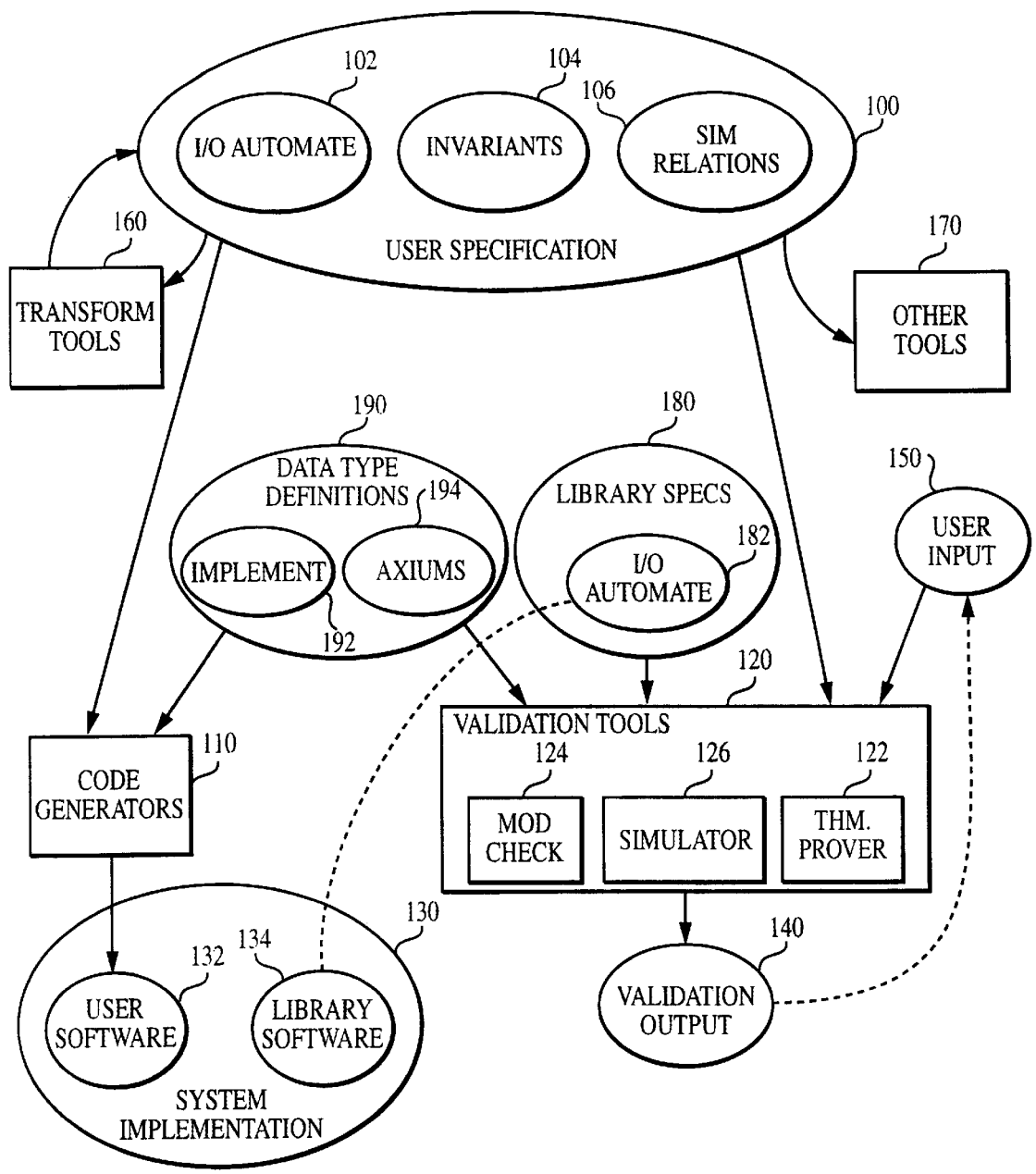
FIG. 1B is a flow diagram including elements of a user specification and tools used to process the specification to produce a system implementation.

Referring to FIG. 1B, user 50 (shown in FIG. 1A) produces a user specification 100, written in a new computer programming language, IOA (an acronym for "Input Output Automata"). User specification 100 is stored in specification storage 66 (shown in FIG. 1A). User specification 100 describes a distributed system, its components, and logical statements about the system and its components. The same user specification 100 is processed by a set of development tools, including both code generators 110 and validation tools 120, to produce a system implementation 130, for example source code in a high-level programming language, and validation output 140, respectively. A manual "IOA: A Language for Specifying, Programming, and Validating Distributed System" is included as Appendix A of this description.

In this embodiment, user specification 100 includes a set of text files, stored on a computer file system accessible to a development computer used by the user for software development. Each text file provides a portion of user specification 100, for example, the specification of one component of the system. The user edits these text files using a standard text editing program. After creating or modifying one or more of these specification text files, the user can use a development tool to process the text files. A development tool is a program, which when executed, on the development computer, inputs specification text files and produces an output such as text messages for presentation to the user, a translation of the specification text files into an implementation using another computer language, or a new derived specification in the IOA language then becomes part of the user specification. Some development tools are interactive in that they carry out a series of exchanges with the user, each of which can include an output or message to the user and an input from the user in return. Alternative embodiments use other approaches to storing the components of a user specification, and for invoking development tools. For instance, an integrated software development environment, similar to development environments available for programming in programming languages such as C, C++, or Java, can provide a user interface that is used to manage the user specification and to invoke tools and procedures at the user's command.

In general, user specification includes multiple components, namely I/O automata specification 102, and one or both of invariants specification 104 and simulation relations specification 106. I/O automata specification 102 includes descriptions of typically multiple I/O automata that together describe the behavior of the distributed system. Invariants specification 104 include a set of desired invariant properties of the automata in I/O automata specification 102 expressed as logical statements (i.e., assertions or predicates that should be true in all states of the automata). These invariant properties relate, for example, to desired operating characteristics of the distributed system. The third component, simulation relations specification 106, includes desired relationship properties between automata in I/O automata specification 102. Relationship properties can include, for example, properties that can establish that one automaton formally implements another. Validation of such simulation relationship properties allows, for example, a user to use an iterative design approach while ensuring that each iteration of the design is appropriately related to the previous iteration.

Code generators 110 and validation tools 120 also make use of data type definitions 190 and library specifications 180 which can be provided by the system, and augmented by the user. As is described more fully below, such library specifications can be used to describe system components that are implemented within the hosting software environments (e.g., operating systems) in which the final implementation is executed.

Data type definitions 190 specify a set of data types that are used in user specification 100. Each data type is characterized by a set of allowable values and a set of operations that use or produce values of that data type. Data types are defined algebraically using equational axioms, data type axioms 194 involving data values produced using various operations. Data type axioms 194 include logical statements about properties of those operations using those data types. Data type definitions 190 also include data type implementations 192, which include procedural specifications (e.g., sequences of Java statements) of various operations using those data types. Data type definitions 190 are used by validation tools 120, which use data type implementations 192 for procedural specifications needed, for example, for simulation of an automaton, and use data type axioms 194 for logical properties needed, for example, for logical reasoning about properties of automata. Data type implementations 192 are also used by code generator 110 to supplement the built-in data types supplied by target programming languages in which the output of code generators 110 is specified. In this embodiment, data type implementations 192 are written manually, in such a was as to be consistent with data type axioms 194. In alternative embodiments, data type implementations 192 can be determined automatically from data type axioms 194.

System implementation 130 includes user software 132 produced by code generators 110 by processing I/O automata specification 102. System implementation 130 also includes library software 134. Such library software can include, for example, software services (e.g., TCP/IP) that are provided by a hosting operating system environment (e.g., one or more cooperating Unix operating systems) on which user software 132 can execute. User software 132 can include instructions in a high level programming language, such as C, C++, or Java. Such a high level programming language implementation must in general be compiled into machine instructions for the target processor before execution. In alternative embodiments, code generators 110 can produce lower-level instructions directly, for instance producing "byte compiled" instructions for execution by a Java Virtual Machine.

A library specification 180 includes I/O automata 182 that are related to library software 134. I/O automata 182 are not in general used to generate library software 134 as the library software is available in the hosting environment. However, I/O automata 182 are needed in order to validate properties of user specified I/O automata specification 102. Therefore I/O automata 182 characterize "essential" properties of library software 134, but do not necessarily specify the detailed behavior of library software 134.

Validation tools 120 can require user input 150. For instance, some tools require guidance from the user for their successful or efficient operation. A user can also provide user input 150 based on validation output 140 of validation tools 120.

Other software development tools can also be used during the software development process. For example, transformation tools 160 take input from user specification 100 and add to or modify the user specification. Other tools 170 can be used for other automated processing of user specification 100, for instance, creating formatted printed version of user specification 100.

Validation tools 120 include a variety of verification and analysis tools (i.e., programs that take system specifications as input and produce output based on the inputted specifications). Several of the tools are built around existing core tools. In these cases, the validation tools typically includes a preprocessor that accepts a specification in the IOA language and produces an equivalent specification in the language of the core tool. A post-processor may also be used to process the output of the core tool so that it is expressed in terms of the original IOA specification input by the pre-processor. A preprocessor can be a separate program that takes an IOA specification and outputs a specification in an appropriate syntax for a core tool. Based on the description of the IOA language, and the requirements of the existing core tools, a person of ordinary skill in the art can implement such pre- and post-processors. Validation tools 120 include a theorem prover 122, a simulator 126, and a model checker 124. In general, theorem prover 122 determines whether properties of user specification 100 are satisfied, based on a process of logical reasoning, simulator 126 determines whether these properties are satisfied based on sample executions of a system described in user specification 100, and model checker 124 determines whether these properties are satisfied based on exhaustive examination of possible states of a system described in user specification.

Based on the properties specified by a user in invariants specification 104 and simulation relations specification 106, and validation output 140 produced using validation tools 120, the user can create user specification 100 such that the resulting system implementation 130 has a high certainty of satisfying its desired properties.

Figure 2A:
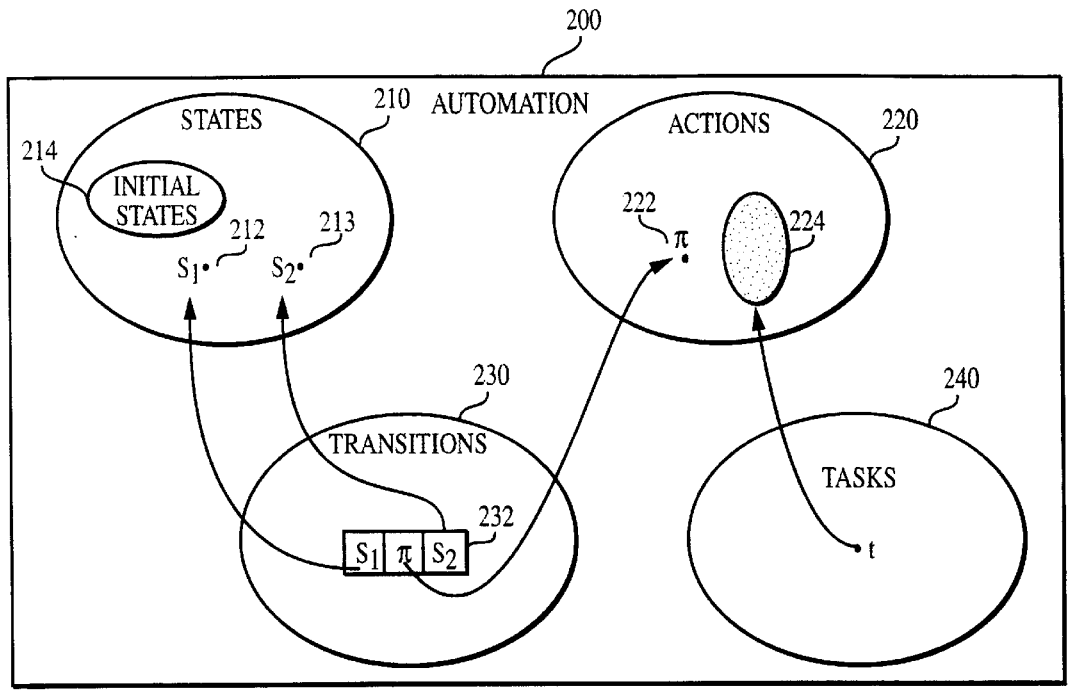
FIG. 2a is a structure of an I/O automaton.
Figure 2B:
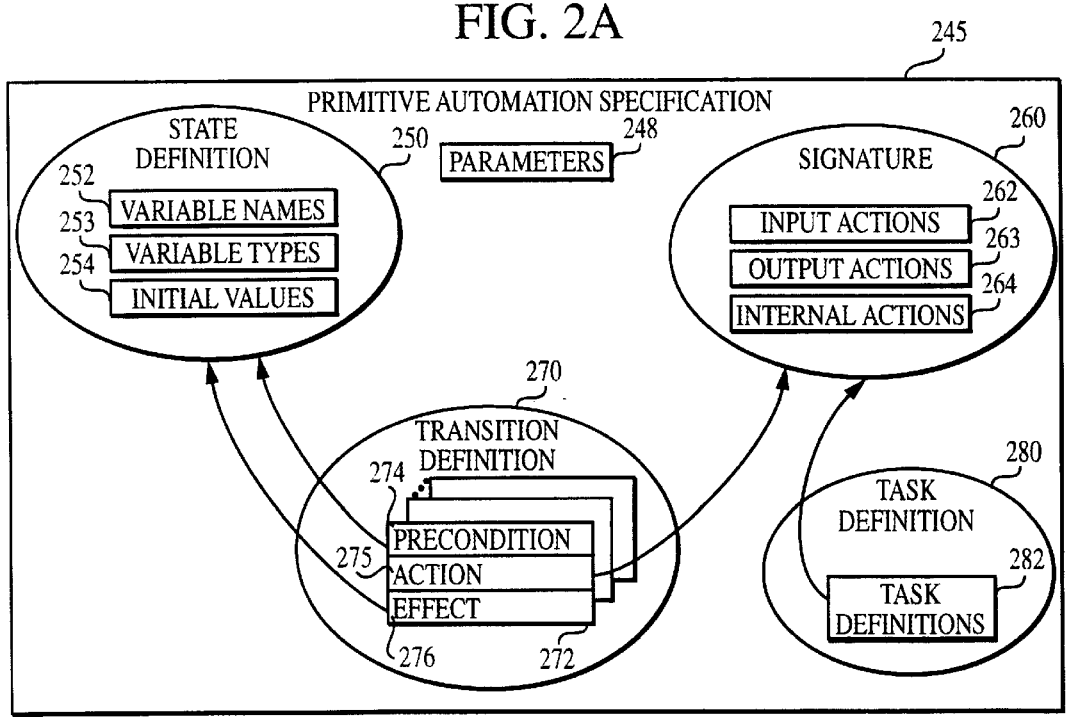
FIG. 2b is a structure of a specification of a primitive I/O automaton.

User specification 100 is written in the new IOA computer programming language. The IOA language is based on the I/O automaton model. Referring to FIG. 2a, viewed abstractly, an I/O automaton formally includes actions 220, states 210, which can include an explicit include a set of starting states, transitions 230, and tasks 240, which are subsets of actions. Referring to FIG. 2b, the IOA language includes a syntax for a primitive automaton specification 245 which is used to specify the actions, states (and start states), transitions, and tasks of an I/O automaton in terms of a signature 260, a state definition 250 (including initial values 254), transition definitions 270, and task definitions 280.

States 210 includes a possibly infinite set of states (i.e., characterizations of past executions which determine future behavior) of the automaton. State definitions 250, a component of specification 245, provides a concise specification of states 210 and includes a specification of a set of state variables, including variable names 252, variable data types 253, and, optionally, initial values 254 for the state variable. Each state of states 210 corresponds to a particular assignment of values to all the state variables. States 210 includes a subset of one or more initial states 214 in which the automaton can begin execution. If initial states 214 includes more than one state, then any of those states can be non-deterministically chosen to start an execution. State definitions 250 includes a specification of the initial states using initial values 254 for the state variables. If initial values 254 are not specified, then any state can be chosen non-deterministically to be the initial state of an execution sequence. Initial values 254 can include initial assignment statements that set state variables to definite values. Initial assignments can also set state variables to explicitly non-deterministic values, or to values specified axiomatically. An initial assignment can use a "choose . . . where" construct of the IOA language in which the assigned value is a non-deterministic choice from a definite non-empty set of values such that the chosen value satisfies the "where" predicate. Multiple assignments using "choose" constructs (with or without "where" predicates) can also be modified by a "so that" predicate. This form of explicit non-deterministic assignment is similar to the "choose . . . where" construct except that the "so that" predicate is applied to all the assignments at once, rather than to individual assignments as with a "where" predicate.

Actions 220 is a set of named events associated with changes of state of an I/O automaton. This set is partitioned into internal and external actions, and external actions are either input or output actions. In general, when executed, an I/O automaton reacts to its input actions and, as a consequence of making transitions between states, produces output actions. Externally visible behavior of an I/O automaton can be characterized by a set of traces, each of which is a sequence of external (input and output) actions of a single execution of that automaton.

Signature 260 includes specifications of input actions 262, output actions 263, and internal actions 264. Each action is named, and can have one or more typed parameters. The parameter values can also be constrained using a "where" predicate which must be satisfied for each choice of parameter values. One action specification in signature 260 can, using parameters, therefore correspond to a subset of more than one of actions 220, one action for each allowable set of values of the parameters.

Transitions 230 includes a set of (pre-state, action, post-state) tuples which together define the set of state sequences allowed by automaton 200. Every transition from a pre-state to a post-state is associated with an action, which is either an input, an output, or an internal action. A requirement of I/O automaton 200 is that it is input enabled, that is, for every state, there is a transition from that state for every input action. A representative transition tuple 232 includes a pre-state $s_1$ 212, an action $\pi$ 232, and a post-state $s_2$ 213.

Transition definitions 270 includes a set of individual transition definitions 272. A transition definition provides a shorthand notation that is used to define a possibly large set of individual transitions. A transition definition 272 is named, and can be parameterized by one or more variables, where the variables are specified to be of particular data types and can be constrained to take on particular allowable values (for example, using a "where" predicate on the entire set of parameter values). A transition definition can be specified using an operational style, an axiomatic style, or a combination of the two. Each transition definition includes a triple (precondition 274, action 275, effect 276). A precondition is a logical expression typically involving one or more state variables that defines a subset of states, the allowable pre-states, in which the expression evaluates to a true value. No explicit precondition is allowed for an input action as input actions are enabled in all states. Action 275, which can correspond to input, output, or internal actions, identifies actions defined in signature 260 that are permitted to occur (are enabled) in any of the allowable pre-states defined by precondition 270. Action 275 is named and can be parameterized by parameters of the transition definition. Effect 276 of the transition definition 272 specifies the resulting post-states. Effect 276 is a code fragment associated with the transition. This code fragment is similar to a traditional program in a simplified sequential programming language and is specified as a sequence of operational statements consisting of (possibly non-deterministic) assignments, conditionals, and simple bounded loops. Nondeterministic assignments can be used to specify a post-state of a transition in an axiomatic style, for example, using the "choose . . . so that" construct. The predicate of such a "choose" statement can involve the values of state variables both before and after the transition is take, indicated syntactically using a prime after a variable name to signify a value in a pre-state. As introduced above, a transition definition can be parameterized using parameters that also parameterizes the corresponding action. A parameter of a transition definition can also be a "choose" parameter. Such a choose parameter is not a parameter of the actions of the transition definition, but rather is used to constrain the relationships of pre-states and post-states by being used in the specification of the precondition as well as in the effect. During execution, effect 276 is intended to be executed atomically, that is with no interruption by execution of a code fragment of another transition, or another instance of the same transition.

Tasks 240 include disjoint sets of non-input actions. Tasks can be thought of an abstract description of "threads of control" within the automaton, and can be used in reasoning about fairness of execution of an automaton with respect to these tasks and used as a basis for time performance analysis. Task definitions 280 can include individual task definitions 282 each of which identifies a subset of actions defined in signature 260.

Primitive automaton specification 245 can also include parameters 248, thereby providing a shorthand for specification of multiple I/O automata 200. The parameters of the I/O automata can be used in the definitions of their constituents, such as the states or actions. One example of use of a parameter of an automaton is in determining the size of the automaton. For example, in an automaton describing a queue, an automaton parameter can be the size of the queue. Another use of automaton parameters is to identify instances of an automaton that execute of different nodes of a distributed system.

A pair of I/O automata can be formally related by an "implementation" relationship. This implementation is based on the set of sequences of external (input or output) actions, called traces, that can result from execution of each of the automata. One automaton A implements a second automaton B if each trace of A is a member of the trace set of B. I/O automata can also be related by a "simulation" relationship. A simulation relationship between A and B provides a correspondence between states of A and states of B and, in addition, provides a detailed correspondence of each possible state transition of A to a sequence of zero or more state transitions of B. Establishing a simulation relationship between two automata can be used as a sufficient condition to establish an implementation relationship between those same automata.

Referring again to FIG. 1, in order to ascertain that an automaton has a set of desired properties, a user of the system specifies invariants specification 104. Invariants specification 104 includes sets of invariant properties, or assertions, each associated with an I/O automaton in I/O automata specification 102. An invariant property of an I/O automaton is a logical statement that the user desires to be true in all reachable states of that automaton.

Figure 3:
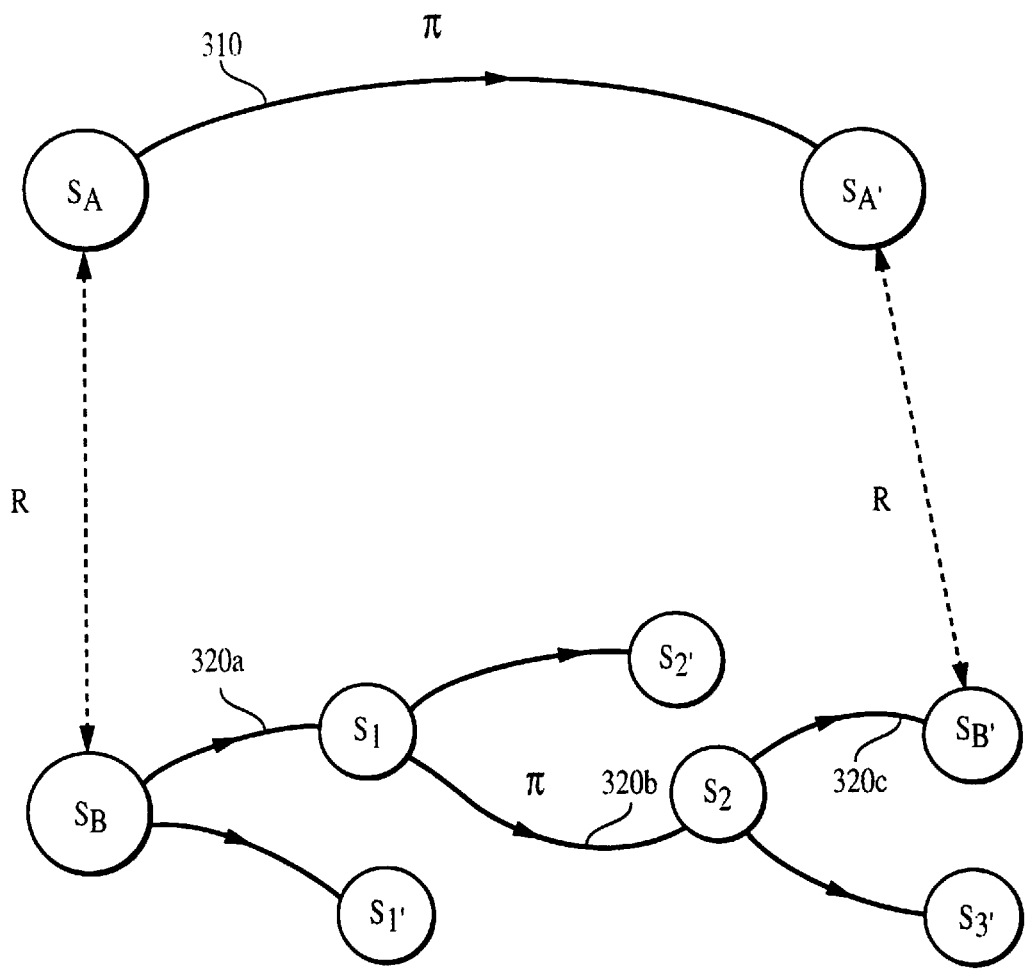
FIG. 3 is an illustration of an association of an automaton transition and an sequence of automaton transitions in a simulation relationship.

A user may also want to ascertain that two automata that he has specified are related, for example, that one implements the other. As will be discussed more fully later, establishing such implementation relationships is important in a process of iterative refinement of a system design. The user can provide a simulation relationship in simulation relations specification 106 that is associated with two automata, A and B, in I/O automata specification 102. A simulation relationship R can be specified in terms of either a forward or a backward simulation. In the case of a forward simulation, the user first specifies a simulation relationship R, which includes a set of pairs of reachable states, each of the pairs including one state from A and one state from B. Referring to FIG. 3, for all pairs of states, one from automaton A and one from automaton B, that belong to relationship R, $(s_A, s_B) \in R$, and for every transition $(s_A, \pi, s_A')$ 310, the user provides an association of that transition to a deterministic sequence of transitions of B 320a–c the first of which starts in state $s_B$. For the simulation relationship to be valid, the final state $s_{B'}$ reached after the sequence of transitions of B must also satisfy $(s_{A'}, s_{B'}) \in R$ and the sequence of external actions must be the same as $\pi$ (that is, if $\pi$ is an external action then there is exactly one external action, $\pi$, and any other actions are internal, otherwise if $\pi$ is an internal action, the entire sequence of actions of B is made up of internal actions).

In specifying a simulation relationship, the user associates each transition defined by a transition definition of A with a sequence of transition definitions of B. The effect portion of the transition definitions of B can include non-deterministic assignments to state variables, as illustrated by transitions 321a–c. The user specifies code that resolves the non-determinism.

The case of backward simulation is similar, except that for all $(s_{A'}, s_{B'}) \in R$, and for every transition $(s_A, \pi, s_A')$ defined by a transition definition of A, the user provides an association of that transition to a sequence of transitions of B the last of which ends in state $s_{B'}$. For the simulation relationship to be valid, the initial state $s_B$ from which the sequence of transitions of B starts must also satisfy $(s_A, s_B) \in R$ and the sequence of external actions must be $\pi$.

Figure 4:
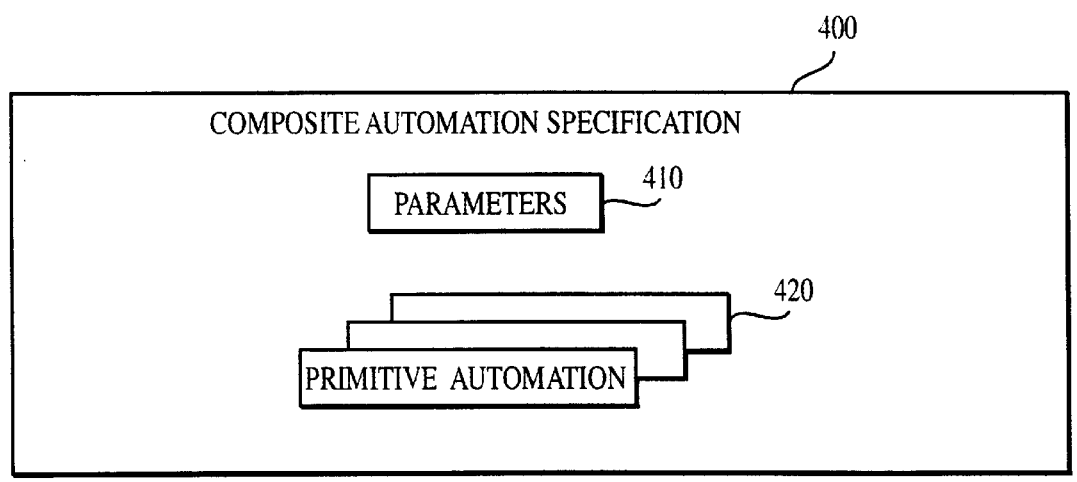
FIG. 4 is a structure of a specification of a composite I/O automaton.

I/O automata specification 102 in user specification 100 can be primitive, or can be formal parallel compositions of other automata in I/O automata specification 102 or in library I/O automata 182. Referring to FIG. 4, a composite automaton specification 400 includes references to other constituent automata 420. Actions in the constituent automata are matched by name and parameter values, and these matched actions are assumed to occur simultaneously in execution. For instance, an output action of one automaton can be matched with an input action of another automaton with the same name and parameter values. Like specifications of primitive automata, specifications of composite automata can similarly include parameters. In addition to composition of multiple automata, a hiding operator allows for the explicit hiding of output actions by reclassifying them as internal actions.

Tools, including transformation tools 160, validation tools 120, and code generators 110, are executable programs or procedures that, in general, can be invoked by the user in the course of developing an implementation. In general, the tools include a first stage that parses an input specification written in the IOA language, checks the syntax and static semantics, and creates an internal representation of the IOA specification in its working memory. The tools can be written in the Java programming language.

Figure 5:
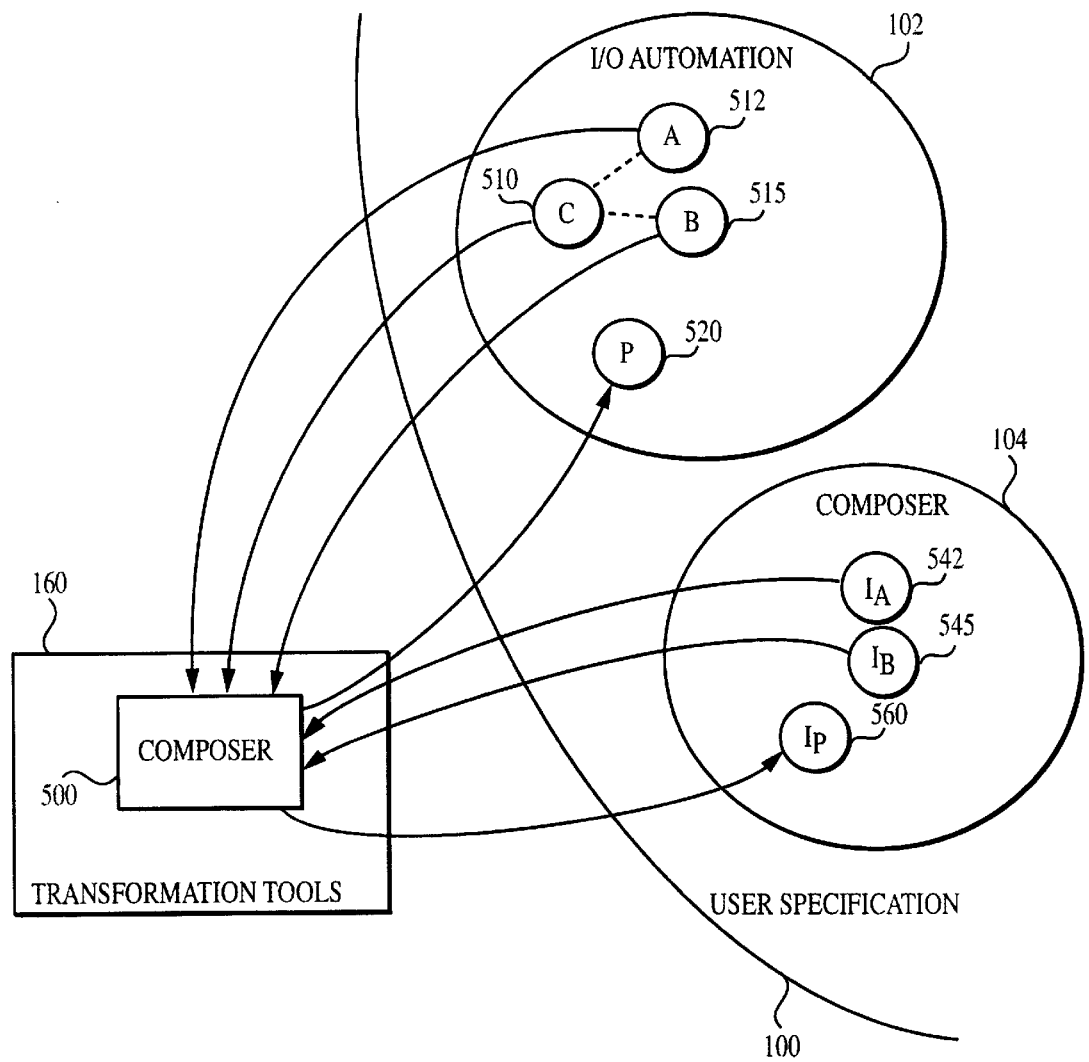
FIG. 5 is an input and output structure of a composer.

Referring to FIG. 5, transformation tools 160 (FIG. 1) include a composer 500. Composer 500 takes as input a specification of a composite automaton C 510, and specifications of all the other primitive automata that make up C, illustrated as automata A 512 and B 515. Composer 500 produces a specification of a primitive I/O automaton P 520 with explicit representation of its actions, states, transitions, and tasks. In the specification of the output primitive automaton P 520, the name of a state variable that arises from a particular constituent automaton is prefixed with the name of that automaton. In systems that are described using several applications of the composition operator, the technique of prefixing variable names with automaton names can lead to long prefixes. Prefixes can be abbreviated, as long as no ambiguity is introduced. The input to the composer is supposed to be a compatible collection of automata. For example, the constituent automata should have no common output actions. This compatibility is checked by other tools. For instance, in simple cases, a static semantic checker can determine that there are no common output actions. In more complicated cases, a theorem prover can be used. In addition, composer 500 accepts invariants $I_A$ 542 and $I_B$ 545 associated with the constituent automata and computes $I_P$ 560 in terms of the state variables of the newly constructed primitive automaton P 520.

Figure 6:
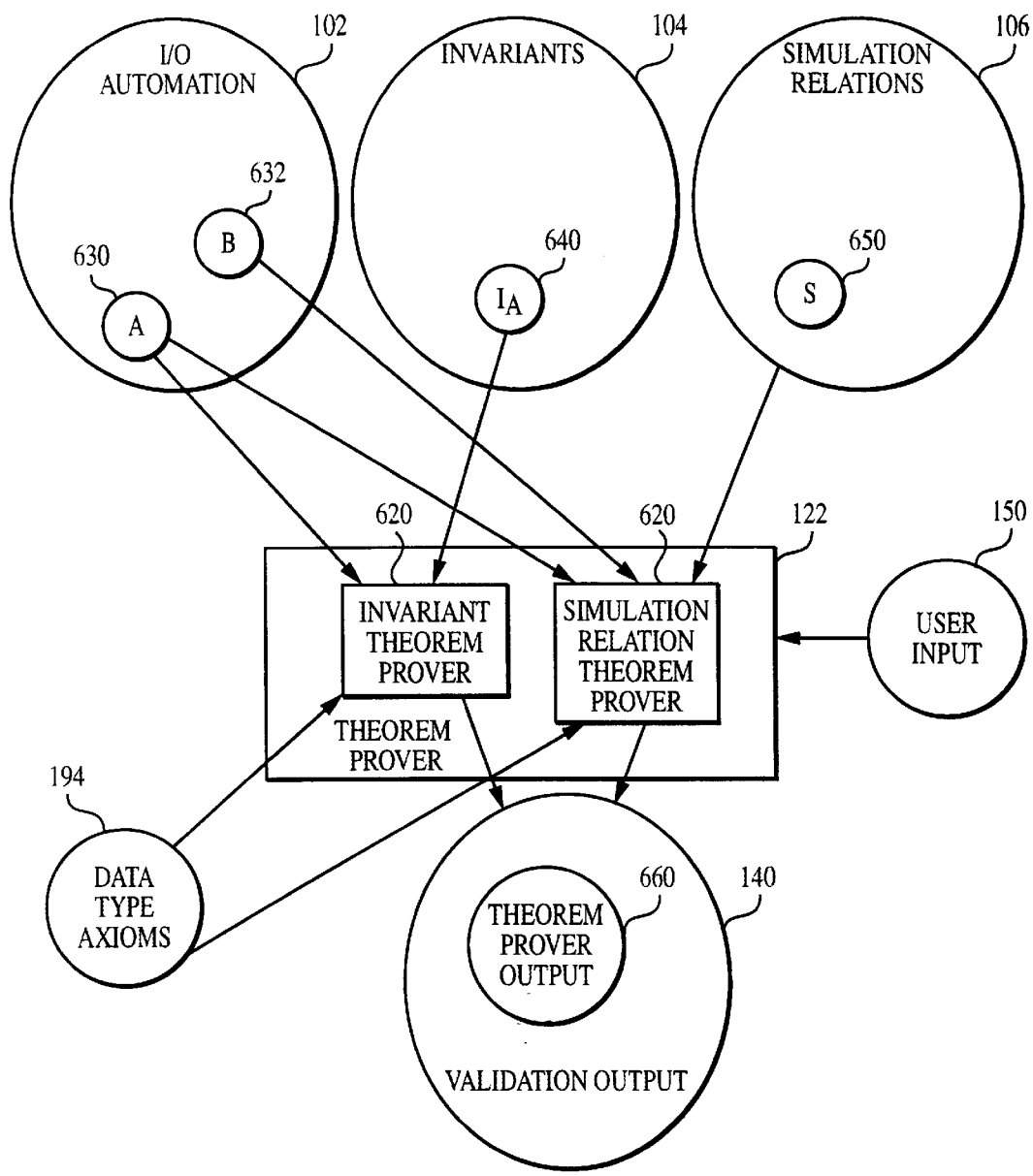
FIG. 6 is an input and output structure of a theorem prover.

Referring to FIG. 6, theorem prover 122 can operate in a variety of modes, including as an invariant theorem prover 610 and as a simulation relation theorem prover 620. As is described more fully below, these modes share a common core theorem prover, but apply different preprocessors to user specification 100 to drive the core theorem prover. Invariant theorem prover 610 takes as input a specification of an I/O automaton A 630, a specification of invariants $I_A$ 640 associated with A, and data type axioms 194. Simulation relation theorem prover 620 takes as input the specifications of two I/O automata A 630 and B 632 as well as a specification of a simulation relation S 650 between A and B. Simulation relation theorem prover 620 also takes as input data type axioms 194. Validation output 140 includes theorem prover output 660. Theorem prover output 660 can include a declaration that invariant $I_A$ 640 or simulation relation S 650 are satisfied. User input 150 can be provided to theorem prover 122, for example to provide suggestions regarding proof strategies. Theorem prover 122 can be operated in an interactive mode in which a user provides user input 150 in response to theorem prover output 660. Theorem prover output 660 can also provide information to the user if the invariant or simulation relation is not satisfied. The user can use this information to amend user specification 100, for example by amending a specification of an I/O automaton, or amending a specification of an invariant or simulation relation.

Figure 7:
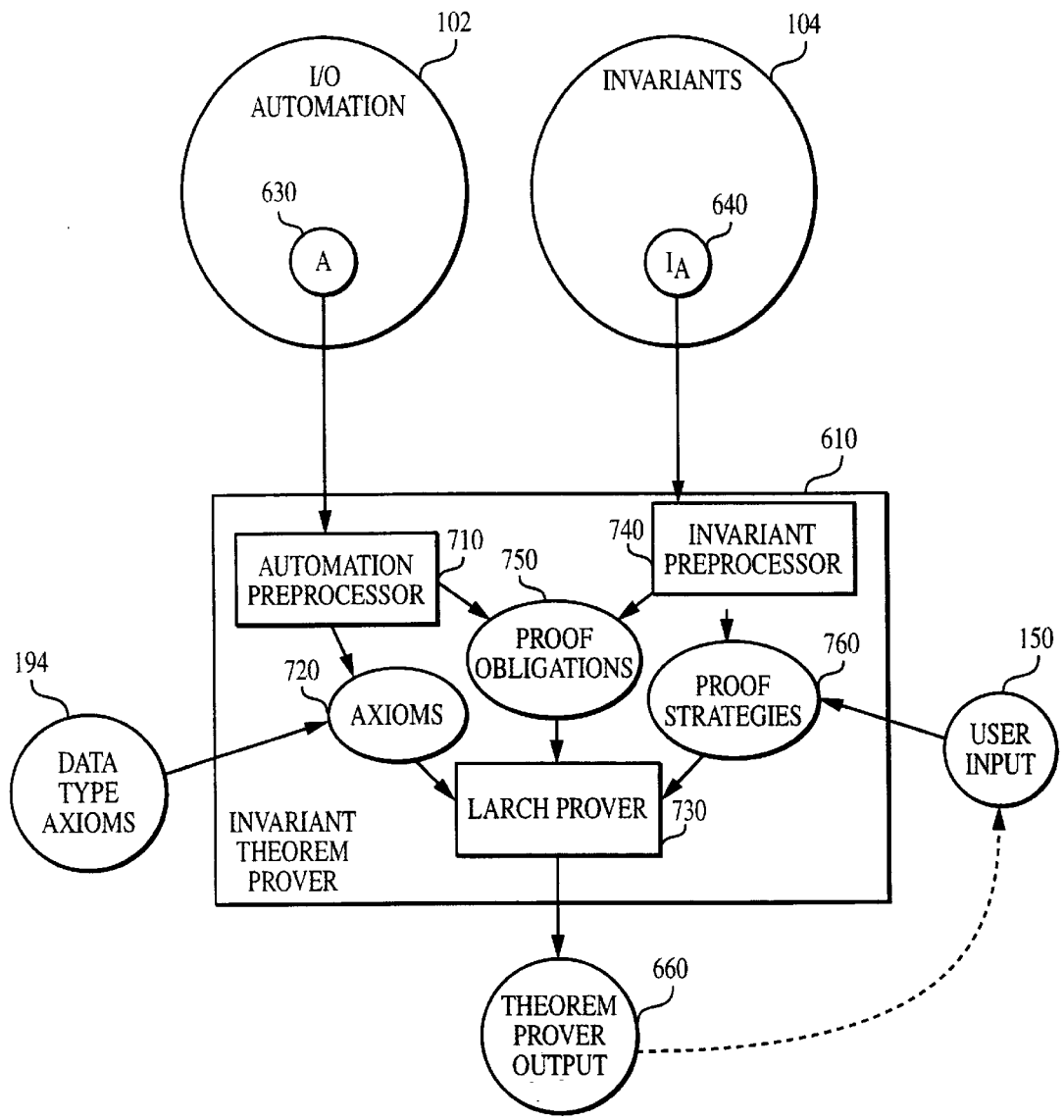
FIG. 7 is an input and output structure of an invariant theorem prover.

Referring to FIG. 7, invariant theorem prover 610, an operating mode of theorem prover 122, includes modules which implement several processing steps. Automaton preprocessor 710 can take a specification of I/O automaton A 630 and convert it into a form amenable to a core theorem prover, in this embodiment, a Larch Prover 730 which accepts input in the Larch Specification Language (LSL). LSL allows statements in first-order logic, that is statements can express quantification such as "for all x" and "there exists x", over individual elements but not over sets of elements.

Automaton preprocessor 710 takes the specification of automaton A 630, which can make full use of the features of the IOA language, into a form that is usable by the theorem-prover. This form is a mathematical description of the underlying automaton, giving its actions, states (and start states), transitions, and tasks explicitly, in basic logical notation. Each transition definition is translated into a logical relation between pre- and post-states in the form of Larch equational axioms. States of automaton A 630 are defined in terms of state variables, and the data types of those state variables are defined axiomatically, thereby allowing an axiomatic statement of the result of executing the code fragment in the effect portion of a transition definition. For a transition definition whose effect part consists solely of a "so that" statement, the translated representation corresponds exactly to the predicate in the "so that" statement. That is, if the effect is already specified axiomatically, no further translation is needed. If the effect part is a more complex code fragment, for instance including conditional statements and loops, the relationship between pre- and post-states is built up incrementally. Instances of assignment statements, choose statements, conditional statements, and loops are all replaced by constraints expressed as equations. If the effect also includes a "so that" condition, this condition is conjoined with the result of the incremental procedure. The result of processing the transition definitions is output by automaton preprocessor 710 as axioms 720. In addition, data type axioms 194 are used to supplement the axioms derived from the automaton specification.

The assertions in invariant $I_A$ 640 are processed by an invariant preprocessor 740 to form a set of proof obligations 750. For each assertion in invariant $I_A$ 640, there are two proof obligations: that the assertion is true in all start states, and that the assertion is preserved by all transitions. Automaton preprocessor 710 can also generate implicit proof obligations directly from the specification of automaton A 630. For example, the requirement that a set used in a "choose" construct is always non-empty is an implicit requirement of the language that can be expressed as a proof obligation and verified using Larch Prover 730. Invariant processor 740 can also output proof strategies 760. These strategies are used by Larch Prover 730 to aid its execution. Proof strategies 760 can also be augmented directly from user input 150. The user can suggest what axioms and previously-proved consequences are likely to come in handy in which parts of the proof.

Larch Prover 730 tries to make the connection between axioms 720 and the goal statement in proof obligations 750 by showing that the proof obligations follow as a consequence of the axioms. It does this, basically, by performing algebraic substitutions. It uses the axioms and the laws of logic to expand and simplify the statements to be proved, to formulate subgoals whose proofs would be sufficient to establish the statements to be proved, and to prove additional consequences of the axioms, which may be useful in proving the statements and the subgoals. Larch prover 730 performs these operations using the aid of proof strategies 760. Theorem prover output 660 can include validation that all the proof obligations 750 are satisfied, and can provide feedback to the user if it cannot determine whether an assertion is true or not. In the latter case, the user can provide further input to proof strategies 760 in order to help Larch Prover 730 to reach a definite conclusion.

In other embodiments, other existing theorem-proving programs such as PVS, HOL, Isabelle can be used. These alternative theorem provers work similarly to Larch prover 730, but may have input languages that are more expressive or less expressive, and may use different strategies in trying to prove the consequences. They all accept user interaction.

Figure 8:
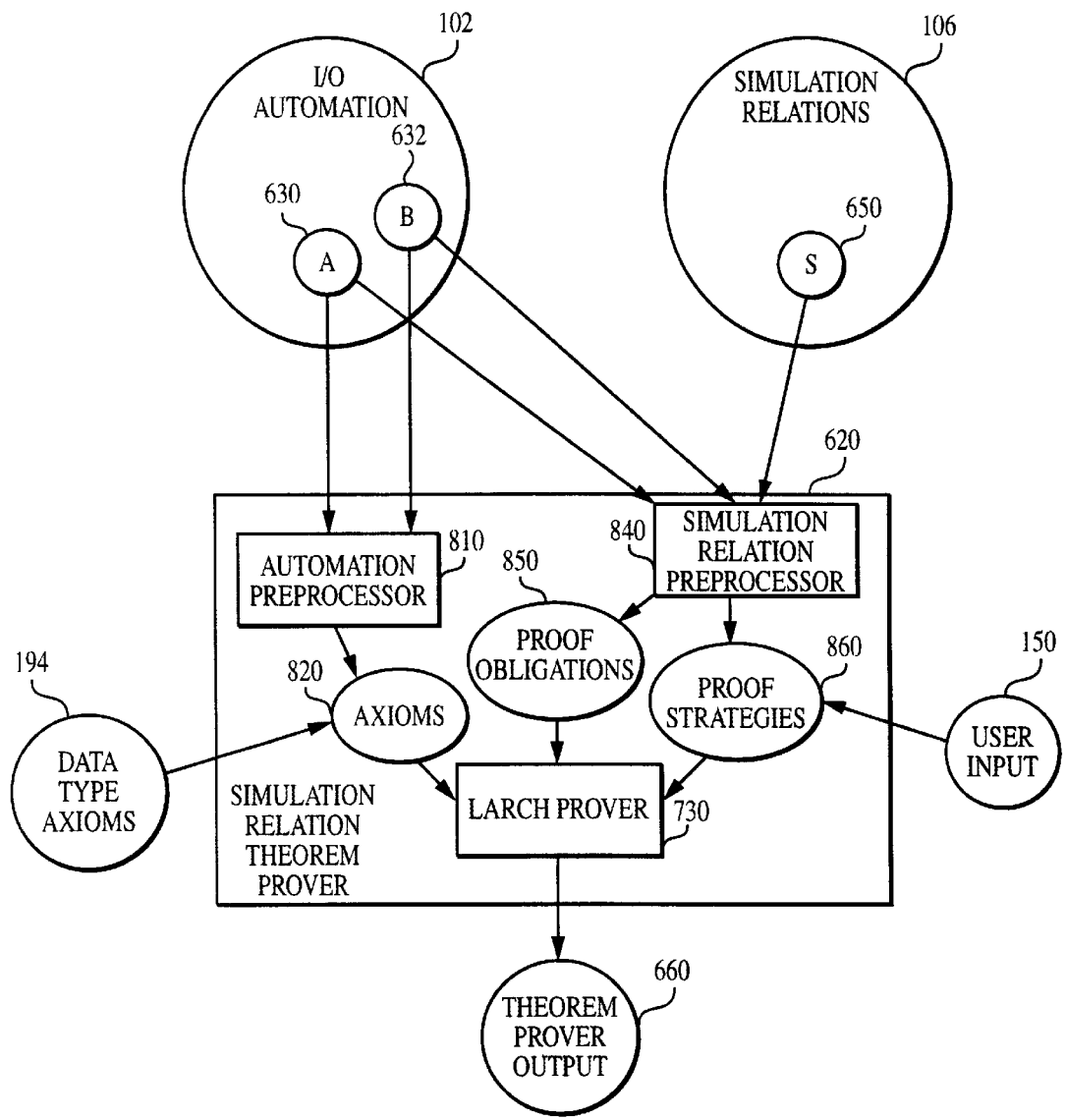
FIG. 8 is an input and output structure of a paired theorem prover.

Referring to FIG. 8, simulation relation theorem prover 620, a second operating mode of theorem prover 122, can take as input the specifications of two I/O automata A 630 and B 632 as well as a specification of a simulation relation S 650 between A and B. In this mode, automaton preprocessor 810 takes as input I/O automaton specification A 630 and I/O automaton specification B 632 and produces axioms 820. A simulation relation preprocessor 840 takes the specification of simulation relation S 650 and creates a set of proof obligations 850 and outputs proof strategies 860. Proof obligations 850 include obligations involving correspondence between initial states and obligations involving correspondence between steps. The latter obligations include assertions that the sequence of transitions of B corresponding to any transition of A are truly enabled, that the ending states of the corresponding sequence of transitions truly satisfy the simulation relation, and that the external behavior matches the external behavior of the transition of A. Axioms 820 are augmented by data type axioms 194 and proof strategies 860 are augmented from user input 150. Larch Prover 730 takes as input axioms 820, proof obligations 850, and proof strategies 860 and produces theorem prover output 660. As in the case of invariant theorem prover 610, theorem prover output 660 can be used by the user to suggest other proof strategies that the user provides through user input 150.

Theorem prover 122 can also be used in other modes to validate other inputs provided by the user in the course of using validation tools 120. For example, as is described further below, the user can provide help to simulator 126 in the form of a function that is supposed to indicate the next action to simulate. The theorem prover can be used to verify that the proposed action is enabled in the current state. In addition, theorem prover 122 can be used to prove facts about the data types defined in data type definitions 190.

Figure 9:
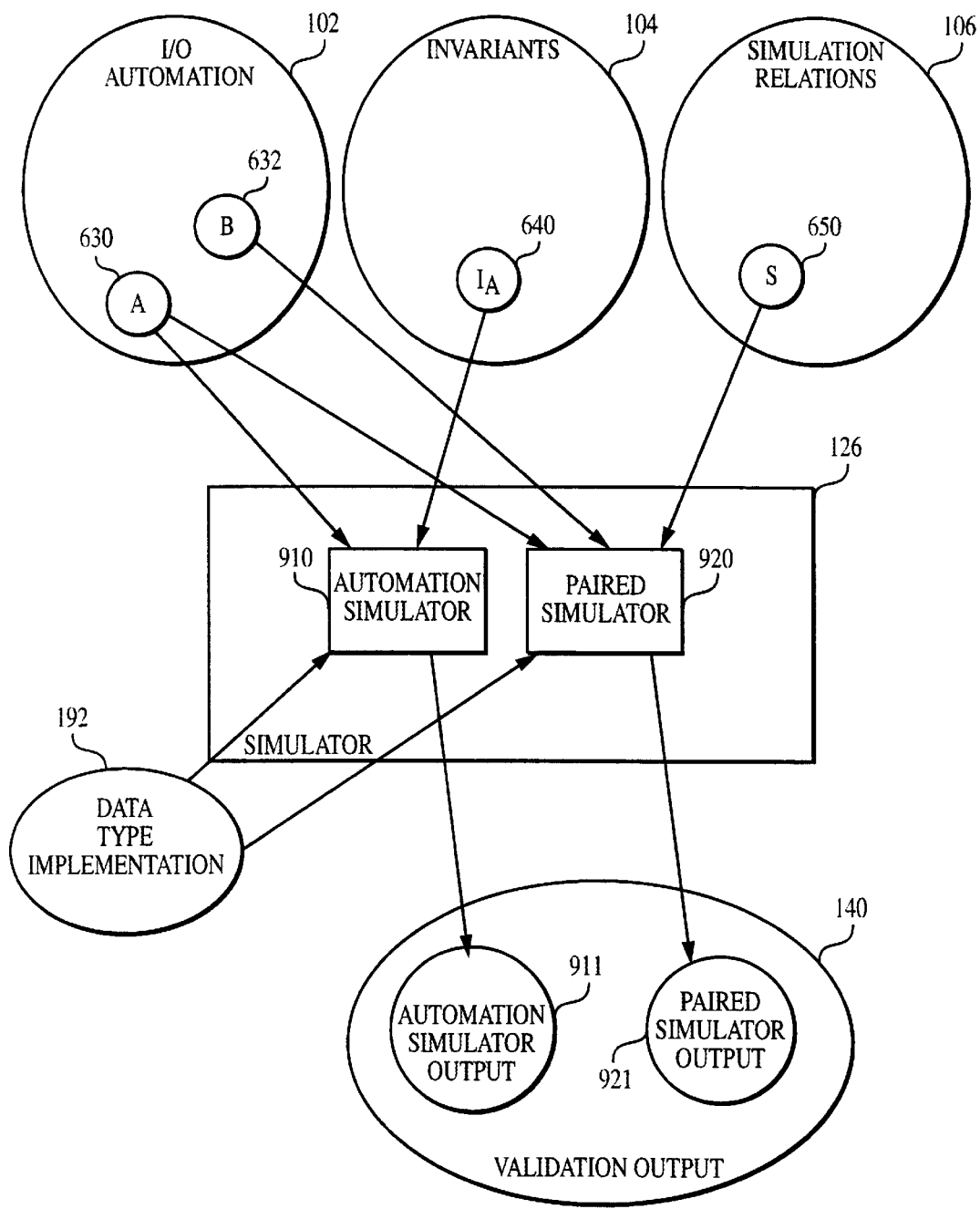
FIG. 9 is an input and output structure of a simulator.

Referring to FIG. 9, simulator 126 is used to establish the validity of invariants specification 104 and simulation relations specification 106. As with theorem prover 122, simulator 126 can operate in various modes, includes as an automaton simulator 910, in which invariants $I_A$ 640 associated with I/O automaton A 630 are validated, and as a paired simulator 920, which a simulation relation S 650 associated with I/O automata A 630 and B 632 is validated. In general, simulator 126 computes a sample execution of automaton A 630 and determines whether invariant $I_A$ 640 or simulation relation S 650 is satisfied at all states in that sample execution. If the specifications of automata A 630 or B 632 are parameterized, a particular set of parameter values must be chosen. Simulator 126 provides an efficient mechanism for testing an automaton with respect to the predicates that make up a set of desired invariant properties. If a predicate is found not to be true at a state in a sample execution, a counterexample to the predicate is immediately available.

Simulator 126 is not necessarily capable of simulating arbitrary I/O automata. As is described below, the system supports a user transforming the specification of an automaton into a restricted form suitable for simulation. One aspect of an automaton specification that must not be used in the specification of automaton A relates to non-determinism, including explicit non-determinism that arises from "choose" statements, "choose" parameters, and initial "choose" assignments, as well as implicit non-determinism that involves scheduling of actions when more than one action is enabled at a state. One approach to resolving the explicit nondeterminism specified by "choose" statements is for the user to provide a "chooser" function for each "choose" statement. This "chooser" function then provides a deterministic procedure for selecting from the set of choices specified by the "choose" statement, parameter, or initial assignment. Deterministic scheduling is accomplished by allowing at most one action (which must be a non-input action since the automaton is closed) to be enabled in any state. One approach to satisfying the deterministic scheduling requirement is for the user to provide an explicit "action selector" function for the automaton that identifies a transition definition and parameter values for the enabled non-input actions for each state of the automaton.

In addition to non-determinism, input I/O automaton A 630 is also assumed to be in primitive form (a single automaton, with explicit description of its actions, states, transitions and tasks), and "closed", that is, it has no input actions. A user can use composer 500 (described previously and shown in FIG. 5) to convert a specification of automaton A into primitive form. Transformation tools 160 can also aid the user to provide explicit choices to replace non-deterministic choices in an automaton and theorem prover 122 can be used to verify that the functions used to make the deterministic choices satisfy any required constraints, such as those expressed by "where" and "so that" constructs. Also transformation tools 160 can identify states in which multiple actions are enabled. The user can then augment the state of the automaton to include new state variables containing scheduling information and use these new state variables in the precondition specifications of various actions. In order to "close" the automaton, the user can compose the automaton he wishes to simulate with an "environment automaton" that supplies inputs for the given automaton.

Data types are defined axiomatically in IOA, but in order to simulate the data type operations, simulator 126 needs actual code for those operations. Simulator 126 accepts as input data type implementations 192. The user assumes that this code implements the data type operations correctly.

With the requirements on the specification of I/O automaton A 630 satisfied, automaton simulator 910 starts at the unique initial state. Simulator 910 performs a loop where, in each iteration, it uses the user-provided function to determine the next transition definition and parameter values and then executes the effect part of that transition definition with those parameter values. Simulator 910 maintains copies of the automaton's state variables, and since the automaton is deterministic, each step in the iteration uniquely determines the next state.

Automaton simulator 910 verifies that all predicates in invariant $I_A$ 630 are true in all the states that arise in the simulated executions. This provides evidence that the predicate is in fact an invariant property of the automaton. Automaton simulator 910 can also provide some performance information, by calculating "times" at which events of interest occur. It can do this by using upper bounds, provided by the user, for the time for steps in each task of the automaton. An on-line calculation is then used to determine the greatest time at which each event can occur, subject to the task bounds.

Simulator 122 can also execute as a paired simulator 920. Paired simulator 920 is similar to automaton simulator 910, and I/O automaton A 630 must satisfy the same conditions that are needed for input to automaton simulator 910. As presented above in the discussion of simulation relation theorem prover 620, a simulation relation S 650 includes a deterministic sequence of transitions of I/O automaton B 632 for any transition of A 630. Paired simulator 920 therefore determines an execution of A in the same manner that automaton simulator 910 does. Then, for each transition in that simulated execution of A, paired simulator 920 determines the sequence of transitions of B that correspond to the simulated transition of A. If simulation relation S 650 is a forward simulation relation, then the user provides a deterministic choice for the starting state of B. Given the first simulated transition of A, simulation relation S 650 provides the deterministic sequence of transitions of B corresponding to that first transition of A. This results in B ending in a particular well-defined state. The next simulated transition of A again determines a particular sequence of transitions of B, and so forth. If S 650 is a backward simulation relation, then a finite length simulation of A is first executed. Then for the last state of A, a deterministic choice for a last state of B's execution is determined using a function provided by the user. Then, going back through the sequence of simulated transitions of A, for each transition of A corresponding deterministically chosen sequence of transitions of B is computed. In this way, the simulation relation can be verified for the simulated execution of A. While paired simulator 920 matches the steps of A and B, the simulator performs various tests, including checking that the preconditions of all the actions are satisfied (with the user-provided values replacing the "choose" parameters, checking that the user-provided values used in "choose" statements and initial assignments satisfy their "where" clauses and "so that" constraints, and checking that the execution fragment has the same external behavior as the given step. Note that once the step correspondence is established, these checks can be performed offline, rather than as the correspondence is computed. If the simulation relation is not satisfied, for example because the sequence of actions of B is not enabled at all states in the execution, simulator 126 provides information related to the simulated execution that lead up to the error.

Figure 10:
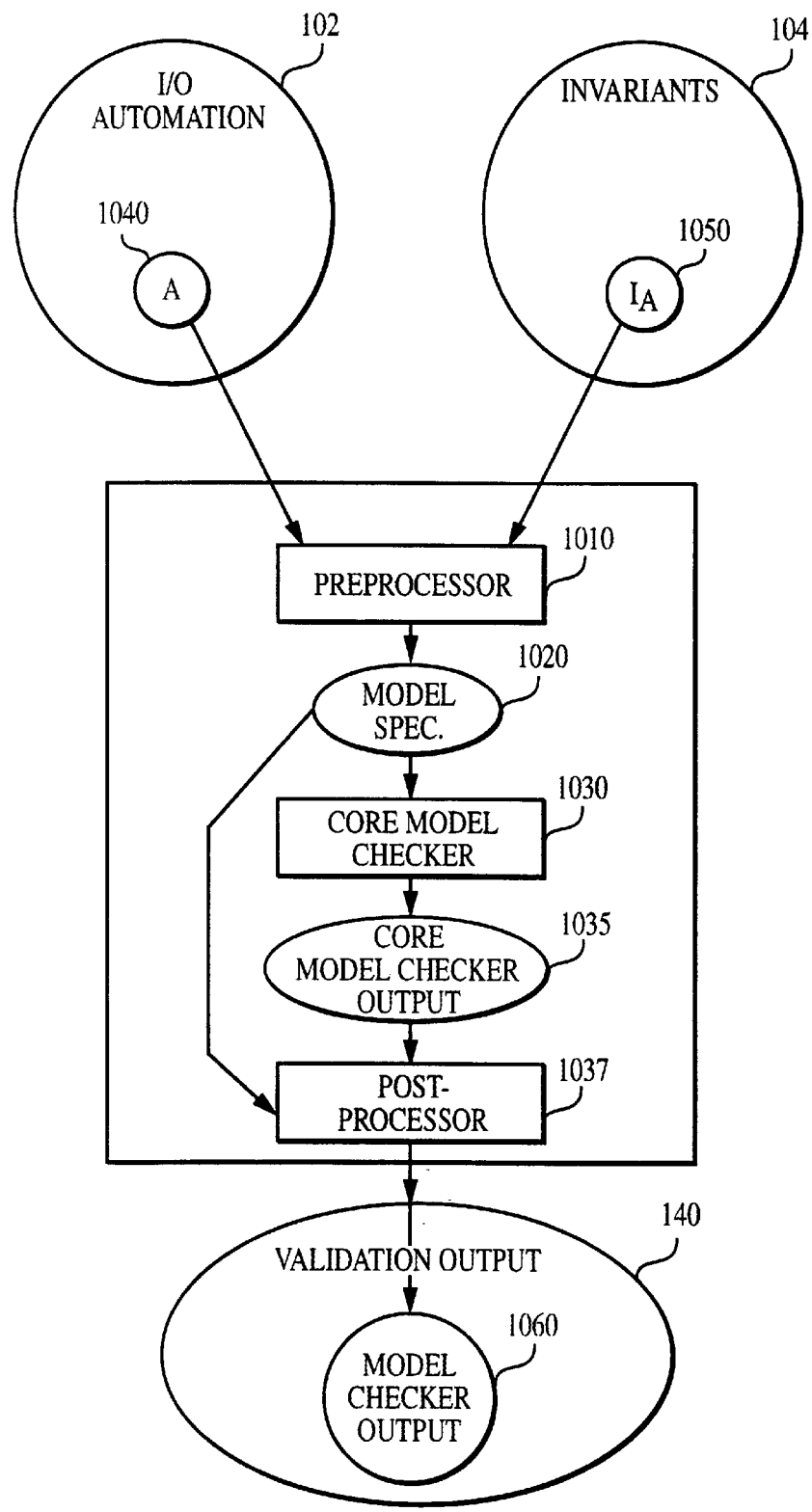
FIG. 10 is an input and output structure of a model checker.

Referring to FIG. 10, model checker 124, one of validation tools 120 shown in FIG. 1, is also used to determine whether an automaton satisfies properties specified by the user. Model checker 124 can determine whether invariants $I_A$ 1050 are satisfied for a primitive automaton A 1040. If A is parameterized, model checker 124 processes the specified automaton A for only one particular choice of parameters. For that automaton A model checker considers all reachable states in turn to determine whether all the properties specified in invariants $I_A$ 1050 are satisfied. If automaton A is parameterized, model checker 124 checks one instance of automaton A at a time. Unlike simulator 126 which considers a sample execution, model checker 124 considers all states. Therefore, the number of states must be small enough to allow this exhaustive search through the states to terminate is a reasonable computing time. Automaton A can be non-deterministic as all states are considered. In this embodiment, due to the capabilities of the core model checker described below, a restricted set of data types are allowed: integers, booleans, and arrays of integers or booleans.

Model checker 124 includes a preprocessor 1010 to process the specifications of automaton A 140 and invariants $I_A$ 1050 and to output model specification 1020. Model specification 1020 is used as input by core model checker 1030 which produces core model checker output 1035. A post-processor 137 takes this output, and model specification 1020 and produces model checker output 1060 in terms of the original specifications of automaton A 1040 and invariants $I_A$ 1050. In this embodiment, core model checker 1030 is a SPIN model checker, and model specification 1020 is specified in the Promela language. Output model specification 1020 includes an operational specification of automaton A 1040, and makes use of explicit constructs of Promela to express nondeterministic choices and atomic sequences of steps such as those implementing the effect part of a transition definition.

In order to prove that all predicates P in $I_A$ 150 are invariants of automaton A 1040, model checker 124 explores all the reachable states of A, verifying that all predicates P are true in each reachable state. Model checker 124 explores the states using a depth-first search. An allowable starting state is first chosen from the set of possibly multiple allowable starting states. Then, an allowable sequence of states is determined by model checker 124, at each state selecting an internal, input, or output action that results in reaching a previously unvisited state. At each state that is visited, model checker evaluates each of the predicates. If any of the predicates is not true, model checker 124 outputs the execution sequence leading up to that state. This execution sequence forms a counterexample to prove that the predicate does not define an invariant of the automaton. When no enabled action at a state would result in making a transition to a previously unvisited state, model checker 124 backtracks to a previous state in the execution for which an enabled transition would result in reaching a previously unvisited state. Ultimately, model checker 124 backtracks to the initial state and selects a previously unvisited starting state. Ultimately, all reachable states of the automaton are visited (for a sufficiently small finite-state automaton) and the predicates are proved to be true for all those reachable states, that is, the properties expressed by the predicates are invariant properties of the automaton.

If A has a sufficiently small number of reachable states and all predicates P express invariants of A, then this procedure terminates in relatively short amount of computing time and model checker output 1060 indicates that all predicates P are true in all reachable states. Even if A has too many states to visit within a reasonable limit on computation (or if the state space is in fact infinite), then model checker 124 can execute until a counterexample is found or a limit on execution time is reached (e.g., the user terminates the procedure). The counterexample associated with the predicate that was shown to be false can be used by the user to amend user specification 100.

Alternative searching strategies, other than depth-first search, can also be used. For example, searching techniques can make use of "symmetries" in the states of an automaton to concurrently test a predicate in multiple states of the automaton.

Figure 11:
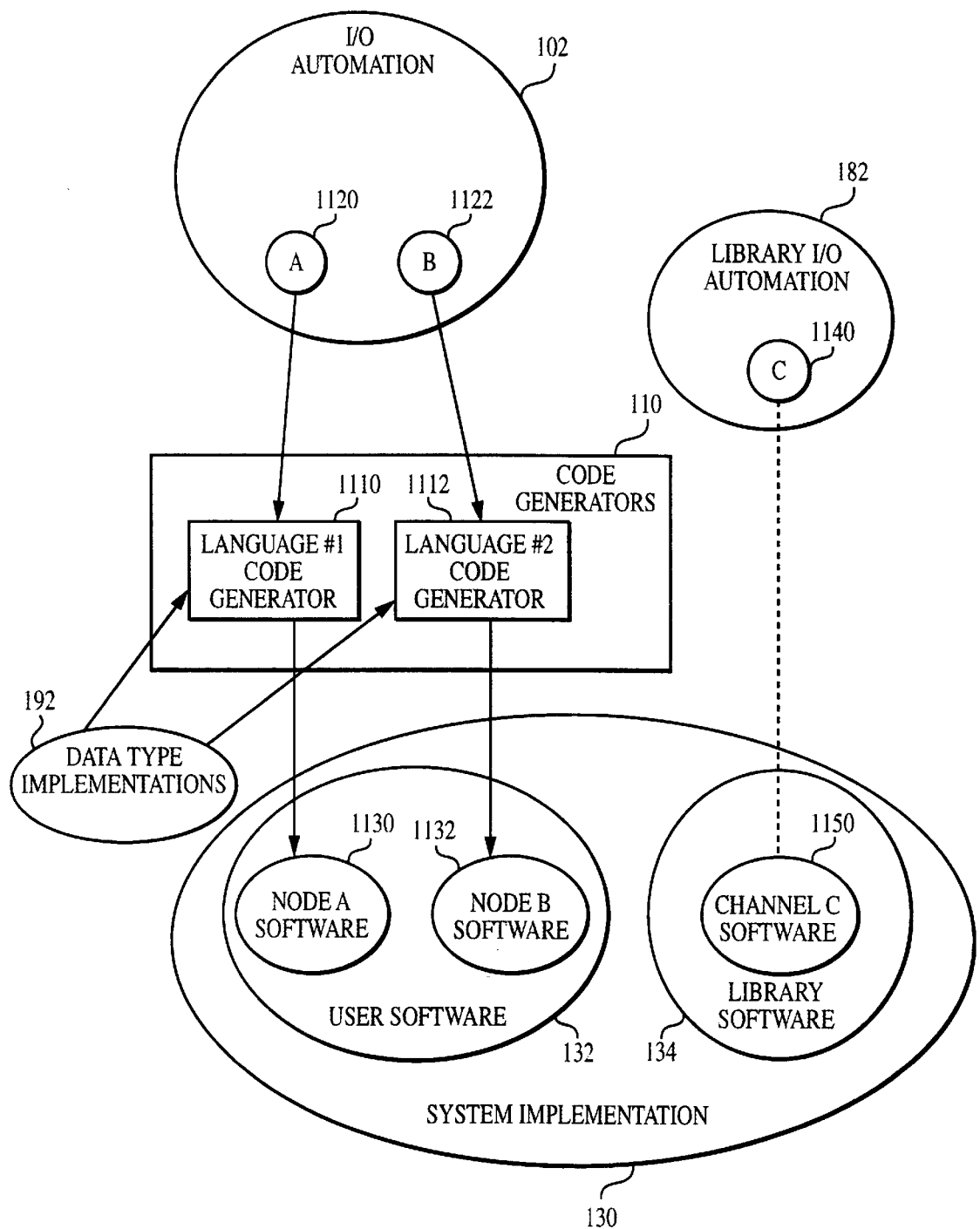
FIG. 11 is an input and output structure of code generators.

Referring to FIG. 11, code generators 110 (shown in FIG. 1) include one or more code generators, each for a different target programming language. In FIG. 11, two representative code generators, language #1 code generator 1110 and language #2 code generator 1112, are shown. A code generator processes a specification of an automaton and produces software in the target programming language. In FIG. 11, language #1 code generator 1110 processes automaton A 1120 and produces node A software 1130. Similarly, language #2 code generator 1112 processes automaton B 1122 and produces node B software 1132. In the illustrated example, automata A and B specify software that will execute on two distributed processing nodes, node A and node B.

Figure 12:
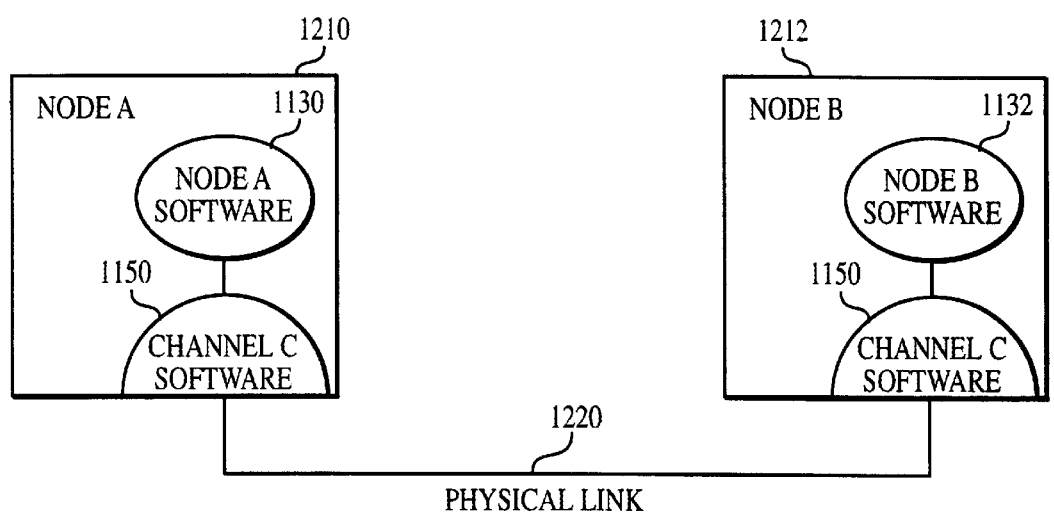
FIG. 12 is two processing nodes executing node and channel software.

Referring to FIG. 12, node A 1210 is linked to node B 1212 over a physical link 1220. Library channel software 1150 provides an interface to node A software 1130 and node B software 1132 that execute on nodes A 1210 and B 1212 respectively. Referring again to FIG. 11, system implementation 130 includes node A software 1130 and node B software 1132, as well as library software 134. Library software 134 is provided by the target software environments on nodes A and B, and includes channel software 1150. Library I/O automata 182 includes a specification of an automaton C 1140 that corresponds to channel C software 1150, however, a code generator is not used to generate channel C software 1150 from the specification of automaton C 1140.

In order to allow direct translation of an automaton specification into a target programming language (e.g., C++, Java), the input automata specifications must satisfy similar restrictions to those that are required for input to simulator 126. In this embodiment, an input automaton must be in primitive form, and be devoid of explicit and implicit nondeterminism. That is, an automaton specification must be essentially a sequential program consisting of non-input actions, and specifications of how to service input actions. Interaction with automata executing on other processing nodes is through communication channel software. This communication channel software provides interfaces to the communication channels represented by automata during the development process. A typical communication channel interface has "send" and "receive" interfaces which provide responses (return values) such as a an acknowledgment or a received message.

In this embodiment, another requirement is imposed on an input automaton to code generators 110. Stated in its strongest, simplest form, each automaton must be "input-delay-insensitive", that is, its external behavior should not change if its input actions are delayed and reordered before processing. This restriction allows the code generators to output software that can introduce delays of input actions. If the input automaton is not input-delay-insensitive, then the actual running system may not truly implement the input automaton.

Code generator 192 uses portions of the same library of data type implementations 192 as simulator 126. For each node automaton, the code generator translates the IOA code into a C++or Java program that performs a simple loop, similar to the one performed by the simulator. Note that correct atomicity requires that the effect part of each transition be done without interruption, even if inputs arrive from the external user or from the communication service during its execution. In this embodiment, the software generated by the code generators buffers inputs, and examines these buffered inputs in between executing non-input actions.

From the above descriptions of the tools that take as input portions of user specification 100, including validation tools 120, code generators 110, and transformation tools 160, it is clear that each tool is not necessarily configured to process specifications using the full IOA language. Various restrictions on the syntax and features of the IOA computer language used in that input are imposed. In addition, various restrictions on the classes of I/O automata that can be processed are also imposed. A user is responsible for expressing the automata in parts of user specification 100 in appropriate sublanguages for the tools that will process those parts of the specification. This use of multiple expressions of a design specifications as an approach to achieving a final validated system implementation is described fully below. A summary of the characteristics of the restricted sublanguages used by various tools is as follows:

Theorem Prover 122: Inputs can make use of the full IOA language, including non-determinism, and procedural or axiomatic specifications of state transitions.

Composer 500: The inputs, which are specifications of automata that together make up the components of the composite automaton, must be "compatible." This requirement includes the constituent automata having no common output actions. Note that as actions can be specified using parameters and "where" clauses that restrict the allowable combinations of parameter values, verifying this condition can be complicated, and may require the user to use theorem prover 122.

Simulator 126: An automaton input to simulator 126, either as input to automaton simulator 910 or as the primary input to paired simulator 920, must not have any explicit or implicit nondeterminism, including having at most one action enabled in any state. Furthermore, the automaton must be specified in primitive form, and "closed" in that it has no input actions. Also, all predicates in the input invariant must be computable, that is, that all quantifiers range over a finite set of values allowing the simulator to test values of the quantifiers. The secondary automaton input to paired simulator 920 must be primitive and closed, but may have explicit or implicit nondeterminism.

Model checker 124: An automaton provided as input to the model checker 124 must be closed and in primitive form. It can be non-deterministic, but cannot have any "so that" statements. In this implementation, the allowed data types are integers, booleans, and arrays of integers or booleans.

Code generators 110: The requirements on an automaton input to one of code generators 110 for translation into a target programming language (e.g., C++or Java) are similar to the requirements for input to simulator 126. The automaton must be in primitive form and devoid of both explicit and implicit nondeterminism. Also, as described previously, each node automaton must be "input-delay-insensitive". Furthermore, depending on the particular code generator used, and the target environment for execution of the generated code, different data types may be supported and different services may be provided by the hosting environment. The automaton specification input to the code generator must be consistent with these restrictions.

A user who is developing an implementation of a distributed system using the above described tools typically develops (i.e., authors or creates using the aid of development tools) multiple related specifications of all or part of the system, all using the IOA language. Each specification is input to one or more tools, and therefore must satisfy the restrictions and requirements of those tools, for example, expressing the specifications in restricted sub-languages of the full-featured IOA language, as outlined above. The user is responsible for satisfying the restrictions. The tools provide support to the user for meeting these restrictions.

The last stage of development of a system within the framework of tools described above involves providing a set of lowest level specifications of automata to code generators 110. Typically, one primitive automaton is used to produce software that executes on one processing node of a distributed system. The software on each of the nodes is configured to interact through communication services provided on the target platforms, for example, using an object oriented interface standard communication service, such as TCP/IP.

A user developing software in the IOA language, and using the tools described above, can use a variety of techniques, including iterative software development. Two types of iterative development that are supported by these tools and language are successive refinement, and decomposition. Combinations of these and other iterative techniques can also be used.

Figure 12A:
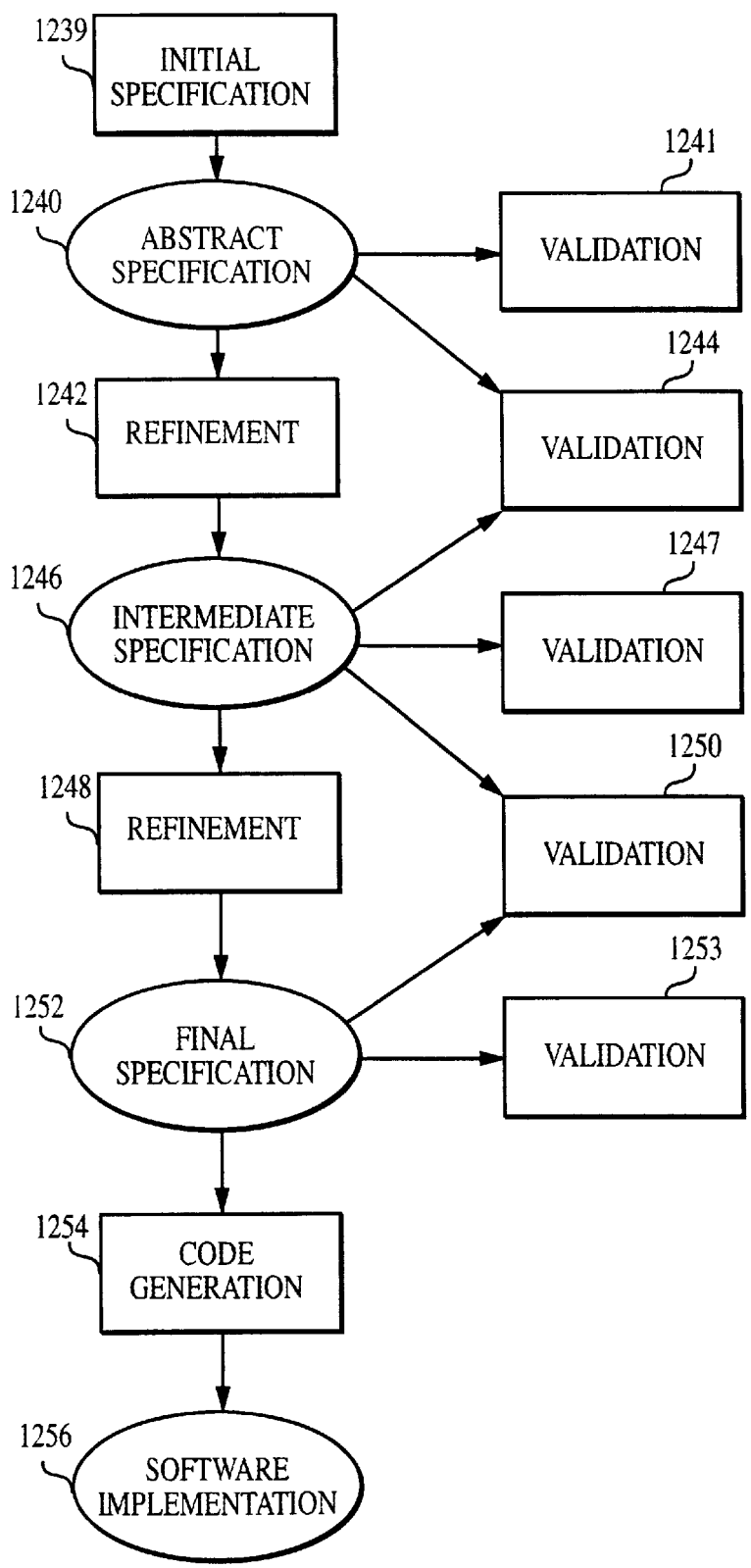
FIG. 12A is a flowchart of a successive refinement software development procedure.

Referring to the exemplary development process illustrated in FIG. 12A, a user can carry out a series of refinement steps to go from an abstract specification to a software implementation. The user first carries out an initial specification step 1239 producing an abstract specification 1240. This abstract specification can, for example, include non-deterministic behavior, and can be parameterized, that is, it can define an entire family of systems, one system for any choice of parameter values. The user carries out a validation step 1241 to verify that abstract specification 1240 truly has desired properties specified in abstract specification 1240. The user then carries out a refinement step 1242 producing an intermediate specification 1246. For example, intermediate specification 1246 may have resolved some of the nondeterminism of abstract specification 1240. The user carries out a validation step 1247 to verify that intermediate specification 1246 has its specified properties. In order to verify that intermediate specification 1246 and abstract specification 1240 are properly related, the user carries out a validation step 1244 taking as input abstract specification 1240 and intermediate specification 1246. For example, validation step 1244 can be used to verify a simulation relationship between automata in the two specifications. This procedure continues with a second refinement step 1248 and validation steps 1253 and 1250 to produce final specification 1252. Final specification uses a restricted sublanguage of IOA that can be processed by code generator 1254 to produce software implementation 1256. Note, that the validation steps themselves may each include a step of transforming a system specification into a form that can be processed by a particular validation tool, such as a simulator, as well as a step to verify that this internal transformation step itself is valid. In this way, the user can validate properties of the system at various levels of abstraction and produce a software implementation that has those properties.

Figure 12B:
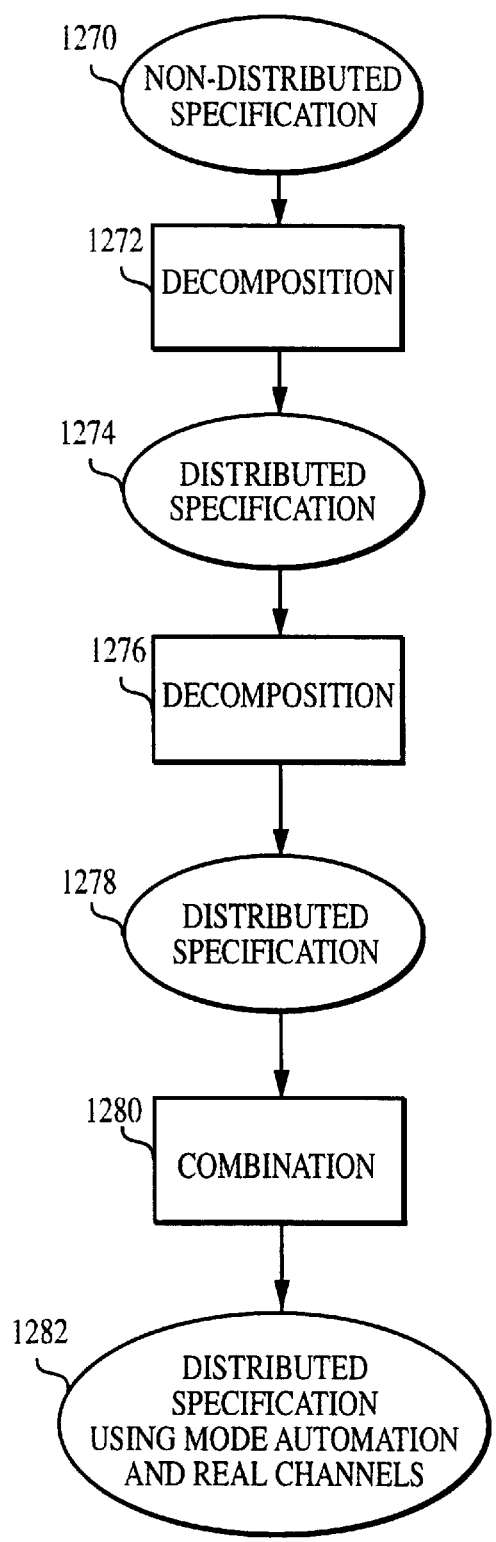
FIG. 12B illustrates a successive decomposition procedure.
Figure 13A:
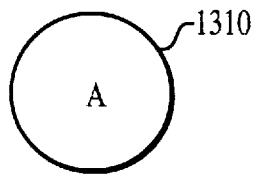
FIGS. 13(a)–(e) is a series of system specifications using abstract and real channels.
Figure 13B:
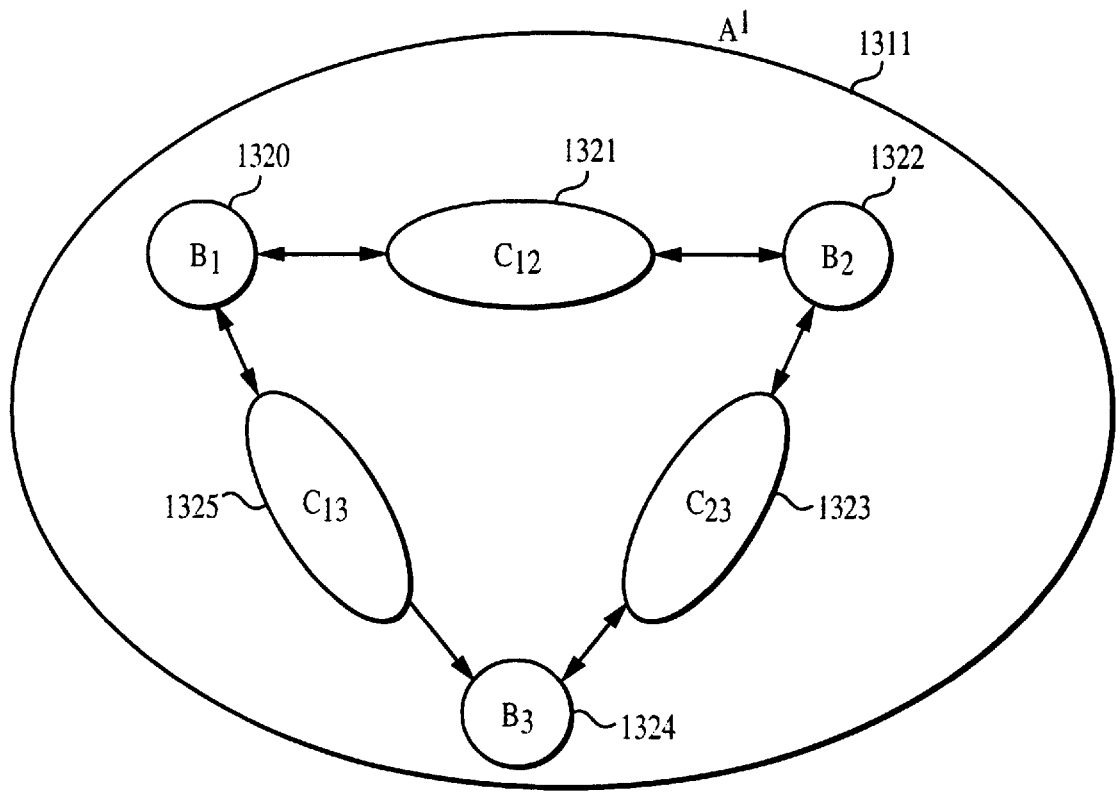
Figure 13C:
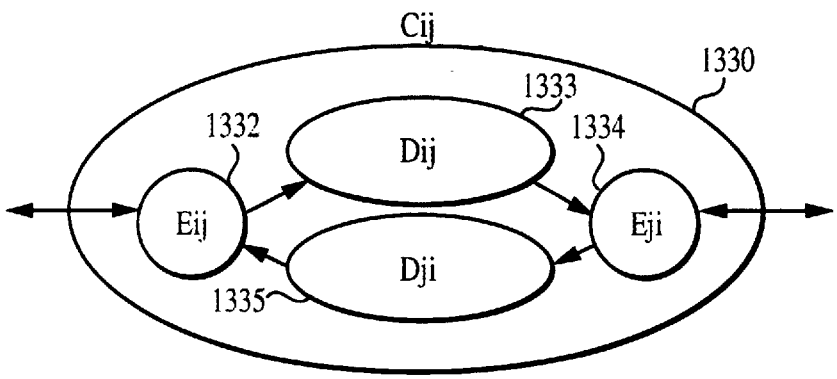
Figure 13D:
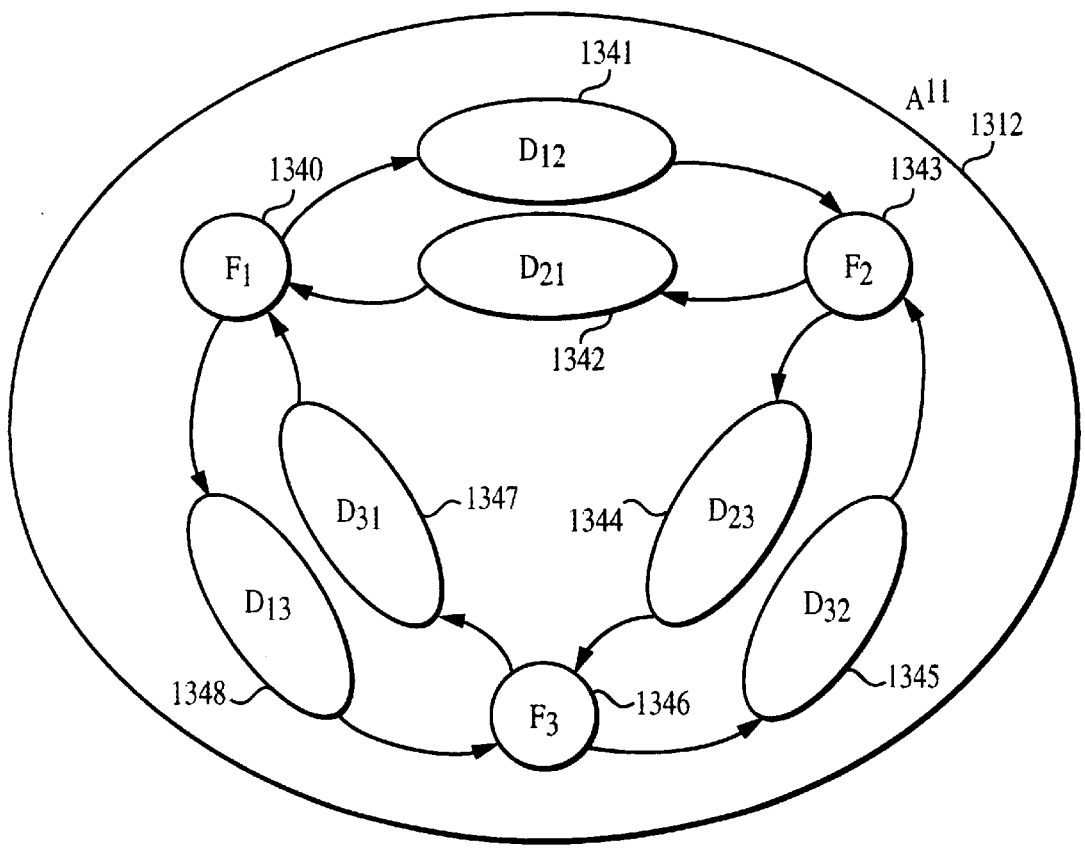
Figure 13E:
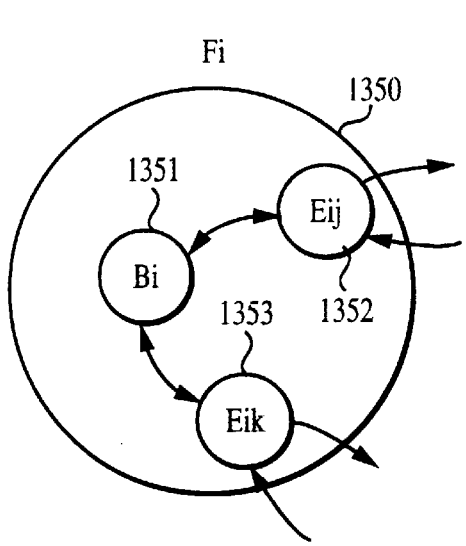

A user can also iteratively specify related systems using different levels of decomposition into interacting components. Referring to the exemplary development process illustrated in FIG. 12B, a user can iteratively decompose portions of a system to yield distributed specifications. Starting with a non-distributed specification 1270 of a system, for instance using a single automaton, a user can perform a decomposition step 1272. The resulting distributed specification 1272 can specify the system using a composition of node automata and abstract channel automata. Such abstract automata can be much simpler than the automata for the real-world channels that are used in the lowest level specification. A second decomposition step 1276 can represent in distributed specification 1278 each abstract channel as a combination of a real channel, and protocol elements which make use of the real channel. Finally in a combination step 1280, the elements which will execute on a single processing node are combined, yielding a distributed specification 1282, for example, with a single automaton for each processing node, coupled to other automata through real channels. As illustrated and described previously with reference to FIG. 12A, a validation step can be applied to each specification, and to the pairs of specifications before and after a transformation (decomposition or combination) step.

Therefore, a user can work towards a lowest level specification of a distributed system in a series of iterations. Each iteration can include one or more of the following operations:

Replacing an automaton with a more detailed automaton or a composition involving two or more interacting automata.

Refining the implementation of an automaton to use a restricted form of the computer language suitable for the code generator, for example, by removing non-deterministic behavior.

Replacing (composing) a composition of two or more automata with a single automaton.

Introducing automata which are implemented by existing components, such as communication services.

Refining the specification of an automaton to improve the efficiency of the system implementation, or to achieve some other implementation restriction.

After inputting an initial abstract specification, and after each iteration in which a new specification is derived, the user can determine whether the system specification has the required invariant properties specified by the user, and, in the case of derivation of a new specification, the user can determine whether the new specification is appropriately related to the previous specification according to a simulation relation provided by the user. As different validation tools have different requirements on a system specification, at any iteration, the user may also have to create specifications of one or more automata related to those in the current system specification (for example, a primitive form of a system specification using a composition of automata) for input to the validation tools.

In addition to modifying user specification 100 in the course of an iterative design approach of the type described above, the user also amends the specifications of automata, invariants, or simulation relations, in response to the output of validation tools 120. For example, if a user specified a detailed automaton that is meant to simulate an abstract automaton, and simulator 126 demonstrates that the detailed automaton does not in fact simulate the detailed automaton, then the user would either amend the specification of the detailed automaton, or amend the specification of the simulation relation between the automata. Therefore, the user also uses the tool set in the course of debugging the system specifications.

As described above, certain tools require that an input automaton come from a restricted class of automata. Two such restrictions are that it is closed (no input actions) and that it is "input-delay-insensitive". The tool set aids the user to derive an automaton in such a restricted class from one that is not necessarily in that class.

Closing an automaton can be accomplished by composing the automaton with an "environment" automaton. Output actions of the environment automaton correspond to the input actions of the first automaton. The environment automaton has no input actions that are not outputs of the initial automaton, and therefore, the composition has no input actions. This composite automaton is then provided as input to the tools that require their inputs to be closed automata. Such an environment automaton can also be used in specifying simulation relationships. In particular, a composition of an automaton A and an environment automaton E can formally implement a composition of an automaton B and the environment E, whereas A itself may not in fact implement B. Environment automaton E can be used to model a system user's behavior, or the interaction of a software system with the software system being designed, and not be used to generate a software implementation.

Verifying properties of an automaton for which the input actions may be reordered, as they may be in an implementation output by code generators 110, can also be addressed using composition. Rather than using the original automaton, the input actions of that automaton are renamed, and then the automaton is composed with a "buffer" automaton. The buffer automaton accepts the input actions of the original automaton, buffers those actions, and provides corresponding (renamed) output actions in a non-deterministic order.

To illustrate the software development process of abstraction, decomposition, and use of abstract channels, a series of systems A, A', and A" are illustrated in FIGS. 13(*a*), (*b*), and (*d*) respectively. Referring to FIG. 13(*a*), initially, the user specifies an automaton A 1310, and validates properties related to this specification.

Referring to FIG. 13(*b*), as an intermediate step in reaching the lowest level of IOA description (with all the restrictions required by the code generators described above), the user next specifies the system as a composition A' 1311 made up of node automata $B_1$ 1310, $B_2$ 1322 and $B_3$ 1324 and abstract channel automata $C_{12}$ 1321, $C_{23}$ 1323 and $C_{13}$ 1325 which provide bidirectional coupling of the node automata. Abstract channel automata can be provided to the user in a library of specifications. Such abstract channels can be simpler than the automata for the real channels (see, for example, the "reliable send/receive channels" defined in Example 8.1.1 of Lynch (1995)).

Referring to FIG. 13(*c*), abstract channel automaton $C_{ij}$ 1330, one of automata $C_{12}$ 1321, $C_{23}$ 1323, or $C_{13}$ 1325, can itself be represented as a composition of automata. In this illustration, channel automata $D_{ij}$ 1333 and $D_{ji}$ 1335 are automata that characterize real unidirectional channels (communication services) and automata $E_{ij}$ 1332 and $E_{ji}$ 1334 are (protocol) automata that make use of the real channels and which provide interfaces to the abstract channel.

Referring to FIG. 13(*d*), a final implementation of the system, composite automaton A" 1312, includes node automata $F_1$ 1340, $F_2$ 1343 and $F_3$ 1346 coupled by channel automata $D_{ij}$, for instance $D_{12}$ 1341 and $D_{21}$ 1342 coupling $F_1$ 1340 and $F_2$ 1343. Referring also to FIG. 13(*e*), each node automaton $F_i$ 1350 (one of $F_1$ 1340, $F_2$ 1343, or $F_3$ 1346) is a primitive automaton which is the composition of node automaton $B_i$ 1351 and protocol automata $E_{ij}$ 1352 and $E_{ik}$ 1352 for j,k≠I. The composed node automata $F_1$ 1340, $F_2$ 1343, and $F_3$ 1346 (in primitive form and with no nondeterminism) are translated by code generators 110 (FIG. 1) into user software expressed in C++, Java, or some other programming language. Real channel automata $D_{ij}$ are not translated by code generators 110 as equivalent functionality is provided on the hosting software environments.

A detailed example of use this type of iteration of specifications is provided in Appendix B of this description. This example describes a trivial banking system having a single bank account that can be accessed from multiple locations. The operations by which the system is accessed are deposits and withdrawals (we assume that the balance can go negative), plus balance queries.

Alternative embodiments of the invention can include other types of validation tools. In addition validation tools, such as theorem prover 122 and model checker 124, can use alternative core tools with corresponding pre- and post-processors to accept IOA specifications and provide output in terms of the input IOA specification. The tools described above can also provide different capabilities as would be known to one skilled in the art. For example, simulator 126 can make random or pseudo-random choices during simulation of an automaton rather than requiring that the input to simulator 126 be deterministic, as in the current embodiment. Additional tools, for instance related to prediction of performance characteristics of a system can also be added to the tools set.

In the embodiment described above, the user is responsible for manually deriving specifications of a system in the course of iterative development or in forming specifications of the system which use a restricted sublanguage that can be processed by a particular development tool. Embodiments of this invention can include interactive tools to aid with these transformations or derivations of system specifications. These tools can be incorporated into an integrated development environment to further aid the software development process. Interactive tools can include an nondeterminism "remover" which, for example, prompts a user to provide a "chooser" function for each instance of a "choose" statement. The non-determinism remover can also prompt the user to provide an "action selector" function to resolve the implicit nondeterminism resulting from multiple non-input actions being enabled in a state, or can aid in incorporating scheduling variables, for example, to implement a round-robin scheduling of actions. In addition, the interactive development tools can make use of a theorem prover to verify that a user has truly modified a system specification to enable only a single action at a state, or to verify that a chooser function provided by a user truly selects a value in the specified choose set.

Although the above embodiments are described in the context of software development for distributed systems in which multiple processing nodes are coupled by communication channels, the tools can also be applied to development of systems with multiple modules which cooperate on a single platform, for example, executing as multiple processes or threads communicating among each other using communication services such as pipes or message mailboxes.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

A portion of the disclosure of this patent document contains material which is subjected to copyright protection. The copyright owner has no objection to the facsimile reproduction by anyone of the patent document or the patent disclosure, as it appears in the Patent and Trademark Office file or records, but otherwise reserves all copyright rights whatsoever.

APPENDIX A

OF APPLICATION FOR

UNITED STATES LETTERS PATENT

TITLE: MODEL-BASED SOFTWARE DESIGN AND VALIDATION

APPLICANT: STEPHEN J. GARLAND and NANCY A. LYNCH

"EXPRESS MAIL" Mailing Label Number EM529185066US

Date of Deposit March 30, 1998
I hereby certify under 37 CFR 1.10 that this correspondence is being deposited with the United States Postal Service as "Express Mail Post Office To Addressee" with sufficient postage on the date indicated above and is addressed to the Assistant Commissioner for Patents, Washington, D.C. 20231.

Lisa G. Gray

IOA: A Language for Specifying, Programming, and Validating
Distributed Systems
Draft Stephen J. Garland, Nancy A. Lynch, and Mandana Vaziri
MIT Laboratory for Computer Science[1]

December 15, 1997

---

[1] Research supported in part by the Advanced Research Projects Agency of the Department of Defense, monitored by the Office of Naval Research under contract N00014-92-J-1795 and by Hanscom Air Force Base under contract F19628-95-C-0018, by the National Science Foundation under grants CCR-9504248 and CCR-9225124, and by the Air Force Office of Scientific Research and the Office of Naval Research under contract F49620-94-1-0199.

Contents

I  IOA Tutorial   1

1 Introduction   1
   1.1 I/O automata . . . . . . . . . . . . . . . . . . . . . . . . . . . . . . . . . . . . . . . . . 1
   1.2 Executions and traces . . . . . . . . . . . . . . . . . . . . . . . . . . . . . . . . . . . 4
   1.3 Operations on automata . . . . . . . . . . . . . . . . . . . . . . . . . . . . . . . . . . 4
   1.4 Properties of automata . . . . . . . . . . . . . . . . . . . . . . . . . . . . . . . . . . . 4

2 Using IOA to formalize descriptions of I/O automata   5

3 Data types in IOA descriptions   7

4 IOA descriptions for primitive automata   8
   4.1 Automaton names and parameters . . . . . . . . . . . . . . . . . . . . . . . . . . . . 8
   4.2 Action signatures . . . . . . . . . . . . . . . . . . . . . . . . . . . . . . . . . . . . . . 8
   4.3 State variables . . . . . . . . . . . . . . . . . . . . . . . . . . . . . . . . . . . . . . . 9
   4.4 Transition relations . . . . . . . . . . . . . . . . . . . . . . . . . . . . . . . . . . . . . 10
      4.4.1 Transition parameters . . . . . . . . . . . . . . . . . . . . . . . . . . . . . . . 10
      4.4.2 Preconditions . . . . . . . . . . . . . . . . . . . . . . . . . . . . . . . . . . . . 10
      4.4.3 Effects . . . . . . . . . . . . . . . . . . . . . . . . . . . . . . . . . . . . . . . . 11
      4.4.4 Choose parameters . . . . . . . . . . . . . . . . . . . . . . . . . . . . . . . . . 15
   4.5 Tasks . . . . . . . . . . . . . . . . . . . . . . . . . . . . . . . . . . . . . . . . . . . . 16

5 IOA notations for operations on automata   17
   5.1 Composition . . . . . . . . . . . . . . . . . . . . . . . . . . . . . . . . . . . . . . . . 17
   5.2 Specialization . . . . . . . . . . . . . . . . . . . . . . . . . . . . . . . . . . . . . . . . 19
   5.3 Hiding . . . . . . . . . . . . . . . . . . . . . . . . . . . . . . . . . . . . . . . . . . . . 19

6 IOA descriptions of properties of automata   19
   6.1 Invariants . . . . . . . . . . . . . . . . . . . . . . . . . . . . . . . . . . . . . . . . . . 20
   6.2 Simulation relations . . . . . . . . . . . . . . . . . . . . . . . . . . . . . . . . . . . . 20

II  IOA Data Types   22

7 Built-in simple types   22
   7.1 Booleans . . . . . . . . . . . . . . . . . . . . . . . . . . . . . . . . . . . . . . . . . . 22
   7.2 Integers . . . . . . . . . . . . . . . . . . . . . . . . . . . . . . . . . . . . . . . . . . . 22
   7.3 Natural numbers . . . . . . . . . . . . . . . . . . . . . . . . . . . . . . . . . . . . . . 23
   7.4 Real numbers . . . . . . . . . . . . . . . . . . . . . . . . . . . . . . . . . . . . . . . . 23
   7.5 Characters . . . . . . . . . . . . . . . . . . . . . . . . . . . . . . . . . . . . . . . . . 23
   7.6 Strings . . . . . . . . . . . . . . . . . . . . . . . . . . . . . . . . . . . . . . . . . . . . 23

| | | |
|---|---|---|
| 8 | Built-in type constructors | 24 |
| 8.1 | Arrays | 24 |
| 8.2 | Sets | 24 |
| 8.3 | Multisets | 24 |
| 8.4 | Sequences | 24 |
| 8.5 | Mappings | 25 |

| | | |
|---|---|---|
| III | IOA: a Larch specification language | 26 |
| 9 | Data type specification in LSL | 27 |
| 9.1 | Algebraic specifications | 27 |
| 9.2 | Stronger specifications | 29 |
| 9.3 | Combining specifications | 30 |
| 9.4 | Renaming | 31 |
| 9.5 | Stating intended consequences | 31 |
| 9.6 | Recording assumptions | 33 |
| 9.7 | Built-in operators and overloading | 35 |
| 9.8 | Shorthands | 36 |

| | | |
|---|---|---|
| IV | IOA Reference Manual | 38 |
| 10 | Lexical syntax | 38 |
| 11 | Automaton definitions | 39 |
| 12 | Type definitions | 40 |
| 13 | Primitive automata | 40 |
| 13.1 | Primitive automaton definitions | 40 |
| 13.2 | Automaton states | 41 |
| 13.3 | Automaton transitions | 42 |
| 13.4 | Automaton tasks | 44 |
| 14 | Operations on automata | 45 |
| 15 | Statements about automata | 46 |

| | | |
|---|---|---|
| V | LSL Reference Manual | 47 |
| 16 | Lexical syntax | 47 |
| 17 | Traits | 47 |
| 18 | Sort and operator declarations | 47 |
| 19 | Axioms | 49 |

| | |
|---|---:|
| 20 Shorthands for sorts | 50 |
| 21 Trait references | 50 |
| 22 Consequences | 52 |

Part I
IOA Tutorial

The Input/Output (I/O) automaton model, developed by Nancy Lynch and Mark Tuttle [8], models components in asynchronous concurrent systems as labeled transition systems. Lynch's book, *Distributed Algorithms* [7], describes many algorithms in terms of I/O automata and contains proofs of various properties of these algorithms.

IOA is a precise language for describing I/O automata and for stating their properties. It extends and formalizes the descriptive notations used in *Distributed Algorithms*, uses Larch specifications [6] to define the semantics of abstract data types and I/O automata, and supports a variety of analytic tools. These tools range from light weight tools, which check the syntax of automaton descriptions, to medium weight tools, which simulate the action of an automaton, and to heavier weight tools, which provide support for proving properties of automata.

The document is organized as follows. Part I contains an informal introduction to I/O automata and a tutorial for IOA. The tutorial consists largely of examples that illustrate different aspects of the language; reading it should be sufficient to begin writing complete IOA descriptions. Part II describes the data types available for use in IOA descriptions. Part III describes the use of Larch in formalizing the semantics of IOA. Finally, Parts IV and V present the formal syntax and semantics of the language.

1 Introduction

I/O automata provide a mathematical model suitable for describing asynchronous concurrent systems. The model provides a precise way of describing and reasoning about system components that interact with each other and that operate at different speeds. It also permits components that have been described as I/O automata to be composed into larger automata.

1.1 I/O automata

An I/O automaton is a simple type of state machine in which the transitions are associated with named *actions*. The actions are classified as either *input*, *output*, or *internal*. The inputs and outputs are used for communication with the automaton's environment, whereas internal actions are visible only to the automaton itself. The input actions are assumed not to be under the automaton's control, whereas the automaton itself controls which output and internal actions should be performed.

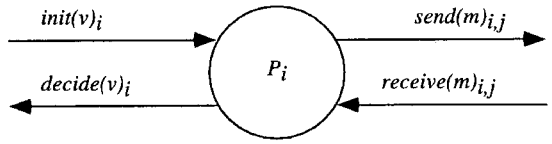

Figure 1: A process

A typical example[1] of an I/O automaton is a process in an asynchronous distributed system.

---

[1]This example is essentially the same as the example in *Distributed Algorithms* [7], Chapter 8.

Figure 1 shows the interface of one such process. The circle represents the automaton, named $P_i$, where $i$ is a process index, and the arrows represent input and output actions. An incoming arrow is an input action, and an outgoing arrow is an output action. Internal actions are not shown. Process $P_i$ can receive inputs of the form $init(v)_i$, each of which represents the receipt of an input value $v$, and it can produce outputs of the form $decide(v)_i$, each of which represents a decision on the value of $v$. In order to reach a decision, process $P_i$ may communicate with other processes using a message passing system. $P_i$'s interface to the message system consists of output actions of the form $send(m)_{i,j}$, each of which represents sending a message $m$ to some process named $P_j$, and input actions of the form $receive(m)_{i,j}$, each of which represents receiving a message $m$ from process $P_j$. When $P_i$ performs any of the indicated actions (or any internal action), it may also change state.

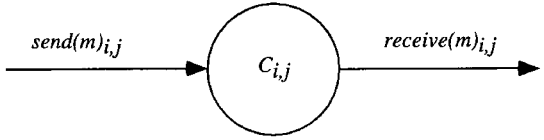

Figure 2: A channel

Another example of an I/O automaton is a FIFO message channel. Figure 2 shows the interface of a typical channel automaton, $C_{i,j}$, where $i$ and $j$ are process indices. Its input actions have the form $send(m)_{i,j}$, and its output actions have the form $receive(m)_{i,j}$.

Process and channel automata can be composed as shown in Figure 3, by matching the output actions of one automaton with the input actions of another. Thus, each output action $send(m)_{i,j}$ of a process automaton is matched and performed together with an input action $send(m)_{i,j}$ of some channel automaton, and each input action $receive(m)_{i,j}$ of a process automaton is matched and performed together with an output action $receive(m)_{i,j}$ of some other channel automaton. Actions are performed one at a time, indivisibly, in any order.

More precisely, an I/O automaton $A$ consists of the following five components:

- a *signature*, which lists the disjoint sets of input, output, and internal actions of $A$,

- a (not necessarily finite) set of *states*, usually described by a collection of state variables,

- a set of *start* (or *initial*) *states*, which is a non-empty subset of the set of all states,

- a *state-transition relation*, which contains triples (known as *steps* or *transitions*) of the form (state, action, state), and

- an optional set of *tasks*, which partition the internal and output actions of $A$.

An action $\pi$ is said to be *enabled* in a state $s$ if there is another state $s'$ such that $(s, \pi, s')$ is a transition of the automaton. Input actions are enabled in every state; i.e., automata are not able to "block" input actions from occurring. The *external* actions of an automaton consist of its input and output actions.

The transition relation is usually described in *precondition-effect* style, which groups together all transitions that involve a particular type of action into a single piece of code. The precondition is a predicate on the state indicating the conditions under which the action is permitted to occur. The effect describes the changes that occur as a result of the action, either in the form of a simple

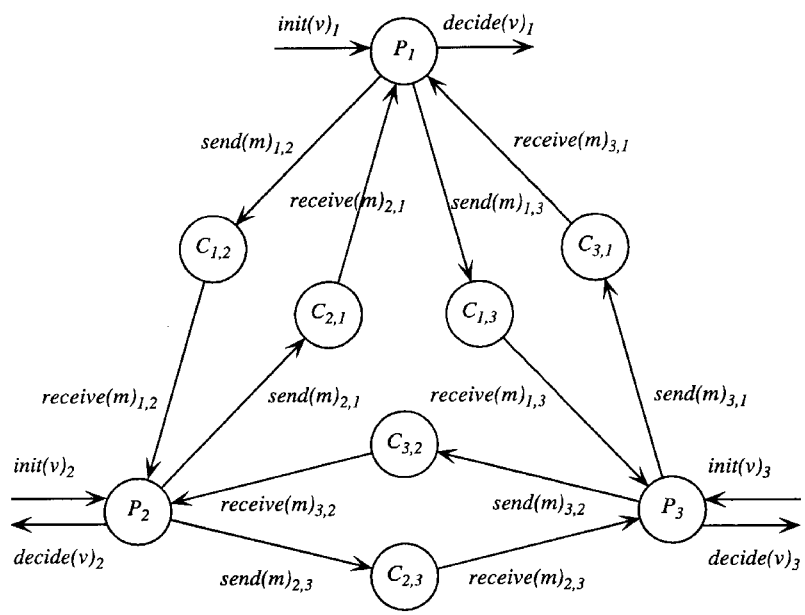
Figure 3: Composing channel and process automata program or in the form of a predicate relating the pre-state and the post-state (i.e., the states before and after the action occurs). Actions are executed indivisibly.

1.2 Executions and traces

An *execution fragment* of an I/O automaton is either a finite sequence $s_0, \pi_1, s_1, \pi_2, \ldots, \pi_n, s_n$, or an infinite sequence $s_0, \pi_1, s_1, \pi_2, \ldots$, of alternating states $s_i$ and actions $\pi_i$ such that $(s_i, \pi_{i+1}, s_{i+1})$ is a transition of the automaton for every $i \geq 0$. An *execution* is an execution fragment that begins with a start state. A state is *reachable* if it occurs in some execution. The *trace* of an execution is the sequence of external actions in that execution.

The task partition is an abstract description of "tasks" or "threads of control." It is used to define *fairness conditions* on an execution of the automaton; these conditions require the automaton to continue, during its execution, to give fair turns to each of its tasks. A task is said to be *enabled* in a state if some action in the task is enabled in that state. In a *fair execution*, whenever some task remains enabled, some action in that task will eventually be performed. Thus, in fair executions, actions in one task partition do not prevent actions in another from occurring. If no task partition is specified, then all actions are assumed to belong to a single task.

1.3 Operations on automata

The operation of *composition* allows an automaton representing a complex system to be constructed by composing automata representing individual system components. The composition identifies actions with the same name in different component automata. When any component automaton performs a step involving an action $\pi$, so do all component automata that have $\pi$ in their signatures. The *hiding* operation "hides" output actions of an automaton by reclassifying them as internal actions; this prevents them from being used for further communication and means that they are no longer included in traces. The *renaming* operation changes the names of an automaton's actions, to facilitate composing that automaton with others that were defined with different naming conventions.

1.4 Properties of automata

An *invariant* of an automaton is any property that is true in all reachable states of the automaton.

An automaton $A$ is said to *implement* an automaton $B$ provided that $A$ and $B$ have the same input and output actions and that every trace of $A$ is a also trace of $B$. In order to show that $A$ implements $B$, one can use a *simulation relation*, as follows.

For the purpose of the following definitions, we assume that $A$ and $B$ have the same input and output actions. A relation $R$ between the states of $A$ and $B$ is a *forward simulation*[2] with respect to invariants $I_A$ and $I_B$ of $A$ and $B$ if

- every start state of $A$ is related (via $R$) to a start state of $B$, and

- for all states $s$ of $A$ and $u$ of $B$ satisfying the invariants $I_A$ and $I_B$ such that $R(s, u)$, and for every step $(s, \pi, s')$ of $A$, there is an execution fragment $\alpha$ of $B$ starting with $u$, containing the same external actions as $\pi$, and ending with a state $u'$ such that $R(s', u')$.

A general theorem is that $A$ implements $B$ if there is a forward simulation from $A$ to $B$.

---

[2]In some previous work such relations are called *weak* forward simulations.

Similarly, a relation $R$ between the states of $A$ and $B$ is a *backward simulation*[3] with respect to invariants $I_A$ and $I_B$ of $A$ and $B$ if

- every state of $A$ that satisfies $I_A$ corresponds (via $R$) to some state of $B$ that satisfies $I_B$,

- if a start state $s$ of $A$ is related (via $R$) to a state $u$ of $B$ that satisfies $I_B$, then $u$ is a start state of $B$, and

- for all states $s, s'$ of $A$ and $u'$ of $B$ satisfying the invariants such that $R(s', u')$, and for every step $(s, \pi, s')$ of $A$, there is an execution fragment $\alpha$ of $B$ ending with $u'$, containing the same external actions as $\pi$, and starting with a state $u$ satisfying $I_B$ such that $R(s, u)$.

Another general theorem is that $A$ implements $B$ if there is an *image-finite* backward simulation from $A$ to $B$. Here, a relation $R$ is image-finite provided that for any $x$ there are only finitely many $y$ such that $R(x, y)$. Moreover, the existence of any backward simulation from $A$ to $B$ implies that all finite traces of $A$ are also traces of $B$.

2 Using IOA to formalize descriptions of I/O automata

We illustrate the nature of I/O automata, as well as the use of the language IOA to define the automata, by a few simple examples. Figure 4 contains a simple IOA description for an automaton, Adder, that gets two integers as input and subsequently outputs their sum. The first line declares the name of the automaton. The remaining lines define its components. The signature consists of input actions add(i, j), one for each pair of values of i and j, and output actions result(k), one for each value of k. The type Int, used to represent integers, is a built-in type in IOA (see Section 7.2).

```
automaton Adder
  signature
    input   add(i, j: Int)
    output  result(k: Int)
  states
    value: Int,
    ready: Bool := false
  transitions
    input add(i, j)
      eff value := i + j;
          ready := true
    output result(k)
      pre k = value ∧ ready
      eff ready := false
```

Figure 4: IOA description of an adder

The automaton Adder has two state variables: value is an integer that is used to hold a sum, and ready is a boolean that is set to true whenever a new sum has been computed. The initial value of value is arbitrary since it is not specified; ready is initially false.

---
[3]In some previous work such relations are called *weak* backward simulations.

```
automaton Channel(M, Index: type, i, j: Index)
  signature
    input  send(m: M, const i, const j)
    output receive(m: M, const i, const j)
  states
    buffer: Seq[M] := {}
  transitions
    input send(m, i, j)
      eff buffer := buffer ⊢ m
    output receive(m, i, j)
      pre buffer ≠ {} ∧ m = head(buffer)
      eff buffer := tail(buffer)
```

Figure 5: IOA description for a reliable communication channel

The transitions of the automaton Adder are given in precondition-effect style. The input action add(i, j) has no precondition, which is equivalent to its having true as a precondition. This is the case for all input actions; i.e., every input action in every automaton is enabled in every state. The effect of add(i, j) is to change value to the sum of i and j and to set ready to true. The output action result(k) can occur only when it is enabled, that is, only in states where its precondition k = value ∧ ready is true. Its effect is to set ready back to false. Traces of Adder are sequences of external actions such as add(3, 2), result(5), add(1, 2), add(-1, 1), result(0), ...

that start with an add action, in which every result action returns the sum computed by the last add action, and in which every pair of result actions must be separated by one or more add actions.

Another simple automaton, Channel, is shown in Figure 5. This automaton represents a reliable communication channel, as illustrated in Figure 2, which neither loses nor reorders messages in transit. The automaton is parameterized by the type M of messages that can be in transit on the channel, by the type Index of process indices, and by two values, i and j, which represent the indices of processes that use the channel for communication. The signature consists of input actions, send(m, i, j), and output actions, receive(m, i, j), one for each value of m. The keyword const in the signature indicates that the values of i and j in these actions are fixed by the values of the automaton's parameters.

The state of the automaton Channel consists of a buffer, which is a sequence of messages (i.e., an element of type Seq[M]) initialized to the empty sequence {}. Precise meanings for the type constructor Seq, for sequences of type Seq[M], and for operators on sequences such as {}, ⊢, head, and tail, can be found in Section 8.4.

The input action send(m, i, j) has the effect of appending m to buffer (here, ⊢ is the append operator). The output action receive(m, i, j) is enabled when buffer is not empty and has the message m at its head. The effect of this action is to remove the head element from buffer.

The rest of Part I shows in more detail how IOA can be used to describe I/O automata.

3 Data types in IOA descriptions

IOA enables users to define the actions and states of I/O automata abstractly, using mathematical notations for sets, sequences, etc., without having to provide concrete representations for these abstractions. Some mathematical notations are built into IOA; others can be defined by the user.

The data types Bool, Int, Nat, Real, Char, and String can appear in IOA descriptions without explicit declarations. Section 7 describes the operators available for each of these types.

Compound data types can be constructed using the following type constructors and used without explicit declarations. Section 8 describes the operators available for types constructed in any of these fashions.

- Array[I, E] is an array of elements of type E indexed by elements of type I.

- Map[D, R] is a finite partial mapping of elements of a domain type D to elements of a range type R. Mappings differ from arrays in that their domains are always finite, and in that they may not be totally defined.

- Seq[E] is a finite sequence of elements of type E.

- Set[E] is a finite set of elements of type E.

- Mset[E] is a finite multiset of elements of type E.

In this tutorial, we describe operators on the built-in data types informally when they first appear in an example.

Users can define additional data types, as well as additional operators on the built-in types, in one of two ways. First, they can explicitly declare enumeration, tuple, and union types analogous to those found in many common programming languages. For example,

```
type Color = enumeration of red, white, blue
type Msg   = tuple of source, dest: Process, contents: String
type Fig   = union of sq: Square, circ: Circle
```

Section 9.8 describes the operators available for each of these types. Second, users can refer to an auxiliary specification that defines the syntax and semantics of the new data type and/or operators, as in

```
uses Stack(E)
uses IntMod(n)
```

These auxiliary specifications are written in the *Larch Shared Language* (*LSL*); see Section III.

In this report, some operators are displayed using mathematical symbols that do not appear on the standard keyboard. The following tables show the input conventions for entering these symbols. The standard meanings of the logical operators are built into LSL and IOA. The meanings of the datatype operators are defined by the LSL specifications for the built-in datatypes in Section III.

| Logical Operator | | | Datatype Operator | | |
|---|---|---|---|---|---|
| Symbol | Meaning | Input | Symbol | Meaning | Input |
| $\forall$ | For all | \A | $\leq$ | Less than or equal | <= |
| $\exists$ | There exists | \E | $\geq$ | Greater than or equal | >= |
| $\neg$ | Not | ~ | $\in$ | Member of | \in |
| $\neq$ | Not equals | ~= | $\notin$ | Not a member of | \notin |
| $\wedge$ | And | /\ | $\subset$ | Proper subset of | \subset |
| $\vee$ | Or | \/ | $\subseteq$ | Subset of | \subseteq |
| $\Rightarrow$ | Implies | => | $\supset$ | Proper superset of | \supset |
| $-$ | If and only if | <=> | $\supseteq$ | Superset of | \supseteq |
| | | | $\vdash$ | Append element | \|- |
| | | | $\dashv$ | Prepend element | -\| |

4 IOA descriptions for primitive automata

Primitive automata (i.e., automata without subcomponents) are described by specifying their names, action signatures, state variables, transition relations, and task partitions. All but the last of these elements must be present in every primitive automaton description.

4.1 Automaton names and parameters

The first line of an automaton description consists of the keyword automaton followed by the name of the automaton (see Figures 4 and 5). As illustrated in Figure 5, the name may be followed by a list of formal parameters enclosed within parentheses. Each parameter consists of an identifier with its associated type (or, as in Figure 5, with the keyword type to indicate that the identifier names a type rather than an element of a type).[4]

4.2 Action signatures

The signature for an automaton is declared in IOA using the keyword signature followed by lists of entries describing the automaton's input, internal, and output actions. Each entry contains a name and an optional list of parameters enclosed in parentheses. Each parameter consists of an identifier with its associated type, or of an expression following the keyword const; entries cannot have type parameters. Each entry in the signature denotes a set of actions, one for each assignment of values to its non-const parameters.

It is possible to place constraints on the values of the parameters for an entry in the signature using the keyword where followed by a predicate, that is, by a boolean-valued expression. Such constraints restrict the set of actions denoted by the entry. For example, the signature

```
signature
    input  add(i, j: Int) where i > 0 /\ j > 0
    output result(k: Int) where k > 1
``` could have been used for the automaton Adder to restrict the values of the input parameters to positive integers and the value of the output parameter to integers greater than 1.

---
[4] Later versions of IOA may also allow us to parameterize automata by operations (e.g., ordering relations) on a data type.

4.3 State variables

As in the above examples, state variables are declared using the keyword states followed by a comma-separated list of state variables and their types. State variables can be initialized using the assignment operator := followed by an expression or by a nondeterministic choice. The order in which state variables are declared makes no difference: state variables are initialized simultaneously, and the initialization given for one state variable cannot refer to the value of any other state variable.

A nondeterministic choice, indicated by the keyword choose following the assignment operator :=, selects an arbitrary value for the named variable that satisfies the predicate following the keyword where. When a nondeterministic choice is used to initialize a state variable, there must be some value of the named variable that satisfies this predicate. If this predicate is true for all values of the named variable, then the effect is the same as if no initial value had been specified for the state variable.

```
automaton Choice
  signature
    output result(i: Int)
  states
    num:  Int  := choose n where 1 ≤ n ∧ n ≤ 3,
    done: Bool := false
  transitions
    output result(i)
      pre ¬done ∧ i = num
      eff done := true
```

Figure 6: Example of nondeterministic choice of initial value for state variable For example, in the automaton Choice (Figure 6), the state variable num is initialized nondeterministically to some value of the variable n that satisfies the predicate $1 \leq n \land n \leq 3$, i.e., to one of the values 1, 2, or 3 (the value of n must be an integer because it is constrained to have the same type, Int, as the variable num to which it will be assigned). The automaton Choice can return the selected value at most once in an output action.

It is also possible to constrain the initial values of all state variables taken together, whether or not initial values are assigned to any individual state variable. This can be done using the construct so that followed by a predicate (involving state variables and automaton parameters), as illustrated by the definition of the automaton Shuffle in Figure 7.[5] Here, the initial values of the variable cut and the array name of strings are constrained so that name[1], ..., name[52] are sorted in two pieces, each in increasing order, with the piece after the cut containing smaller elements than the piece before the cut. Note that the scope of the so that clause is the entire set of state variable declarations.

In Figure 7, values of type Array[cardIndex, String] are arrays indexed by elements of type cardIndex and containing elements of type String (see Section 8.1). The swap actions transpose pairs of strings, until a deal action announces the contents of the array; then no further actions occur. Note that the constraint following so that limits only the initial values of the state variables, not their subsequent values.

When the type of a state variable is an Array or a tuple (Section 9.8), IOA also treats the ---
[5]At present, users must expand the ... in the definition of the type cardIndex by hand; IOA will eventually provide more convenient notations for integer subranges.

elements of the array or the fields in the tuple as state variables, to which values can be assigned without affecting the values of the other elements in the array or fields in the tuple.

4.4 Transition relations

Transitions for the actions in an automaton's signature are defined following the keyword transitions. A transition definition consists of an action type (i.e., input, internal, or output), an action name with optional parameters and an optional where clause, an optional list of additional "choose parameters," an optional precondition, and an optional effect.

4.4.1 Transition parameters

The parameters accompanying an action name in a transition definition must match those accompanying the name in the automaton's signature, both in number and in type. However, parameters take a simpler form in a transition definition than they do in the signature. The simplest way to construct the parameter list for an action name in a transition definition is to erase the keyword const and the type modifiers from the parameter list in the signature; thus, in Figure 5,

```
input send(m: M, const i, const j)
``` in the signature of Channel is shortened to input send(m, i, j) in the transition definition. See Section 13.3 for the actual set of rules.

More than one transition definition can be given for an entry in an automaton's signature. For example, the transition definition for the swap actions in the Shuffle automaton (Figure 7) can be split into two components:

```
internal swap(i, j) where i ≠ j
  pre ¬dealt
  eff temp := name[i];
      name[i] := name[j];
      name[j] := temp
internal swap(i, i)
  pre ¬dealt
```

The second of these two transition definitions does not change the state, because it has no eff clause.

4.4.2 Preconditions

A precondition can be defined for a transition of an output or internal action using the keyword pre followed by a predicate, that is, by a boolean-valued expression. Preconditions cannot be defined for transitions of input actions. All variables in the precondition must be parameters of the automaton, be state variables, appear in the parameter list for the transition definition, be choose parameters, or be quantified explicitly in the precondition. If no precondition is given, it is assumed to be true.

An action is said to be *enabled* in a state if the precondition for its transition definition is true in that state for some values of the choose parameters. Input actions, whose transitions have no preconditions, are always enabled.

4.4.3 Effects

The effect of a transition, if any, is defined following the keyword eff. This effect is generally defined in terms of a (possibly nondeterministic) program that assigns new values to state variables. The amount of nondeterminism in a transition can be limited by a predicate relating the values of state variables in the post-state (i.e., in the state after the transition has occurred) to each other and to their values in the pre-state (i.e., in the state before the transition occurs).

If the effect is missing, then the transition has none; i.e., it leaves the state unchanged.

Using programs to specify effects A program is a list of statements, separated by semicolons. Statements in a program are executed sequentially. There are three kinds of statements:

- assignment statements,
- conditional statements, and
- for statements.

*Assignment statements* An assignment statement changes the value of a state variable. The statement consists of a state variable followed by the assignment operator := and either an expression or a nondeterministic choice (indicated by the keyword choose). (As noted in Section 4.3, the elements in an array used as a state variable, or the fields in a tuple used as a state variable, are themselves considered as separate state variables and can appear on the left side of the assignment operator.)

The expression or nondeterministic choice in an assignment statement must have the same type as the state variable. The value of the expression is defined mathematically, rather than computationally, in the state before the assignment statement is executed (Section III). The value of the expression then becomes the value of the state variable in the state after the assignment statement is executed. Execution of an assignment statement does not have side-effects; i.e., it does not change the value of any state variable other than that on the left side of the assignment operator.

The definition of the crash action in the LossyChannel automaton (Figure 8) illustrates the use of the choose ... where construct to constrain the new value of the state variable buffer to be a nondeterministically chosen subsequence of the old value. LossyChannel is a modification of the reliable communication channel (Figure 5) in which the additional input action crash may cause the sequence buffer to lose messages (but not to reorder them).

The keyword uses at the beginning of Figure 8 identifies an auxiliary specification (Figure 9) that defines the subsequence relation $\preceq$ appearing in the definition of transitions for the crash action. This relation is not one of the built-in operators provided by IOA for the sequence data type (Section 8.4). Hence, only by reference to an auxiliary specification can we determine the properties of $\preceq$, namely, that a subsequence does not reorder elements, and that it need not contain consecutive elements from the larger sequence. Figure 19 conveys this information by presenting a recursive definition for $\preceq$. Section III provides more information about how to read such auxiliary specifications.

An abbreviated form of nondeterministic choice can be used in the assignment statement to express the fact that a transition can change the value of a state variable, without specifying what the new value may be. Such a nondeterministic choice consists of the keyword choose alone, without a subsequent variable or where clause. The statement x := choose is equivalent to the somewhat longer statement x := choose y where true. Both of these statements give a

```
automaton Shuffle
  type cardIndex = enumeration of 1, 2, 3, ..., 52
  signature
    internal swap(i, j: cardIndex)
    output  deal(a: Array[cardIndex, String])
  states
    dealt: Bool := false,
    name:  Array[cardIndex, String],
    cut:   cardIndex,
    temp:  String
    so that ∀ i: cardIndex (i ≠ 52 ∧ i ≠ cut ⇒ name[i] < name[succ(i)])
             ∧ name[52] < name[1]
  transitions
    internal swap(i, j)
      pre ¬dealt
      eff  temp := name[i];
           name[i] := name[j];
           name[j] := temp
    output deal(a)
      pre ¬dealt ∧ a = name
      eff dealt := true
```

Figure 7: Example of a constraint on initial values for state variables

```
automaton LossyChannel(M: type)
  uses Subsequence(M)
  signature
    input   send(m: M),
            crash
    output  receive(m: M)
  states
    buffer: Seq[M] := {}
  transitions
    input send(m)
      eff buffer := buffer ⊢ m
    input crash
      eff buffer := choose b where b ≼ buffer
    output receive(m)
      pre buffer ≠ {} ∧ m = head(buffer)
      eff buffer := tail(buffer)
```

Figure 8: IOA description of a lossy communication channel transition a license to change the value of the state variable x. As described below, constraints on the new values for modified variables, if any, can be given in a so that clause for the entire effect.

*Conditional statements* Conditional statements are used to select which of several statements to execute in a program. They start with the keyword if followed by a predicate, the keyword then, and a program; they end with the keyword fi. In between, there can be any number of elseif clauses (each of which contains a predicate, the keyword then, and a program), and there can be a final else clause (which also contains a program). Figure 10 illustrates the use of a conditional statement in defining an automaton that distributes input values into one of three sets. Precise meanings for sets, as well as the operators {} and insert, are given in Section 8.2.

*For statements* A for statement is used to perform a program for some set of values for a variable in that program. The statement consists of the keyword for followed by a variable, a clause describing a set of values for this variable, the keyword do, a program, and the keyword od. Its use is illustrated in Figure 11, which presents a high-level description of a multicast algorithm.

The first line in Figure 11 defines the Packet data type to consist of triples [contents, source, dest], where contents represents a message, source the Node from which the message originated, and dest the set of Nodes to which the message should be delivered. The state of the multicast algorithm consists of a multiset network, which represents the packets currently in transit, and an array queue, which represents, for each Node, the sequence of packets delivered to that Node, but not yet read by the Node.

The mcast action inserts a new packet in the network; the notation [m, i, I] is defined by the tuple data type (Section 9.8) and the insert operator by the multiset data type (Section 8.3). The deliver action, which is described using a for statement, distributes a packet to all nodes in its destination set (by appending the packet to the queue for each node in the destination set and then deleting the packet from the network). The read action receives the contents of a packet at a particular Node by removing that packet from the queue of delivered packets at that Node.

In general, the clause describing the set of values for the control variable in a for statement consists either of the keyword in followed by an expression denoting a set (Section 8.2) or multiset (Section 8.3) of values of the appropriate type, or of the keywords so that followed by a predicate. The program following the keyword do is executed once for each value in the set or multiset following the keyword in, or once for each value satisfying the predicate following the keywords so that. These versions of the program are executed in an arbitrary order. However, IOA restricts the form of the program so that the effect of the for statement is independent of the order in which the versions of the program are executed.

```
Subsequence(E): trait
  includes Sequence(E)
  introduces __≼__: Seq[E], Seq[E] → Bool
  asserts with e, e1, e2: E, s, s1, s2: Seq[E]
    {} ≼ s;
    ¬((s ⊢ e) ≼ {});
    (s1 ⊢ e1) ≼ (s2 ⊢ e2) ⇔ (s1 ⊢ e1) ≼ s2 ∨ (s1 ≼ s2 ∧ e1 = e2)
```

Figure 9: Auxiliary specification with recursive definition of subsequence operator

```
automaton Distribute
  signature
    input get(i: Int)
  states
    small:  Set[Int] := {},
    medium: Set[Int] := {},
    large:  Set[Int] := {},
    bound1: Int,
    bound2: Int
    so that bound1 < bound2
  transitions
    input get(i)
      eff if i  < bound1 then small := insert(i, small)
          elseif i < bound2 then medium := insert(i, medium)
          else large := insert(i, large)
          fi
```

Figure 10: Example of a conditional statement

```
type Packet = tuple of contents: Message, source: Node, dest: Set[Node]
automaton Multicast
  signature
    input    mcast(m: Message, i: Node, I: Set[Node])
    internal deliver(p: Packet)
    output   read(m: Message, j: Node)
  states
    network: Mset[Packet] := {},
    queue: Array[Node, Seq[Packet]]
    so that ∀ i: Node (queue[i] = {})
  transitions
    input mcast(m, i, I)
      eff network := insert([m, i, I], network)
    internal deliver(p)
      pre p ∈ network
      eff for j: Node in p.dest do queue[j] := queue[j] ⊢ p od;
          network := delete(p, network)
    output read(m, j)
      pre queue[j] ≠ {} ∧ head(queue[j]).contents = m
      eff queue[j] := tail(queue[j])
```

Figure 11: Example showing use of a for statement

Using predicates on states to specify effects The results of a program can be constrained by a predicate relating the values of state variables after a transition has occurred to the values of state variables before the transition began. Such a predicate is particularly useful when the program contains the nondeterministic choose operator. For example,

```
input crash
    eff buffer := choose
        so that buffer' ⪯ buffer
``` is an alternative, but equivalent way of describing the crash action in LossyChannel (Figure 8). The assignment statement indicates that the crash action can change the value of the state variable buffer. The predicate in the so that clause constrains the new value of buffer in terms of its old value. A primed state variable in this predicate (i.e., buffer') indicates the value of the variable in the post-state; an unprimed state variable (i.e., buffer) indicates its value in the pre-state. For another example,

```
eff name[i] := choose;
    name[j] := choose
        so that name'[i] = name[j] ∧ name'[j] = name[i]
``` is an alternative way of writing the effect clause of the swap action in Shuffle (Figure 7). The assignment statements indicate that the array name may be modified at indices i and j, and the so that clause constrains the modifications. This notation allows us to eliminate the temp state variable needed previously for swapping.

There are important differences between where and so that clauses. A where clause can be attached to a nondeterministic choose operator in a single assignment statement to restrict the value chosen by that operator; variables appearing in a where clause denote values in the state before the assignment statement is executed. A so that clause can be attached to an entire eff clause; unprimed variables appearing in a so that clause denote values in the state before the transition represented by the entire eff clause occurs, and primed variables denote values in the state after the transition has occurred.

4.4.4 Choose parameters

Two kinds of parameters can be specified for a transition: ordinary parameters, corresponding to those in the automaton's signature, and additional "choose parameters." Choose parameters provide a convenient way to relate the postcondition for a transition to its precondition. Figure 12 illustrates the use of choose parameters.

The automaton LossyBuffer represents a message channel that loses a message each time it transmits one. The state of the automaton consists of a multiset pending of messages of type M. The input action for the channel, get(m), simply adds the message m to pending. The output action, put(m), delivers m while dropping another message, given by the choose parameter n. The precondition ensures that both m and n are members of the multiset pending and, if m and n happen to be the same message, that pending contains two copies of this message.

Choose parameters provide syntactic sugar for defining transitions. It is possible to define transitions without them by using explicit quantification. For example, the transition for the put action in Figure 12 can be rewritten as follows:

```
output put(m)
    pre ∃ n: M (m ∈ pending ∧ n ∈ pending ∧ (m ≠ n ∨ count(m, pending) > 1))
    eff pending := choose
        so that ∃ n: M (m ∈ pending ∧ n ∈ pending ∧ (m ≠ n ∨ count(m, pending) > 1)
                       ∧ pending'= delete(m, delete(n, pending)))
```

```
automaton LossyBuffer(M: type)
  signature
    input   get(m: M)
    output  put(m: M)
  states
    pending: Mset[M] := {}
  transitions
    input get(m)
      eff  pending := insert(m, pending)
    output put(m)
      choose n: M
      pre m ∈ pending ∧ n ∈ pending ∧ (m ≠ n ∨ count(n, pending) > 1)
      eff  pending := delete(m, delete(n, pending))
```

Figure 12: Example of the use of choose parameters

In general, to eliminate choose parameters, one quantifies them explicitly in the precondition for the transition, and then repeats the quantified precondition as part of the effect.

4.5 Tasks

A final, but optional part in the description of an I/O automaton is a partition of the automaton's output and internal actions into a set of disjoint tasks. This partition is indicated by the keyword tasks followed by a list of the sets in the partition. If the keyword tasks is omitted, and no task partition is given, all output and internal actions are presumed to belong to the same task.

To see why tasks are useful, consider the automaton Shuffle described in Figure 7. The traces of this automaton can be either infinite sequences of swap actions, a finite sequence of swap actions, or a finite sequence of swap actions followed by a single deal action: nothing in the description in Figure 7 requires that a deal action ever occur. By adding

```
tasks
  {swap(i, j) for i: cardIndex, j: cardIndex};
  {deal(a) for a: Array[cardIndex, String]}
``` to the description of Shuffle, we can place all swap actions in one task (or thread of control) and all deal actions in another. The definition of a *fair* execution of an I/O automaton requires that, whenever a task remains enabled, some action in that task will eventually be performed. Thus this task partition for Shuffle prevents swap actions from starving a deal action in any fair execution. There are no fairness requirements, however, on the actions within the same task: the description of Shuffle does not require that every pair of elements in the array will eventually be interchanged.

Variables appearing in task definitions must be introduced using the keyword for, either within the braces defining individual tasks (as illustrated for Shuffle) or outside the braces. For example the task partition

```
tasks
  {deliver(p) for p: Packet};
  {read(m, j) for m: Message} for j: Node
``` for the Multicast automaton places the read actions for different nodes in different tasks, so that the execution of read actions for one node cannot starve execution of receive actions for another.

The values of variables appearing in task definitions can be constrained further by where clauses following the for clauses.

5 IOA notations for operations on automata

We often wish to describe new automata in terms of previously defined automata. IOA provides notations for composing several automata, for hiding some output actions in an automaton, and for specializing parameterized automata.[6]

5.1 Composition

We illustrate composition by describing the LeLann-Chang-Roberts (LCR) leader election algorithm as a composition of process and channel automata.

In this algorithm, a finite set of processes arranged in a ring elect a leader by communicating asynchronously. The algorithm works as follows. Each process sends a unique string representing its name, which need not have any special relation to its index, to its right neighbor. When a process receives a name, it compares it to its own. If the received name is greater than its own in lexicographic order, the process transmits the received name to the right; otherwise the process discards it. If a process receives its own name, that name must have traveled all the way around the ring, and the process can declare itself the leader.

```
automaton Process(I: type, i: I)
  assumes RingIndex(I, String)
  type Status = enumeration of waiting, elected, announced
  signature
    input   receive(m: String, const left(i), const i)
    output  send(m: String, const i, const right(i)),
            leader(m: String, const i)
  states
    pending: Mset[String] := {name(i)},
    status:  Status := waiting
  transitions
    input receive(m, j, i)
      eff  if m > name(i) then pending := insert(m, pending)
           elseif m = name(i) then status := elected
           fi
    output send(m, i, j)
      pre m ∈ pending
      eff pending := delete(m, pending)
    output leader(m, i)
      pre status = elected ∧ m = name(i)
      eff status := announced
  tasks
    {send(m, j, right(j)) for m: String, j: I};
    {leader(m, j) for m: String, j: I}
```

Figure 13: IOA specification of election process

---

[6]Eventually IOA will also provide notations for renaming actions.

Figure 13 describes such a process, which is parameterized by the type I of process indices and by a process index i. The assumes clause identifies an auxiliary specification, RingIndex (Figure 14), that imposes restrictions on the type I. This specification requires that there be a ring structure on I induced by the operators first, right, and left, and that name provide a one-one mapping from indices of type I to names of type String.

```
RingIndex(I, J): trait
  introduces
     first:          → I
     left, right: I → I
     name:        I → J
  asserts with i, j: I
     sort I generated by first, right;
     ∃ i (right(i) = first);
     right(i) = right(j) ⇔ i = j;
     left(right(i)) = i;
     name(i) = name(j) ⇔ i = j
```

Figure 14: Auxiliary specification for finite ring of process identifiers

The type declaration on the second line of Figure 13 declares Status to be an enumeration (Section 9.8) of the values waiting, elected, and announced.

The automaton Process(i) has two state variables: pending is a multiset of strings, and status has type Status. Initially, pending is set to {name(i)} and status to waiting. The input action receive(m, left(i), i) compares the name received from the automaton Process(left(i)) to the left of Process(i) in the ring and the name of the automaton itself. There are two output actions: send(m, i, right(i)), which simply sends a message in pending to the automaton Process(right(i)) on the right in the ring, and leader(m, i), which announces successful election. The two kinds of output actions are placed in separate tasks, so that a Process automaton whose status is elected must eventually perform a leader action.

The full LCR leader election algorithm is described in Figure 15 as a composition of a set of process automata connected in a ring by reliable communication channels (Figures 2 and 5). The assumes statement on the first line repeats the assumption about the type I of process indices in Figure 13. The list of automata following the keyword compose describe the composition. This composition consists of one Process automaton and one Channel automaton for each element of type I. The type parameters M and Index for the Channel automata (Figure 5) are instantiated by the actual types String and I of messages and process indices, and the parameters i and j are instantiated by the values i and right(i), so that each channel connects a process to its right neighbor. In the composition, the input actions receive(m, left(i), i) of the automaton Process(i) are identified with the output actions receive(m, left(i), i) of the automaton Channel(type String, type I, left(i), i). Likewise, the input actions send(m, i, right(i)) of the automaton Channel(type String, type I, i, right(i)) are identified with the output actions of the the automaton Process(i). Since all input actions of the channel and process subautomata are identified with output actions of other subautomata, the composite automaton contains only output actions.

```
automaton LCR(I: type)
  assumes RingIndex(I, String)
  compose
    Process(type I, i) for i: I;
    Channel(type String, type I, i, right(i)) for i: I
```

Figure 15: IOA specification of the LCR algorithm

5.2 Specialization

A parameterized automaton description defines a set of automata rather than a single automaton. For example, LCR defines a set of automata, operating on rings of varying size, rather than a single automaton, operating on a ring with a fixed size. We can use the composition mechanism in IOA to specialize LCR into, say, an automaton LCR4 that fixes the size of the ring at 4.[7] In Figure 16, the type statement explicitly identifies I as an enumerated type with four elements. The uses statement defines a ring structure on these four elements, thereby enabling us to define a composition including LCR (and nothing else) by discharging the assumption in the definition of LCR.

```
automaton LCR4
  type I = enumeration of a, b, c, d
  uses RingIndex(I, String)
  compose LCR(type I)
```

Figure 16: IOA specification of four-process LCR automaton

Even though the description of LCR4 is not parameterized, it still defines a set of automata rather than single automaton: Figure 16 says nothing about how names are assigned to automata. We could pin down such details by creating and referring to an additional auxiliary specification, which defines the values of name(a), name(b), name(c), and name(d). But often it is not necessary to pin details down to such an extent, because the properties of an algorithm that are most of interest do not depend on these details.

5.3 Hiding

IOA allows us to describe an automaton by reclassifying some (or all) of the output actions in a given automaton as internal actions. Thus, for example, if we wish to hide the send and receive actions leading to the election of a leader in LCR, we can use a hide statement, as in Figure 17.

6 IOA descriptions of properties of automata

IOA permits users to describe state invariants of I/O automata or simulation relations between I/O automata.

---

[7]This use of the composition notation is somewhat nonstandard; in the future, different notation may be used to describe a specialization.

```
automaton LCRquiet(I: type)
  assumes RingIndex(I, String)
  hide receive(m, i, j), send(m, i, j) for m: M, i, j: I
  in LCR(type I)
```

Figure 17: IOA specification with hidden actions

6.1 Invariants

Invariants are described using the keywords invariant of followed by the name of an automaton, a colon, and then a predicate. For example, the following invariant for the LCR automaton states that at most one process is ever elected as the leader.

invariant of LCR:
$\forall$ i: I $\forall$ j: I (Process(type I, i).status = elected
                    $\wedge$ Process(type I, j).status = elected $\Rightarrow$ i = j)

A state in a composite automaton is named by the name of the component automaton to which it belongs followed by a dot followed by the state variable name, as shown in the invariant described above. When there is no ambiguity (i.e., when only one component automaton has a state variable with a given name), the name of the component automaton may be omitted.

6.2 Simulation relations

Simulation relations provide a convenient mechanism for showing that one automaton implements another, i.e., that every trace one is a trace of the other. In order to illustrate various simulation relations, we describe a modification, DelayedLossyChannel (Figure 18), of the LossyChannel (Figure 8) automaton. In DelayedLossyChannel, the crash action does not result in the immediate loss of messages from the queue; rather, it marks messages as losable by subsequent internal lose actions.

The uses line in Figure 18 identifies a user-written LSL trait that defines the syntax and semantics of the type MM of marked messages. The trait MarkedMessage defines a marked message to be a pair [m, b] of a message and a boolean values, the components of which can be extracted by the operations .msg and .mark. It also defines an operator mark that sets all marks in a sequence to true, an operator messages that given a sequence of marked messages returns the corresponding sequence of messages, and a relation subseqMarked that holds when the only messages missing from a sequence have marks of true.

The automaton DelayedLossyChannel implements the automaton LossyChannel, because all of its traces are also traces of LossyChannel. One way of showing that this is the case is to define a relation between the states of DelayedLossyChannel and those of LossyChannel and to show that this relation is a forward simulation (see Section 1.4). The following assertion in IOA defines such a relation.

forward simulation from DelayedLossyChannel to LossyChannel:
  messages(DelayedLossyChannel(type M).buffer) = LossyChannel(type M).buffer It is also true that every trace of LossyChannel is a trace of DelayedLossyChannel, i.e., that the two automata have the same set of traces. One way to show this reverse inclusion is to define a relation between the states of LossyChannel and those of DelayedLossyChannel and to show that this relation is a backward simulation. The following assertion describes such a relation.

```
automaton DelayedLossyChannel(M: type)
  uses MarkedMessage
  signature
    input    insert(m: M), crash
    output   remove(m: M)
    internal lose
  states  buffer: Seq[MM] := {}
    transitions
      input insert(m)
        eff  buffer := buffer ⊢ [m, false]
      output remove (m)
        pre buffer ≠ {} ∧ head(buffer).msg = m
        eff  buffer := tail(buffer)
      input crash
        eff  buffer := mark(buffer)
      internal lose
        eff  buffer := choose
             so that subseqMarked(buffer', buffer)
```

Figure 18: Specification of an implementation of a lossy channel

```
backward simulation from LossyChannel to DelayedLossyChannel:
  ∃ s: Seq[MM] (subseqMarked(s, DelayedLossyChannel(type M).buffer)
              ∧ LossyChannel(type M).buffer = messages(s))
```

In order to establish that relations defined in these fashions are actually forward and backward simulation relations, the user must demonstrate that these relations satisfy the definitions given for simulation relations in Section 1.4. The key element in such a demonstration is usually the identification, for each step of one automaton, of an execution fragment of the other that contains the same external actions.

*Editorial note: Need to add example of such an identification here, together with the formal syntax for describing identifications in the reference manual. In general, the identification is a definition by cases.*

Part II
IOA Data Types

IOA specifications can use the data types Bool, Int, Nat, Real, and Char without explicit declarations for those types. Section 7 describes the operators available for each of those types. IOA specifications can also use the type constructors Array, Set, Mset, Seq, and Map without explicit declarations. Section 8 describes the operators for each of these types.

All other data types in an IOA specification, as well as any additional operators on the built-in types, must be declared in one of two ways:

- by identifying an LSL specification providing the semantics of the type and/or operators, as in

```
    uses Stack(E)
    uses IntMod(n)
    ```

- by defining the type as an LSL enumeration, tuple, or union, as in

```
    type Color = enumeration of red, white, blue
    type Msg   = tuple of source, dest: Process, contents: String
    type Fig   = union of sq: Square, circ: Circle
    ```

Precise semantics for each data type are given by an appropriate LSL specification. We show here the sort and operator declarations for each of the built-in specification, but omit their axioms. The equality ($=$), inequality ($\neq$), and conditional (if__then__else) operators are also defined for all types (built-in or user-defined).

7 Built-in simple types

The following built-in simple types of IOA require no declaration.

7.1 Booleans

The boolean data type is built into LSL and is used to give meaning to the logical connectives.

```
Boolean: trait
  introduces
    true, false:                          → Bool     % logical constants
    ¬__:                      Bool        → Bool     % not
    __ ∧ __, __ ∨ __,                                % and, or
    __ ⇒ __, __ ⇔ __:         Bool, Bool  → Bool     % if, if and only if
```

7.2 Integers

The integer data type introduces integer constants and some common operators on integers.

```
Integer: trait
  includes DecimalLiterals(Int)
  introduces
    -__, abs,                             % unary minus, absolute value
```

```
pred, succ:      Int        → Int      % predecessor, successor
__+__, __-__,                           % addition, subtraction
__*__,                                  % multiplication
div, mod,                               % integer quotient and modulus
min, max:        Int, Int  → Int        % minimum, maximum
__<__, __≤__,                           % less than, less than or equal to
__>__, __≥__:    Int, Int  → Bool       % greater than, greater than or equal to
```

7.3 Natural numbers

The trait Natural defines Nat to have the same operations as Int, except that it has no unary operators - or abs for additive inverses or absolute values, that the value of x - y is defined to be 0 if x < y, and that there is an additional operator ** for exponentiation.

7.4 Real numbers

The real number data type introduces common operators on the real numbers.

```
Real: trait
  includes DecimalLiterals(Real), Integer
  introduces
    -__, abs:      Real         → Real   % unary minus, absolute value
    __+__, __-__,                        % addition, subtraction
    __*__, __/__,                        % multiplication, division
    min, max:      Real, Real   → Real   % minimum, maximum
    __**__:        Real, Int    → Real   % exponentiation
    __<__, __≤__,                        % less than, less than or equal to
    __>__, __≥__:  Real, Real   → Bool   % greater than, greater than or equal to
```

7.5 Characters

At present, the data type Char contains only letters and digits. This will change when the grammar for the IOA parser is enhanced to recognize arbitrary character constants.

```
Character: trait
  introduces
    'A', 'B', 'C', 'D', 'E', 'F', 'G', 'H', 'I', 'J', 'K', 'L', 'M',
    'N', 'O', 'P', 'Q', 'R', 'S', 'T', 'U', 'V', 'W', 'X', 'Y', 'Z',
    'a', 'b', 'c', 'd', 'e', 'f', 'g', 'h', 'i', 'j', 'k', 'l', 'm',
    'n', 'o', 'p', 'q', 'r', 's', 't', 'u', 'v', 'w', 'x', 'y', 'z',
    '0', '1', '2', '3', '4', '5', '6', '7', '8', '9':  → Char
    __<__, __≤__, __>__, __≥__: Char, Char → Bool      % ASCII order
```

7.6 Strings

Strings are lexicographically ordered sequences of characters.

```
String: trait
  includes Sequence(Char for E, String for Seq[E])
  introduces
    __<__, __≤__, __>__, __≥__: String, String → Bool  % lexicographic order
```

8 Built-in type constructors

The following traits define the built-in type constructors in IOA.

8.1 Arrays

The data types `Array[I, E]` and `Array[I, I, E]` represent one and two dimensional arrays of elements of some type E indexed by elements of some type I.

```
Array(I, E): trait
  introduces
    __[__]:     Array[I, E], I          → E              % 1-dim subscripting
    __[__,__]:  Array[I, I, E], I, I    → E              % 2-dim subscripting
    assign:     Array[I, E], I, E       → Array[I, E]    % change element
    assign:     Array[I, I, E], I, I, E → Array[I, E]    % change element
    constant:   E                       → Array[I, E]    % constant array
    constant:   E                       → Array[I, I, E] % constant array
```

8.2 Sets

The data type `Set[E]` represents finite sets of elements of some type E.

```
Set(E): trait
  includes Integer
  introduces
    {}:                              → Set[E]     % empty set
    {__}:         E                  → Set[E]     % singleton set
    insert:       E, Set[E]          → Set[E]     % insert element
    delete:       E, Set[E]          → Set[E]     % delete element
    __∈__:        E, Set[E]          → Bool       % membership
    __∪__, __∩__,                                 % union, intersection
    __-__:        Set[E], Set[E]     → Set[E]     % difference
    __⊂__, __⊃__,                                 % proper subset, superset
    __⊆__, __⊇__: Set[E], Set[E]     → Bool       % subset, superset
    size:         Set[E]             → Int        % size of set
```

8.3 Multisets

The data type `Mset[E]` represents finite multisets of elements of some type E. It has the same operators as `Set[E]`, with the addition of a count operator (with signature E, Mset[E] → Int) that returns the number of times an element occurs in a multiset.

8.4 Sequences

The data type `Seq[E]` represents finite sequences of elements of some type E.

```
Sequence(E): trait
  includes Integer
  introduces
    {}:                            → Seq[E]    % empty sequence
    __⊢__:    Seq[E], E            → Seq[E]    % append element
    __⊣__:    E, Seq[E]            → Seq[E]    % prepend element
    __||__:   Seq[E], Seq[E]       → Seq[E]    % concatenation
```

```
__∈__:        E, Seq[E]      → Bool      % "is element of"
head, last: Seq[E]           → E         % first, last element
tail, init: Seq[E]           → Seq[E]    % all but first, last elements
len:          Seq[E]         → Int       % length
__[__]:       Seq[E], Int    → E         % element
```

8.5 Mappings

The data type Map[D, R] represents finite partial mappings of elements of some domain type D to elements of some range type R. They differ from arrays in that their domains are always finite, and in that they may not be totally defined.

```
Mapping(D, R): trait
  introduces
    empty:                            → Map[D, R]   % empty map
    __[__]: Map[D, R], D              → R           % image under map
    update: Map[D, R], D, R           → Map[D, R]   % change map
    defined: Map[D, R], D             → Bool        % true if map defined
```

Part III
IOA: a Larch specification language

IOA is a formal language for defining I/O automata and for stating their properties. IOA belongs to the Larch family of specification languages [6], which supports a two-tiered, definitional style of specification. Each specification has components written in two languages: a so-called *interface language* tailored specifically for a programming language (such as C) or for a mathematical model of computation (such as I/O automata), and another language (called the *Larch Shared Language* or *LSL*), which is independent of any programming language or mathematical model.

Interface languages are used to specify interfaces between program components and the effects of executing those components. By tailoring interface languages to programming languages or mathematical models, Larch makes it easy to describe the details of an interface (e.g., how program modules communicate across the interface) in a fashion that is familiar to users.

```
Sequence(E): trait
  introduces
    {}:                    → Seq[E]
    __⊢__: Seq[E], E  →  Seq[E]
    head:   Seq[E]    →  E
    tail:   Seq[E]    →  Seq[E]
  asserts with s: Seq[E], e: E
    sort Seq[E] generated freely by {}, ⊢ ;
    tail({}) = {};
    tail(s ⊢ e) = tail(s) ⊢ e;
    head(s ⊢ e) = (if s = {} then e else head(s))
  implies with s1, s2: Seq[E], e1, e2: E
    s1 ⊢ e1 = s2 ⊢ e2 ⇔ s1 = s2 ∧ e1 = e2;
    s1 ⊢ e1 ≠ {}
```

Figure 19: Simplified LSL specification for sequences

Interface languages rely on definitions from auxiliary specifications, written in LSL, to provide semantics for the data types a program manipulates. An LSL specification, known as a *trait*, describes a collection of *sorts* (i.e., non-empty sets of elements) and *operators* (i.e., functions mapping tuples of elements to elements), by means of axioms written in first-order logic. For example, the Sequence trait shown in Figure 19 describes the properties of finite sequences of elements of some sort E. The introduces clause lists the sorts and operators being specified, the asserts clause defines their properties, and the implies clause calls attention to some (purported) consequences of these properties. In the introduces clause, the __'s are placeholders for the arguments of the infix operator ⊢. In the asserts clause, the generated freely by axiom asserts that all sequences can be obtained by appending a finite number of elements (using the operator ⊢) to the empty sequence {}, and the remaining axioms provide inductive definitions of the head and tail operators; note that head({}) is not defined. The implies clause calls attention to the fact that two elements of the freely generated sort Seq[E] are equal if and only if they were generated in the same fashion; this property distinguishes sequences from sets, where it does not matter in which order elements are inserted.

Larch distinguishes between the idealized sorts of elements described in LSL (such as arbitrarily long sequences) and the actual types of elements involved in a computation (such as sequences of some limited length). Larch also distinguishes between mathematical operations on sorts (such as head, which is not specified completely) and computational procedures (such as one that returns the first element in a sequence, which may either return an "error" element or raise an exception if the sequence is empty). Each data type in a program is interpreted as a sort in LSL, and the results of computations are specified in terms of operators whose meanings have been defined in LSL.

Although IOA has been designed as a Larch interface language, its use does not require a detailed knowledge of Larch. This is because notations for certain data types (e.g., integers, strings, sequences, sets, and multisets) are built into the definition of IOA (see Part II). Once learned, these notations can be used freely in IOA descriptions. Users need only refer to the LSL traits that define these notations if they have questions about the precise mathematical meaning of some operator.[8]

9 Data type specification in LSL

This section provides a tutorial introduction to the Larch Shared Language (LSL), which IOA uses to provide semantics for the data types that an I/O automaton manipulates. It is taken from Chapter 4 of [6], but has been updated to reflect several changes to LSL, most significantly the addition of explicit quantification.

9.1 Algebraic specifications

LSL's basic unit of specification is a *trait*. Consider, for example, the specification of mappings given in Figure 20. This specification is similar to conventional algebraic specifications, as would be written in many languages [1, 3]. The trait can be referred to by its name, Mapping1, which is independent of the names appearing in it for data abstractions (e.g., Map[D, R]) or for operators (e.g., update).

```
Mapping1: trait
  introduces
    empty:                          → Map[D, R]
    __[__]:   Map[D, R], D          → R
    update:   Map[D, R], D, R       → Map[D, R]
    defined:  Map[D, R], D          → Bool
    size:     Map[D, R]             → Int
    0, 1:                           → Int
    __+__:    Int, Int              → Int
    __>__:    Int, Int              → Bool
  asserts with d, d1: D, m: Map[D, R], r: R
    ¬defined(empty, d);
    defined(update(m, d, r), d1) ⇔ d = d1 ∨ defined(m, d);
    update(m, d, r)[d1] = (if d = d1 then r else m[d1]);
    size(empty) = 0;
    size(update(m, d, r)) = size(m) + (if defined(m, d) then 0 else 1)
```

Figure 20: A mapping trait

---

[8]Some tool builders may wish to provide other, equivalent definitions for the built-in data types, e.g., using some other mathematical formalism or in terms of procedures written in some programming language.

The part of the trait following the keyword introduces declares a list of *operators*, each with its *signature* (the *sorts* of its *domain* and *range*). An operator is a total function that maps a tuple of values of its domain sorts to a value of its range sort. Every operator used in a trait must be declared; signatures are used to sort-check *terms* in much the same way as expressions are type-checked in programming languages. Primitive sorts are denoted by identifiers (such as D, R, and Int); sorts constructed from other sorts (in a manner defined by the trait) are denoted by identifiers for sort constructors (such as Map) applied to the other sorts (as in Map[D, R]). All sorts are declared implicitly by their appearance in signatures Double underscores (__) in an operator declaration indicate that the operator will be used in *mixfix terms*. For example, + and > are declared as binary infix operators. Infix, prefix, postfix, and bracketing operators (such as __+__, -__, __!, {__}, __[__], and if__then__else__) are integral parts of many familiar mathematical and programming notations, and their use can contribute substantially to the readability of specifications.

LSL's grammar for mixfix terms is intended to ensure that legal terms parse as readers expect—even without studying the grammar. LSL has a simple precedence scheme for operators:

- postfix operators that consist of a dot followed by an identifier (as in field selectors such as .first) bind most tightly;

- bracketing operators that begin with a left delimiter (e.g., [) and end with a right delimiter (e.g., ]) bind more tightly than

- the logical quantifiers ∀ (*for all*) and ∃ (*there exists*), which bind more tightly than

- other user-defined operators and the built-in propositional operator ¬ (*not*), which bind more tightly than

- the built-in equality operators = and ≠, which bind more tightly than

- the built-in propositional operators ∧ (*and*) and ∨ (*or*), which bind more tightly than

- the built-in propositional operator ⇒ (*implies*), which binds more tightly than

- the built-in propositional operator − (*if and only if*), which binds more tightly than

- the built-in conditional operator (if__then__else__).

For example, the term p − x + w.a.b = y ∨ z is equivalent to the fully parenthesized term p − (((x + ((w.a).b)) = y) ∨ z). LSL allows unparenthesized infix terms with multiple occurrences of an operator at the same precedence level, but not different operators; it associates such terms from left to right. Fully parenthesized terms are always acceptable. Thus x ∧ y ∧ z is equivalent to (x ∧ y) ∧ z, but x ∨ y ∧ z must be written as (x ∨ y) ∧ z or as x ∨ (y ∧ z), depending on which is meant.

The part of the trait following the keyword asserts constrains the operators by means of *formulas*, that is, by expressions built up from the variables declared following the keyword with using the operators declared in the trait, as well as the built-in operators and quantifiers. All but the first of the formulas in the trait Mapping1 are *equations*, which consist of two quantifier-free terms of the same sort, separated by = or − (even the first formula can be considered as an equation, because it is equivalent to defined(empty, d) − false). The operator − is defined only for terms of the built-in sort Bool and has a different precedence, as discussed above, than the operator =, which is defined for all sorts.

Each trait defines a *theory* (a set of formulas) in multisorted first-order logic with equality. Each theory contains the trait's assertions, the conventional axioms of first-order logic, everything that follows from them, and nothing else. This *loose* semantic interpretation guarantees that formulas in the theory follow only from the presence of assertions in the trait—never from their absence. This is in contrast to algebraic specification languages based on initial algebras [5] or final algebras [13]. Using the loose interpretation ensures that all theorems proved about an incomplete specification remain valid when it is extended.

Each trait should be *consistent*: it must not define a theory containing the formula false. Consistency is often difficult to prove and is undecidable in general. Inconsistency is often easier to detect and can be a useful indication that there is something wrong with a trait.

9.2 Stronger specifications

Theories with quantifier-free axioms are useful and particularly easy to reason about. However, stronger theories are often needed, for example, when specifying abstract data types. LSL allows users to describe stronger theories using the logical quantifiers $\forall$ and $\exists$. It also provides two constructs, generated by and partitioned by, for particularly common ways of strengthening specifications.

A generated by clause asserts that a list of operators is a complete set of *generators* for a sort. That is, each value of the sort is equal to one that can be written as a finite number of applications of just those operators, and of variables of other sorts. For example, the assertions

```
sort Nat generated freely by 0, succ;
sort Int generated by 0, succ, pred
``` describe ways in which the natural numbers and integers can be generated. The keyword freely indicates that the generators for Nat provide unique representations for the natural numbers.

A generated by clause justifies a *generator induction schema* for proving things about a sort. For example, if we add the assertion

```
sort Map[D, R] generated by empty, update
``` to Mapping1, we can use it to (try to) prove theorems about Map[D, R] by induction. According to this assertion, any value of sort Map[D, R] can be constructed from empty by a finite number of applications of update. Hence, to prove $\forall$ m: Map[D, R] $\forall$ d: D (defined(m, d) $\Rightarrow$ size(m) > 0)

it suffices to do an inductive proof with the structure

- Basis step:

$\forall$ d: D (defined(empty, d) $\Rightarrow$ size(empty) > 0)

- Induction step:

$\forall$ m: Map[D, R] $\forall$ d1: D $\forall$ r: R
        ($\forall$ d: D (defined(m, d) $\Rightarrow$ size(m) > 0)
            $\Rightarrow$ $\forall$ d: D (defined(update(m, d1, r), d) $\Rightarrow$ size(update(m, d1, r)) > 0))

A partitioned by clause asserts that a list of operators constitutes a complete set of *observers* for a sort. That is, all distinct values of the sort can be distinguished using just those operators. Terms that are not distinguishable using any of these observers are therefore equal. For example, sets are partitioned by $\in$, because sets that contain the same elements are equal. Each partitioned by clause is a new axiom that justifies a deduction rule for proofs about values of the sort. For example, the assertion

```
sort Map[D, R] partitioned by defined, __[__]
``` adds the deduction rule

```
∀ d: D (defined(m1, d) ⇔ defined(m2, d))
∀ d: D (m1[d] = m2[d])
-------------------------------------------
            m1 = m2
```

If added to Mapping1, this partitioned by clause could be used to derive theorems that do not follow from the quantifier-free formulas alone. For example, to prove the commutativity of update for two different domain values,

```
∀ m: Map[D, R] ∀ d1: D ∀ d2: D ∀ r1: R ∀ r2: R
    (d1 ≠ d2 ⇒ (update(update(m, d1, r1), d2, r2) =
                   update(update(m, d2, r2), d1, r1)))
``` it suffices to assume d1 ≠ d2 and to discharge the two subgoals

```
∀ d: D (defined(update(update(m, d1, r1), d2, r2), d)
         ⇔ defined(update(update(m, d2, r2), d1, r1), d))
∀ d: D (update(update(m, d1, r1), d2, r2)[d]
         = update(update(m, d2, r2), d1, r1))
```

In general, a generated by clause is equivalent to an infinite set of formulas, one for each property that can be expressed in first-order logic, and a partitioned by clause is equivalent to a single formula.

9.3 Combining specifications

The trait Mapping1 contains four operators that it does not define: 0, 1, +, and >. Without more information about these operators, the definition of size is not particularly useful, and we cannot prove "obvious" properties such as

```
defined(m, i) ⇒ size(m) > 0
```

We could add assertions to Mapping1 to define these operators. However, it is usually better to specify such operators in a separate trait that is included by reference. This makes the specification more structured and makes it easier to reuse existing specifications. We might remove the explicit introductions of these operators from Mapping1, and instead add an *external reference*

```
includes Integer
``` to the trait Integer (described in Section 17). This reference not only introduces the operators, but also defines their properties.

The theory associated with an including trait is the theory associated with the union of its introduces and asserts clauses with those of its included traits (and the traits transitively included in those traits).

```
irreflexive: trait
  introduces __<__: T, T → Bool
  asserts with x: T
    ¬ (x < x)
transitive: trait
  introduces __<__: T, T → Bool
  asserts with x, y, z: T
    x < y ∧ y < z ⇒ x < z
PartialOrder1: trait
  includes irreflexive, transitive
PartialOrder2: trait
  introduces __<__: T, T → Bool
  asserts with x, y, z: T
    ¬ (x < x);
    x < y ∧ y < z ⇒ x < z
```

Figure 21: Specifications of kinds of relations

It is often convenient to combine several traits dealing with different aspects of the same operator. This is common when specifying something that is not easily thought of as a data type. Consider, for example, the specifications of properties of relations in Figure 21. The trait PartialOrder1 has the same associated theory as the less structured trait PartialOrder2.

9.4 Renaming

The trait PartialOrder1 relies heavily on the use of the same operator symbol, <, and the same sort identifier, T, in the two included traits. In the absence of such happy coincidences, renaming can be used to make names coincide, to keep them from coinciding, or simply to replace them with more suitable names, as in includes transitive(⊂ for <)

where we wish to assert that some operator other than < is transitive.

In general, a *trait reference* is a phrase $Tr(name1 \text{ for } name2, \ldots)$ that stands for the trait $Tr$ with every occurrence of *name2* (which must be a sort, a sort constructor, or an operator) replaced by *name1*, ... If *name2* is a sort or a sort constructor, this renaming changes the signatures of all operators in $Tr$ in whose signatures *name2* appears. For example, the signature of the operator __[__] changes to Map[D, Int], D → Int in the trait reference Mapping1(Int for R).

Any sort or operator in a trait can be renamed when that trait is referenced in another trait. Some, however, are more likely to be renamed than others. It is often convenient to single these out so that they can be renamed positionally. For example, if the header for the trait transitive had been transitive(T, <): trait, then the reference includes transitive(T, >) would be equivalent to includes transitive(Int for T, > for <).

9.5 Stating intended consequences

It is not possible to prove the "correctness" of a specification, because there is no absolute standard against which to judge correctness. But since specifications can contain errors, specifiers need help in locating them. LSL specifications cannot, in general, be executed, so they cannot be tested in the way that programs are commonly tested. LSL sacrifices executability in favor of brevity, clarity, flexibility, generality, and abstraction. To compensate, it provides other ways to check specifications.

This section briefly describes ways in which specifications can be augmented with redundant information to be checked during validation. Checkable properties of LSL specifications fall into three categories: *consistency*, *theory containment*, and *completeness*. As discussed earlier, the requirement of consistency means that any trait whose theory contains the formula false is illegal.

An implies clause makes claims about theory containment. Suppose we think that a consequence of the assertions of Mapping1 is that the size of every map with a defined element is greater than 0. To formalize this claim, we could the following clause to Mapping1:

implies with m: Map[D, R], d: D
defined(m, d) ⇒ size(m) > 0

The properties claimed to be implied can be specified using the full power of LSL, including formulas, generator clauses, partitioning clauses, and references to other traits. Attempting to verify that such a theory actually is implied can be helpful in error detection. Implications also help readers confirm their understanding. Finally, they can provide useful lemmas that will simplify reasoning about specifications that use the trait.

LSL does not require that each trait define a *complete theory*, that is, one in which each fully quantified formula is either true or false. Many finished specifications (intentionally) do not fully define all their operators. Furthermore, it can be useful to check the completeness of some definitions long before finishing the specification they are part of. Therefore, instead of building in a single test of completeness that is applied to all traits, LSL provides a way to include within a trait specific checkable claims about completeness, using converts clauses. Adding the clause implies converts defined to Mapping1 makes the claim that the trait's axioms fully define the operator defined. This claim means that, if the interpretations of all the other operators are fixed, there is only one interpretation of defined that satisfies the axioms. (This claim cannot be proved from the axioms in Figure 20 alone, but can be proved from those axioms together with the induction schema asserted by the axiom sort Map[D, R] generated by {}, update).

The claim implies converts __[__] cannot be verified, because the meaning of the term m[d] is defined by the trait (augmented by the generated by clause) only when defined(m, d) is true. This incompleteness in Mapping1 could be resolved by adding another axiom to the trait, perhaps empty[d] = errorVal. But it is generally better not to add such axioms. The specifier of Mapping1 should not be concerned with whether the sort R has an errorVal and should not be required to introduce irrelevant constraints on __[__]. Extra axioms give readers more details to assimilate; they may preclude useful specializations of a general specification; and sometimes there simply is no reasonable axiom that would make an operator convertible (consider division by 0). Error conditions and undefined values are treated best in interface specifications, as discussed below.

LSL provides an exempting clause for listing terms that are not claimed to be defined (which is different from "that are claimed not to be defined"). The claim implies with d: D
converts defined, __[__] exempting empty[d]

means that defined and $\_\texttt{[\_]}$ are fully defined by the trait's axioms plus interpretations for the other operators and for all terms of the form empty[d]. This is provable from the specification of Mapping1 (augmented by the generated by clause).

In IOA specifications, preconditions for actions should ensure that the effects of those actions do not depend on the values of undefined terms. If an action has a nondeterministic effect, that effect should be specified using the choose operator or a so that clause. For example, the IOA specification

```
output pick1(x: Int)
   eff x := choose i where 1 ≤ i ∧ i ≤ 10
``` describes an action that can output any integer between 1 and 10. Attempting to specify the action using an underspecified LSL operator will not produce the same results. For example, if the IOA specification

```
output pick2(x: Int)
   eff x := someElementInRange(1, 10)
``` is based on a trait containing the definition

```
asserts with i, j: Int
   i ≤ someElementInRange(i, j) ∧ someElementInRange(i, j) ≤ j
``` then the action pick2 will always output the same integer, namely, the one determined by the fixed (albeit unspecified) value of someElementInRange(1, 10).

9.6 Recording assumptions

Many traits are suitable for use only in certain contexts. Just as we write preconditions that document when a procedure may properly be called, we write *assumptions* in traits that document when a trait may properly be included. As with preconditions, assumptions impose a proof obligation on the client, and may be presumed within the trait containing them.

It is often useful to construct general specifications that can be specialized in a variety of ways. For example, we might specialize Mapping1 to StringMap by renaming both D and R to String, and by including Mapping1 in a trait that contains specifications for the operators dealing with elements of sort String:

```
StringMap: trait
   includes Mapping1(String for D, String for R), String
```

The interactions between String and Mapping1 are limited. Nothing in Mapping1 depends on any particular operators being introduced in including traits, let alone their having any special properties. Therefore Mapping1 needs no assumptions.

Consider, however, extending Mapping1 to Mapping2 by adding an operator, restrictDomain, to restrict the domain of a map to elements that lie between two values, as in Figure 22. As written, Mapping2 says nothing about the properties of the < operator. Yet the intuitive meaning of Mapping2 makes sense only when < provides an ordering on the values of sort D. We cannot define < within Mapping2, both because its definition would depend on properties of the sort D (which are not specified in Mapping2) and because to define < there would overly restrict the utility of Mapping2. What we need is an *assumes clause*, as in the trait Mapping3 in Figure 23.

Since Mapping3 may presume its assumptions, its (local) theory is the same as if it had included transitive rather than assumed it: Mapping3 inherits all the declarations and assertions

```
Mapping2: trait
  includes Mapping1
  introduces
    __<__: D, D → Bool
    restrictDomain: Map[D, R], D, D → Map[D, R]
  asserts with d, d1, d2: D, m: Map[D, R]
    defined(restrictDomain(m, d1, d2), d)
      ⇔ defined(m, d) ∧ d1 < d ∧ d < d2
```

Figure 22: A specialization of Mapping1

```
Mapping3: trait
  assumes transitive(D for T)
  includes Mapping1
  introduces
    __<__: D, D → Bool
    restrictDomain: Map[D, R], D, D → Map[D, R]
  asserts with d, d1, d2: D, m: Map[D, R]
    defined(restrictDomain(m, d1, d2), d)
      ⇔ defined(m, d) ∧ d1 < d ∧ d < d2
  implies with d, d1, d2, d3: D, m: Map[D, R]
    defined(restrictDomain(m, d1, d2), d) ∧ d2 < d3
      ⇒ defined(restrictDomain(m, d1, d3), d)
```

Figure 23: An example of an assumption

```
OrderedSequence(T): trait
  assumes transitive
  introduces
    { }:                        → Seq[T]
    __ ⊣ __: T, Seq[T]          → Seq[T]
    __<__: Seq[T], Seq[T]       → Bool
  asserts with s, s1, s2: Seq[T], t, t1, t2: T
    sort Seq[T] generated freely by { }, ⊣ ;
    { } < (t ⊣ s);
    ¬(s < { });
    (t1 ⊣ s1) < (t2 ⊣ s2) ⇔ t1 < t2 ∨ (t1 = t2 ∧ s1 < s2)
```

Figure 24: An example of overloading of transitive. Therefore, the assumption of transitive can be used to derive various properties of Mapping3, for example, that rangeCount is monotonic in its second argument, as claimed in the implies clause.

The difference between assumes and includes appears when Mapping3 is used in another trait. Whenever a trait with assumptions is included or assumed, its assumptions must be *discharged*. For example, in

```
StringMap1: trait
    includes String, Mapping3(String for D, String for R)
``` the assumption to be discharged is that the (renamed) theory associated with transitive is a subset of the theory associated with the rest of StringMap1 (i.e., is a subsset of the theory associated with the trait String).

9.7 Built-in operators and overloading

In our examples, we have freely used the propositional operators together with some heavily overloaded operators: if__then__else__, =, and ≠. These operators are built into LSL. This allows them to have appropriate syntactic precedence. More importantly, it guarantees that they have consistent meanings in all LSL specifications, so readers can rely on their intuitions about them.

Similarly, LSL can recognize decimal numbers, such as 0, 24, and 1997, without explicit declarations and definitions. In principle, each literal could be defined within LSL, but such definitions are not likely to advance anyone's understanding of the specification. DecimalLiterals is a predefined quasi-trait that implicitly defines all the numerals that appear in a specification; it is included in the standard numeric traits Natural, Integer, and Real that are built into IOA (see Section 17).

In addition to the built-in overloaded operators and numbers, LSL provides for user-defined overloadings. Each operator must be declared in an introduces clause and consists of an identifier (e.g., update) or operator symbol (e.g., __<__) and a signature. The signatures of most occurrences of overloaded operators are deducible from context. Consider, for example, Figure 24. The operator symbol < is used in the last equation to denote two different operators, one relating terms of sort T, and the other, terms of sort Seq[T], but their contexts determine unambiguously which is which.

LSL provides notations for disambiguating an overloaded operator when context does not suffice. Any subterm of a term can be qualified by its sort. For example, a:S in a:S = b explicitly indicates that a is of sort S. Furthermore, since the two operands of = must have the same sort, this qualification also implicitly defines the signatures of = and b. The last axiom in Figure 24 could also be written as (t1 ⊣ s1):Seq[T] < (t2 ⊣ s2):Seq[T] ⇔
   t1:T < t2:T ∨ (t1:T = t2:t ∧ s1:Seq[T] < s2:Seq[T])

Outside of terms, overloaded operators can be disambiguated by directly affixing their signatures, as in `implies converts <:Seq[T],Seq[T]→Bool`.

9.8 Shorthands

Enumerations, tuples, and unions provide compact, readable representations for common kinds of theories. They are syntactic shorthands for things that could be written in LSL without them.

Enumerations

The enumeration shorthand defines a finite ordered set of distinct constants and an operator that enumerates them. For example, `Status enumeration of waiting, elected, announced` is equivalent to including a trait with the body appearing in Figure 25.

```
introduces
  waiting, elected, announced:      → Status
  succ:                       Status → Status
asserts
  sort Status generated freely by waiting, elected, announced;
  succ(waiting) = elected;
  succ(elected) = announced
```

Figure 25: Expansion of an enumeration shorthand

Tuples

The tuple shorthand is used to introduce fixed-length tuples, similar to records in many programming languages. For example, `Packet tuple of contents: Message, from: Node, to: Set[Node]` is equivalent to including a trait with the body appearing in Figure 26. Each field name (e.g., `from`) is incorporated in two distinct operators (e.g., `_.from` and `set_from`).

Unions

The union shorthand corresponds to the tagged unions found in many programming languages. For example, `Figure union of sq: Square, circ: Circle` is equivalent to including a trait with the body appearing in Figure 27. Each field name (e.g., `circ`) is incorporated in three distinct operators (e.g., `circ:→Figure_tag`, `circ:Circle→Figure`, and `_.circ:Figure→Circle`).

```
introduces
  [__, __, __]:   Message, Node, Set[Node]   → Packet
  __.contents:    Packet                     → Message
  __.from:        Packet                     → Node
  __.to:          Packet                     → Set[Node]
  set_contents:   Packet, Message            → Packet
  set_from:       Packet, Node               → Packet
  set_to:         Packet, Set[Node]          → Packet
asserts with m, m1: Message, n, n1: Node, s, s1: Set[Node]
  sort Packet generated by [__, __, __];
  sort Packet partitioned by .contents, .from, .to;
  [m, n, s].contents = m;
  [m, n, s].from = n;
  [m, n, s].to = s;
  set_contents([m, n, s], m1) = [m1, n, s];
  set_from([m, n, s], n1) = [m, n1, s];
  set_to([m, n, s], s1) = [m, n, s1]
```

Figure 26: Expansion of a tuple shorthand

```
Figure_tag enumeration of sq, circ
introduces
  sq:       Square → Figure
  circ:     Circle → Figure
  __.sq:    Figure → Square
  __.circ:  Figure → Circle
  tag:      Figure → Figure_tag
asserts with s: Square, c: Circle
  sort Figure generated by sq, circ;
  sort Figure partitioned by tag, .sq, .circ;
  tag(sq(s)) = sq;
  tag(circ(c)) = circ;
  sq(s).sq = s;
  circ(c).circ = c
```

Figure 27: Expansion of a union shorthand

Part IV
IOA Reference Manual

An IOA specification contains four different kinds of units.

- Type definitions, used to represent state components or indices for automata (see Section 12).

- Automaton definitions (see Sections 11, 13, and 14).

- Assertions about automata, e.g., invariant and simulation relations (see Section 15).

- Axiomatizations of abstract data sorts, formalized in the Larch Shared Language, which provide the syntax and semantics for types and operators appearing in the other three kinds of units. These are described in Part V.

The following conventions are used to describe the syntax of IOA. Uppercase words and symbols enclosed in single quotation marks are terminal symbols in a BNF grammar. All other words are nonterminal symbols. If $x$ and $y$ are grammatical units, then the following notations have the following meanings.

| Notation | Meaning |
| --- | --- |
| $x\ y$ | an $x$ followed by a $y$ |
| $x \mid y$ | an $x$ or a $y$ |
| $x?$ | an optional $x$ |
| $x*$ | zero or more $x$'s |
| $x+$ | one or more $x$'s |
| $x, *$ and $x; *$ | zero or more $x$'s, separated by commas or semicolons |
| $x, +$ and $x; +$ | one or more $x$'s, separated by commas or semicolons |

10 Lexical syntax

The lexical grammar of IOA uses the following symbols:

- Punctuation marks: , : ; ( ) { } [ ] __ :=

- Reserved words: assumes, automaton, backward, by, choose, compose, const, do, eff, else, elseif, enumeration, fi, for, forward, from, hide, if, in, input, internal, invariant, od, of, output, pre, signature, simulation, so, states, tasks, that, then, transitions, to, tuple, type, union, uses, where.

- Beginning comment character: %

- Identifiers for variables, types, and functions: sequences of letters, digits, apostrophes, and underscores (except that two underscores cannot occur consecutively). The LaTeX identifiers for the Greek letters can also be used as identifiers, as can the two strings \bot and top.

- Operators: sequences of the characters - ! # $ & * + . < = > ? @ ^ | ~ / or a backslash (\) followed by one of these characters, by one of the characters _ \ %, or by an identifier (other than a name of a Greek letter, bot or top).

- Whitespace: space, tab, newline.

- Reserved for future use: ` "

*Editorial note: The remainder of this section needs to be checked carefully for completeness and for consistency with the source code for the IOA parser.*

11 Automaton definitions

An automaton can be a primitive automaton or one that is obtained by the operations of composition and hiding. Its name can be parameterized by a list of types and/or elements.

Syntax of automaton definitions

```
specification    ::= trait | ioaSpec
ioaSpec          ::= (typedef | automatonDef | assertion)+
automatonDef     ::= 'automaton' automatonName automatonFormals?
                     typeInfo* (simpleBody | composition | hiding)
automatonName    ::= IDENTIFIER
automatonFormals ::= '(' automatonFormal,+ ')'
automatonFormal  ::= IDENTIFIER,+ ':' (type | 'type')
typeInfo         ::= typedef | 'assumes' traitRef,+
```

The specification of a trait T is kept in a file named T.lsl. Each ioaSpec is kept in a file with a name of the form A.ioa.

The syntax and semantics for the constructs mentioned here can be found in Part V (trait and traitRef), Section 12 (typedef), Section 11 (automatonDef) Section 15 (assertion), Section 13 (simpleBody) and Section 14 (composition and hiding).

Static semantics

Static semantics impose restrictions on the specifications allowed by the BNF grammar for IOA. A static semantic checker will check these restrictions.

- There can be at most one automatonDef for an automatonName.

- The automatonFormals must be distinct.

- The type of each automatonFormal must be a built-in type or have been declared previously in a typedef serving as an ioaSpec.

- Any identifier declared as a type in an automatonFormal must be distinct from all previously declared types.

Semantics

This reference manual also defines the logical semantics of IOA specifications. Proof tools will provide assistance in checking these properties.

- The union of the theories associated with the typedefs occuring in an ioaSpec must be consistent. This theory is called the *global theory* of the ioaSpec.

- The union of the theories associated with the typedefs occurring in an automatonDef must be a conservative extension of the global theory. Thus, the typedefs inside automatonDefs can be used to define notations and constructions (e.g., involving types introduced as automaton-Formals), provided those notations and constructions do not constrain the global theory.

- The union of the theories associated with the typeInfo in an automatonDef is called the *local theory* of the automatonDef.

- The union of the theories associated with the assumed traitRefs in an automatonDef must be implied by the local theory of any automaton constructed from this automatonDef. This, the assumed traitRefs can be used to impose restrictions on the automatonFormals.

12  Type definitions

A type can be a primitive or a compound type. The syntax and semantics of each type is given by a built-in or user-supplied LSL trait (see Parts II and V).

Syntax of type declarations

```
type            ::=  simpleSort | compoundType
simpleType      ::=  IDENTIFIER
compoundType    ::=  sortConstructor '[' type,+ ']'
typeConstructor ::=  IDENTIFIER
typedef         ::=  'uses' traitRef,+
                  |  'type' simpleType '=' shorthand
```

The syntax and semantics of shorthand and traitRef are presented in Section 20 and 21.

Static semantics

- Any type or type constructor mentioned in an IOA specification must be a built-in type or constructor, be introduced in some typedef, be a formal parameter of an automaton, or be a composition of such types and constructors (e.g., Array[Int, Set[String]]).

- A type can be introduced in at most one shorthand.

13  Primitive automata

13.1  Primitive automaton definitions

A primitive automaton is defined by its action signature, its states, its transitions, and (optionally) a partition of its actions into tasks.

Syntax of primitive automaton definitions

```
simpleBody      ::= 'signature' formalActionList+ states transitions tasks?
formalActionList ::= actionType formalAction,+
actionType      ::= 'input' | 'output' | 'internal'
formalAction    ::= actionName (actionFormals where?)?
actionName      ::= IDENTIFIER
```

```
actionFormals   ::= '(' actionFormal,+ ')'
actionFormal    ::= IDENTIFIER,+ ':' type | 'const' term
where           ::= 'where' predicate
```

The syntax and semantics of states, transitions, and tasks are given in Sections 13.2, 13.3 and 13.4, respectively. The syntax and semantics of terms and predicates are given in Part V.

Static semantics

- A given actionName can appear at most once in each of the categories (input, output, internal) in an automaton's signature. Moreover, no actionName can appear in the signature with two different sequences of types for its actionFormals.

- The identifiers used as actionFormals (i.e., those not labeled with the keyword const) must be distinct from each other and from any automatonFormal.

- The type of each actionFormal must have been declared previously.

- All identifiers in a term used as a const actionFormal, or in a predicate in a where clause, must be defined in LSL traits, be actionFormals, or be automatonFormals.

Semantics

- A formalAction of the form name(x:  S, const t), where the term t has type T, is equivalent to the formalAction name(x: S, y: T) where y = t.

13.2  Automaton states

States are records of state variables. An initial value for each variable can be specified by an expression; instead, or in addition, the initial values of all state components can be restricted by a predicate. Expressions and predicates are LSL terms.

Syntax of state component definitions

```
states ::= 'states' state,+ ('so 'that' predicate)?
state  ::= IDENTIFIER ':' type (':=' value)?
value  ::= term | choice
choice ::= 'choose' (variable 'where' predicate)?
```

The syntax and semantics of predicate, term, and variable are given in Part V.

Static semantics

- State variables must be distinct from each other and from the formal parameters of the automaton and its actions.

- The type of the initial value assigned to a state variable must be the same as the type of that variable.

- All identifiers in the term assigned as the initial value of a state variable must be defined in LSL traits or be automatonFormals.

- All identifiers in the predicate in a choice are similarly limited, except that the variable following the keyword choose can also appear in the predicate. The type of this variable, if specified, must be the same as the type of the state variable. The variable itself must be distinct from the parameters of the automaton and from the other state variables.

- The identifiers in the predicate restricting the initial values of the state variables are similarly limited, except that state variables can also appear in the predicate.

- The type of each state variable must have been declared previously.

Semantics

- The set of start states, determined by the assignments and/or allowed by the predicates, must be nonempty.

13.3 Automaton transitions

Transitions are specified using precondition/effect notation. Preconditions are boolean-valued predicates. Effects can be described in terms of simple programs and/or restricted by predicates relating the poststate to the prestate.

Syntax of transition relations

```
transitions   ::=   'transitions' transition+
transition    ::=   actionHead chooseFormals? precondition? effect?
actionHead    ::=   actionType actionName (actionActuals where?)?
actionActuals ::=   '(' term,+ ')'
chooseFormals ::=   'choose' varDcl,+
precondition  ::=   'pre' predicate
effect        ::=   'eff' program ('so' 'that' predicate)?
program       ::=   statement;+
statement     ::=   assignment | conditional | loop
assignment    ::=   component ':=' value
component     ::=   variable
                |   component '[' term,+ ']'
                |   component '.' IDENTIFIER
conditional   ::=   'if' predicate 'then' program
                    ('elseif' predicate 'then' program)*
                    ('else' program)? 'fi'
loop          ::=   'for' qualifiedVar ('in' | 'so' 'that') term
                    'do' program 'od'
```

The syntax and semantics of predicate, variable, and term are given in Part V.

Static semantics

- Transitions must be specified for all actionNames in the signature of the automaton.

- The actions for which transitions are specified must be in the signature of the automaton.

- The actionActuals for each transition must match, both in number and in type, the actionFormals for the actionName.

- The types of variables appearing in actionActuals must be determined uniquely by the types of the actionActuals. These variables are declared implicitly by their occurrence in the actionActuals and have no relation to variables used as actionFormals.

- No precondition is allowed for an input action.

- The variables in the chooseFormals, if any, must be distinct from each other, from all automatonFormals, from all variables in the actionActuals of the action, and from all state variables.

- All operators, constants, and identifiers in a predicate in a precondition or conditional, or in a component or value in an assignment, must be

- operators or constants defined in LSL traits,
    - automatonFormals of the automaton,
    - variables introduced in the actionActuals,
    - chooseFormals of the action,
    - state variables of the automaton,
    - variables introduced in a loop containing the predicate or term, or
    - variables in the scope of a quantifier in the predicate or term.

- All identifiers in the predicate in a so that clause must satisfy the same restrictions or be primed state variables that are modified by some assignment in the program in the effect clause. For example, if queue is a state component that appears on the left side of an assignment, then both queue and queue' are allowed in the predicate.

- The type of the variable in a loop must have been declared previously. The variable itself must be distinct from all variables appearing in the automatonFormals, as state variables, in the actionActuals, or in the chooseFormals.

Semantics

- The where clause in each transition definition is implicitly conjoined with the where clause for the corresponding entry in the signature.

- Each transition defines a binary relation between states of the automaton. This relation is defined by the formula $$\exists h \ldots (\text{pre}(s) \wedge \text{eff}(s, s') \wedge \text{soThat}(s, s'))$$

where

- h... are the choose formals, if any, in the transition,
  - pre(s) is the predicate in the precondition,
  - eff(s, s') is a formula obtained by translating the program, if any, in the effect, as described below, and

- soThat(s, s') is the predicate, if any, in the so that clause in the effect.

- The semantics of a program a is defined by translating it into a so that clause $\text{eff}_a$, as indicated in the following table. In that table, s and s' are state variables, v is a variable (possibly denoting a state component s.v, in which case s.w denotes an arbitrary state component other than s.v), t is a term, p is a predicate, and a and b are programs.

| program | $\text{eff}_{\text{program}}$ |
|---|---|
| v := t | $s'.v = t \wedge s'.w = s.w$ |
| modifies v | $s'.w = s.w$ |
| a; b | $\exists s''(\text{eff}_a(s, s'') \wedge \text{eff}_b(s'', s'))$ |
| if p then a fi | if p then $\text{eff}_a(s, s')$ else s' = s |
| if p then a else b fi | if p then $\text{eff}_a(s, s')$ else $\text{eff}_b(s'', s')$ |
| for v in t do a od | $\forall x (x \in t \Rightarrow \text{eff}_{v:=x;a}(s, s'))$ |

- The formula $\text{eff}(s, s')$ obtained by translating a program in an effect must be consistent.

- Identifiers for state variables in so that clauses refer to the values of the variables in the prestate, i.e., in the state before the transition is executed. Primed versions of these identifiers refer to the values of the variables in the poststate, i.e., in the state after the transition is executed.

Note that:

- Statements in a program are executed sequentially, not in parallel as in UNITY [2].

- State components that do not appear on the left side of an assignment in a branch through the program in an effect clause are assumed to be unchanged on that branch.

13.4 Automaton tasks

Tasks define a partition of the actions of an automaton.

Syntax of tasks

```
tasks        ::= 'tasks' task;+
task         ::= '{' actionSet '}' forClause?
actionSet    ::= actualAction,+ forClause?
actualAction ::= actionName actionActuals?
for          ::= 'for' (IDENTIFIER ':' type),+ where?
```

Static semantics

- Each actionName in a task must be an internal or output action of the automaton.

- There number of actionActuals for an actionName must be the same as the number of actionFormals for that actionName in the automaton's signature.

- The type of each actionActual must be the same as that of the corresponding actionFormal.

- All operators, constants, and identifiers in a term in an actionActual or in a where clause must be

- operators or constants defined in LSL traits,
- parameters of the automaton, or
- defined exactly once in a for clause associated with the task.

Semantics

- The task definitions must define a partition of the set of all non-input actions.
- If no tasks is present, then all non-input actions are treated as belonging to a single task.

14 Operations on automata

Automata can be constructed from previously defined automata by the operations of composition and hiding. Composite automata identify actions with the same name in different component automata; when any component automaton performs a step involving an action $\pi$, so do all component automata that have $\pi$ in their signatures. The hiding operator reclassifies output actions as internal actions.

Syntax of composite automata definitions

```
composition       ::= 'compose' element;+
element           ::= automatonName automatonActuals?
automationActuals ::= '(' automatonActual,+ ')' for?
automatonActual   ::= term | 'type' type
hiding            ::= 'hide' actionSet 'in' element
```

Static semantics

- Each automatonName must have been defined previously in an automatonDef.

- All operators, constants, and identifiers in a term in an automatonActuals parameter must be

- operators or constants defined in LSL traits,
    - parameters of the automaton being define, or
    - defined exactly once in the for clause associated with the actuals.

- Similarly named actions in different component automata must have the same number and types of parameters in each component.

- The set of internal actions for each component must be disjoint from the set of all actions for each of the other components.

- The set of output actions for each component must be disjoint from the set of output actions for each of the other components.

- The numbers and types of the actuals must match those of the corresponding formals.

Semantics

- Each action of the composition must be an action of only finitely many component automata.
- The signature of the composition is the union of the signatures of the component automata.
- An action is an output action of the composition if it is an output action of some component automaton.
- An action is an input action of the composition if it is an input action of some component automaton, but not an output action of any component.
- An action is an internal action of the composition if it is an internal action of some component automaton.
- The set of states of the composition is the product of the sets of states of the component automata.
- The set of start states of the composition is the product of the sets of start states of the component automata.
- A triple $(s, \pi, s')$ is in the transition relation for the composite automaton if, for every component automaton $C$, $(s_C, 1, s'_C)$ is a transition of $C$ when $\pi$ is an action of $C$ and $s_C = s'_C$ when $\pi$ is not an action of $C$.

15  Statements about automata

Assertions about automata make claims about invariants preserved by the actions of the automata or about simulation relations between two automata.

Syntax of invariant and simulation relations

```
assertion  ::= invariant | simulation
invariant  ::= 'invariant' 'of' automatonName ':' predicate
simulation ::= ('forward' | 'backward') 'simulation' 'from'
               automatonName 'to' automatonName ':' predicate
```

Static semantics

- Each automatonName must have been defined previously in an automatonDef.
- All operators, constants, and identifiers in a predicate in an assertion must be
    - operators or constants defined in LSL traits,
    - parameters of (one of) the named automata,
    - state variables of (one of) the named automata, or
    - variables in the scope of a quantifier in the predicate.

Semantics

- An invariant must be true in all reachable states of the automaton.
- The proof obligations for simulation relationships are as defined in Section 1.4.

Part V
LSL Reference Manual

An LSL specification defines a theory in multisorted first-order logic. It can also contain claims about the intended consequences of that theory.

16 Lexical syntax

The lexical grammar of LSL is the same as that of IOA (Section 10), except that it uses the following list of reserved words: asserts, assumes, by, converts, else, enumeration, exempting, for, freely, generated, if, implies, includes, introduces, of, partitioned, sort, then, trait, traits, tuple, type, union, with.

17 Traits

The basic unit of specification in LSL is a trait, which defines a set of axioms for a logical theory and which makes claims about the consequences of that theory. The header for a trait specifies its name and an optional list of formal parameters, which can be used in references to other traits (see Section 21). The body of the trait consists of optional references to subtraits (Section 21) intermixed with shorthands defining sorts (Section 20), followed by sort and operator declarations (Section 18), axioms (Section 19, and claimed consequences of the axioms (Section 22).

Syntax of traits

```
trait     ::= traitId traitFormals? ':' 'trait' traitBody
traitId   ::= IDENTIFIER
traitBody ::= (subtrait | sort shorthand)* opDcls? axioms? consequences?
```

18 Sort and operator declarations

Sorts in LSL can be simple sorts, which are named by a single identifier, or compound sorts, which are named by a sort constructor applied to a list of simpler sorts. Operator names can be used in several different kinds of notations for terms.

| Form of term | Examples |
|---|---|
| functional | $f(x)$, $min(x,y)$ |
| infix | $x + y$ |
| prefix | $-x$ |
| postfix | $x!$, $q.last$ |
| bracketed | $a[i]$, $\{x\}$, $\{\}$ |
| conditional | if $x < 0$ then $-x$ else $x$ |
| quantified | $\forall x \exists y (x < y)$ |

Placeholders in operator declarations indicate where the operators arguments are placed. Signatures in operator declarations indicate the sorts of the arguments for a operator (its *domain* sorts) and the sort of its value (its *range* sort).

Syntax of operator declarations

```
opDcls          ::=  'introduces' opDcl+
opDcl           ::=  name,+ ':' signature ','?
name            ::=  'if' '__' 'then' '__' 'else' '__'
                  |  '__'? (opSym | '.') '__'?
                  |  '__'? openSym '__',* closeSym '__'?
                  |  '__'? '.' IDENTIFIER
                  |  IDENTIFIER
opSym           ::=  OPERATOR | '<=>' | '=>' | '/\' | '\/'
                  |  '=' | '~=' | '.'
openSym         ::=  '[' | '{' | '\(' | '\<'
                  |  '\langle' | '\lfloor' | '\lceil'
closeSym        ::=  ']' | '}' | '\)' | '\>'
                  |  '\rangle' | '\rfloor' | '\rceil'
signature       ::=  sort,* '->' sort
sort            ::=  simpleSort | compoundSort
simpleSort      ::=  IDENTIFIER
compoundSort    ::=  sortConstructor '[' sort,+ ']'
sortConstructor ::=  IDENTIFIER
```

Static semantics

- The optional comma following an opDcl is required if the following opDcl begins with a left bracket.

- The number of __ placeholders in the name in an opDcl must be the same as the number of sorts in the domain of its signature.

- The signature of the logical operators <=>, =>, /\, and \/ must be Bool,Bool->Bool. Declarations for these operators are built into LSL.

- The signature of the operators = and ~= must be S,S->Bool for some sort S. Declarations for these operators are built into LSL for each sort S that occurs in an opDcl or shorthand (see Section 20).

- The signature of the operator if__then__else__ must be Bool,S,S->S for some sort S. A declaration for this operator is built into LSL for each sort S that occurs in an opDcl or shorthand (see Section 20).

- The signature of the operators true and false must be ->Bool. Declarations for these operators are built into LSL.

- The placehold cannot be omitted from a name of the form __.IDENTIFIER in an opDcl.

Semantics

- Sorts denote non-empty sets of elements.

- Operators denote total functions from tuples of elements in its domain sorts to an element in its range sort.

19 Axioms

Axioms in LSL are either formulas in multisorted first-order logic or abbreviations for sets of formulas. A limited amount of operator precedence, as illustrated in the following table, is used when parsing terms.

| Unparenthesized term | Interpretation |
| --- | --- |
| $x - y - z$ | $(x - y) - z$ |
| $a = b + c \Rightarrow b < s(a)$ | $(a = (b + c)) \Rightarrow (b < s(a))$ |
| $a.b.c!$ | $((a.b).c)!$ |
| $\neg p \wedge \neg x.pre$ | $(\neg p) \wedge (\neg (x.pre))$ |
| $\exists x(x < c) \Rightarrow c > 0$ | $(\exists x(x < c)) \Rightarrow (c > 0)$ |
| $\forall x \exists y\ x < y$ | $(\forall x \exists y\ x) < y$ |
| $a < b + c$ | Error |
| $p \wedge q \vee r$ | Error |
| $p \Rightarrow q \Rightarrow r$ | Error |

Syntax of axioms

```
axioms         ::=  'asserts' varDcls? axiom;+ ';'?
varDcls        ::=  'with' (IDENTIFIER,+ qualification)+
qualification  ::=  ':' sort
axiom          ::=  predicate
                 |  'sort' sort ('generated' 'freely'? | 'partitioned')
                    'by' OPERATOR,+
predicate      ::=  term
term           ::=  IF term THEN term ELSE term
                 |  subterm
subterm        ::=  subterm (opSym subterm)+
                 |  (quantifier | opSym)* opSym secondary
                 |  (quantifier | opSym)* quantifier primary
                 |  secondary opSym*
quantifier     ::=  ('\A' | '\E') variable
variable       ::=  IDENTIFIER qualification?
secondary      ::=  primary
                 |  primary? bracketed ('.'? primary)?
primary        ::=  primaryHead (qualification | '.' primaryHead)*
primaryHead    ::=  IDENTIFIER ('(' term,+ ')')?
                 |  '(' term ')'
bracketed      ::=  openSym term,* closeSym qualification?
```

Static semantics

- Each operator in an axiom must be a built-in operator, declared in an operator declaration (Section 18), introduced by a shorthand for a sort (Section 20), or declared in a subtrait (Section 21).

- Each sort in a qualification must have been declared.

- No variable may be declared more than once in a varDcls.

- A variable cannot be declared to have the same identifier and sort as a constant (i.e., as a zero-ary function identifier).

- There must be unique assignment of declared operators and variables to the identifiers, opSyms, openSyms, and closeSyms in a term so that the arguments of each declared operator have the appropriate sorts and so that every qualified subterm has the appropriate sort.

- The sort of a predicate must be Bool.

- The range of each operator in a generated by must be the named sort.

- At least one of the operators in a generated by axiom must not have the named sort in its domain.

- Each operator in a partitioned by axioms must have the named sort in its domain.

- The list of operators in a generated by or a partitioned by must not contain duplicates.

Semantics

- See Section 9.2 for the semantics of generated by and partitioned by axioms.

20 Shorthands for sorts

LSL shorthands provide a convenient way of declaring sorts representing enumerations, tuples, and unions.

Syntax of shorthands

```
shorthand ::=  'enumeration' 'of' IDENTIFIER,+
             | ('tuple' | 'union') 'of' (IDENTIFIER,+ ':' sort),+
```

Static semantics

- The list of identifiers in an enumeration must not contain duplicates.

- The list of identifiers corresponding to a field of a particular sort in a tuple or union must not contain duplicates.

- Each sort appearing in a shorthand must differ from the sort of the shorthand itself.

Semantics

- See Section 9.8

21 Trait references

Traits can incorporate axioms from other traits by inclusion. Traits can also contain assumptions, which must be discharged in order for their inclusion in other traits to have the intended meaning.

Syntax of trait references

```
subtrait     ::=   ('includes' | 'assumes') traitRef,+
traitRef     ::=   traitId renaming?
traitId      ::=   IDENTIFIER
renaming     ::=   '(' traitActual,+              ')'
                 | '(' traitActual,* replace,+ ')'
replace      ::=   traitActual FOR traitFormal
traitActual  ::=   name | compoundSort
traitFormals ::=   '(' traitFormal,* ')'
traitFormal  ::=   name signature? | compoundSort
```

Static semantics

- There must not be a cycle in the assumes/includes hierarcy.

- Each compoundSort used as a traitFormal must be declared in the trait.

- Each name qualified by a signature used as a traitFormal must be declared as an operator in the trait.

- Placeholders can be omitted from a name in a traitFormal if there is exactly one way to supply placeholders so as to match that name with the name of a declared operator.

- Each name used as a traitFormal, but not qualified by a signature, must be declared as a simple sort, be declared as a sort constructor, or match the name (modulo the addition of placeholders) of exactly one declared operator.

- When a name used as a traitFormal can be interpreted in more than one way as a simple sort, sort constructor, or operator, preference is given to its intepretation first as a simple sort, second as a sort constructor, and third as an operator.

- The number of actual parameters in a trait reference must not exceed the number of formal parameters in the definition of the trait.

- No operator or sort may be renamed more than once in a renaming.

- Each compoundSort used as a traitActual must correspond to a traitFormal that is a sort.

- Each name used as a traitActual must be an identifier if it corresponds to a traitFormal that is a sort. If the name contains placeholders, it must correspond to a traitFormal that is an operator with the appropriate number of domain sorts. If the name contains no placeholders, there must be a unique way of adding them to match the number of domain sorts for the corresponding traitFormal.

Semantics

- The *assertions* of a trait include the axioms asserted directly in the trait, together with the (appropriately renamed) axioms asserted in all traits (transitively) included in the trait.

- The *assumptions* of a trait include the (appropriately renamed) axioms of all traits (transitively) assumed by the trait.

- When trait $A$ includes or assumes trait $B$, the assertions and assumptions of $A$ must imply the assumptions of $B$.

- The assertions and assumptions of any trait must be consistent.

22 Consequences

LSL traits can contain checkable redundancy in the form of consequences that are claimed to follow from their axioms.

Syntax of consequences

```
consequences ::= 'implies' varDcls? consequence;+ ';'?
consequence  ::= axiom | 'trait' traitRef,+ | conversion
conversion   ::= 'converts' (name ':' signature?),* ('exempting' term,+)?
```

Static semantics

- All sorts and operators in a consequence, including those declared in an implied `traitFef`, must be declared in the implying trait.

- Each name in a `conversion` must correspond to exactly one declared operator (in the same manner as required for `traitFormals`).

- Each term in an `exempting` clause must contain some converted operator.

Semantics

- The assertions and assumptions of a trait must imply the non-conversion consequences of that trait.

- If a trait $T$ is claimed to convert a set $Ops$ of operators, then $op(x_1, \ldots, x_n) = op'(x_1, \ldots, x_n)$ must be a logical consequence of $T \cup T' \cup E$ for each $op$ in $Ops$, where

- $op'$ is a new operator name,
  - $T'$ is obtained from $T$ by replacing each occurence of each $op$ in $Ops$ by $op'$, and
  - $E$ is the set of all formulas of the form $t = t'$, where $t$ is an exempted term and $t'$ is obtained from $t$ by replacing each occurence of each $op$ in $Ops$ by $op'$.

References

[1] Michel Bidoit. *Pluss, un langage pour le développement de spécifications algébriques modulaires*. Thése d'Etat, Université Paris-Sud, Orsay, May 1989.

[2] K. Mani Chandy and Jayadev Misra. *Parallel Program Design*. Addison Wesley, 1988.

[3] Hartmut Ehrig and Bernd Mahr. *Fundamentals of Algebraic Specification 1: Equations and Initial Semantics*, EATCS Monographs on Theoretical Computer Science, Vol. 6. Springer-Verlag, 1985.

[4] Stephen J. Garland and John V. Guttag. "A guide to LP, the Larch Prover." TR-82, DEC Systems Research Center, 1991. Updated version available as http://larch.lcs.mit.edu:8001/larch/LP/overview.html.

[5] J. A. Goguen, J. W. Thatcher and E. G. Wagner. "An initial algebra approach to the specification, correctness, and implementation of abstract data types." *Current Trends in Programming Methodology IV: Data Structuring*, Raymond T. Yeh (ed.). Prentice-Hall, 1978.

[6] John V. Guttag and James J. Horning, editors. *Larch: Languages and Tools for Formal Specification*. Springer-Verlag, 1993.

[7] Nancy A. Lynch. *Distributed Algorithms*. Morgan Kaufmann, 1996.

[8] Nancy A. Lynch and Mark Tuttle. "Hierarchical correctness proofs for distributed algorithms." Technical Report MIT/LCS/TR-387, MIT Laboratory for Computer Science, 1987.

[9] Kenneth L. McMillan. *Symbolic Model Checking, an Approach to the State Explosion Problem*. Ph.D. Thesis, Carnegie Mellon University, CMU-CS-92-131, 1992.

[10] Gerard J. Holzmann. *Design and Validation of Computer Protocols*. Prentice Hall, New Jersey, 1991, ISBN 0-13-539925-4.

[11] Sam Owre, Sreeranga P. Rajan, John M. Rushby, Natarajan Shankar, and Mandayam Srivas. "PVS: Combining specification, proof checking, and model checking." *Computer Aided Verification '96*, 1996.

[12] Jørgen A. Sogaard-Andersen, Stephen J. Garland, John V. Guttag, Nancy A. Lynch, and Anna Pogosyants. "Computer-assisted simulation proofs." *4th Conference on Computer Aided Verification*, 1993.

[13] M. Wand. "Final algebra semantics and data type extensions." *Journal of Computer and System Sciences*, August 1979.

APPENDIX B

OF APPLICATION FOR

UNITED STATES LETTERS PATENT

TITLE: MODEL-BASED SOFTWARE DESIGN AND VALIDATION

APPLICANT: STEPHEN J. GARLAND and NANCY A. LYNCH

"EXPRESS MAIL" Mailing Label Number EM529185066US

Date of Deposit March 30, 1998

I hereby certify under 37 CFR 1.10 that this correspondence is being deposited with the United States Postal Service as "Express Mail Post Office To Addressee" with sufficient postage on the date indicated above and is addressed to the Assistant Commissioner for Patents, Washington, D.C. 20231.

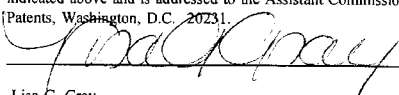

Lisa G. Gray

B Example

This example describes a trivial banking system having a single bank account that can be accessed from multiple locations. The operations by which the system is accessed are deposits and withdrawals (we assume that the balance can go negative), plus balance queries. We define a specification automaton A with weak requirements, and a distributed algorithm C that implements A. We also define an intermediate automaton, B, which is used to help prove that C implements A.

B.1 Data Types

Some data types that are used are:

```
Int
Nat
Pos
I
OpRec tuple of amount: Int, location: I, seqno: Pos, reported: Bool
OpRec1 tuple of amount: Int, location: I, seqno: Pos
BalRec tuple of location: I, value: Null[Int]
BalRec1 tuple of value: Null[Int]
```

Here, Int denotes the integers (a built-in data type of IOA), Nat denotes the natural numbers 0,1,2,..., and Pos denotes the positive natural numbers 1,2,3,... I is the set of locations at which deposit and withdrawal operations and balance queries may be submitted. The special value null is used to indicate the absence of a numerical value. Null[T], for a type T, indicates the type consisting of T plus the value null.

Each element of OpRec is an "operation record" indicating the amount of a deposit or withdrawal operation—positive numbers for deposits and negative numbers for withdrawals—plus the location at which it is submitted, the sequence number assigned to it, and a Boolean (that is, a true or false value) saying whether or not the system has yet reported the completion of the operation to the environment. Each element of OpRec1 has the same kind of information as an element of OpRec, minus the reported flag. Each element of BalRec indicates the location at which a currently-active balance request has been submitted, plus a value that is either the value to be returned by the request, if that value has been determined, and otherwise is null. Each element of BalRec1 has just the value information. We also define:

```
proj: OpRec → OpRec1
proj(x) = [x.amount, x.location, x.seqno];

proj: BalRec → BalRec1
proj(x) = [x.value];
```

That is, the proj functions just eliminate the extra components.

B.2 Environment Automaton

The automaton Env represents the environment for the bank automata. This includes the interface by which the environment interacts with the bank automata—requests and responses at locations in I. It also expresses a "well-formedness condition" saying that each operation at a location i must complete before another operation is submitted at i. Env simply keeps track, for each i, of whether or not there is an outstanding operation at i, and allows submission of a new operation if not.

```
automaton Env
  signature
    input
      OK(i: I),
      reportBalance(n: Int, i: I)
    output
      requestDeposit(n: Int, i: I) where n > 0,
      requestWithdrawal(n: Int, i: I) where n > 0,
      requestBalance(i: I)

states
    active: Array[I, Bool] := constant(false)

transitions
    input OK(i)
      eff active[i] := false input reportBalance(n, i)
      eff active[i] := false output requestDeposit(n, i)
      pre ¬active[i]
      eff active[i] := true output requestWithdrawal(n, i)
      pre ¬active[i]
      eff active[i] := true output requestBalance(i)
      pre ¬active[i]
      eff active[i] := true
```

The outputs of Env are requests to perform deposit and withdrawal operations and balance queries. In each case, the action indicates a "location" i, and in the case of a deposit or withdrawal, the action also indicates the amount being deposited or withdrawn. The inputs of Env are of the form OK(i), which is a response to a deposit or withdrawal request at location i, and reportBalance(n,i), which indicates that the balance for a balance query at location i is n.

The only state information is a flag active[i] for each location i, indicating whether or not there is an active request at location i. The rest of the program consists of a collection of TDs. An input at location i sets active[i] to false. An output is allowed to occur at location i provided that active[i] = false, and its effect is to set active[i] to true.

B.3 Specification Automaton $A$

In bank specification A, deposits and withdrawals are simply recorded, as elements of data type OpRec. A balance request is allowed to return the result of any subset of the invoked deposits and withdrawals, provided that that subset contains all the operations originating at the location at which the balance query is submitted. We do not require that the result of a balance request reflect all completed deposit and withdrawal operations—only those that originated at the same location.

The signature of A is a "mirror image" of that of Env—its inputs are the same as Env's outputs and vice versa. A also has a single internal action doBalance, which represents the calculation of the balance for a balance query.

The state of A includes four kinds of state variables. The variable ops is used to hold the records of all the deposit and withdrawal operations that have ever been requested, in OpRec form. That is, the amount, location, sequence number, and a Boolean flag indicating whether or not the operation has had its result reported back to the environment, are all recorded. The variable bals is used to keep track of any current balance requests, in BalRec form. That is, the location and the amount to be returned by the query (null if that amount is not yet determined), are recorded. For each i, the variable lastSeqno[i] is used to remember the last sequence number that has been assigned to any operation request at location i. Finally, chosenOps is a temporary variable used in one of the TDs.

The TDs operate as follows. First, a requestDeposit causes a new sequence number to be generated and associated with the newly-requested deposit operation. The combination of the location at which the operation is submitted and the sequence number serves as an identifier for the operation. The requested deposit amount, the location and sequence number, and the value false indicating that no response for this operation has yet been made to the environment, are all recorded in ops. A requestWithdrawal causes similar effects, only this time, the amount recorded is negative. A requestBalance causes a record to be made of the balance query, in bals.

OK(i) is allowed to occur anytime when there is an active deposit or withdrawal operation with location i; its effect is to set the reported flag for the operation to true. This action uses a "choose parameter" x, which is used to pick out a particular operation record x from the set ops. This is a form of nondeterminism; it allows selection of an arbitrary x having the properties given in the precondition.

doBalance(i) is allowed to occur whenever there is an active balance query at location i. Its effect is to choose any set of operations that includes (at least) all those previously performed at location i, and then to calculate the balance by summing up the amounts in all the chosen operations. The newly-calculated value is stored in a balance query record, in bals. A nondeterministic "choose statement" is used here, in selecting the set of operations.

Finally, reportBalance just reports any calculated, unreported balance query result to the environment.

```
automaton A
  signature
    input
      requestDeposit(n: Int, i: I) where n > 0,
      requestWithdrawal(n: Int, i: I) where n > 0,
      requestBalance(i: I)
    output
      OK(i: I),
      reportBalance(n: Int, i: I)
    internal
      doBalance(i: I)

states
    ops: Set[OpRec] := {},
    bals: Set[BalRec] := {},
    lastSeqno: Array[I, Nat] := constant(0),
    chosenOps: Set[OpRec]
```

```
transitions
  input requestDeposit(n, i)
    eff lastSeqno[i] := lastSeqno[i] + 1;
        ops := insert([n, i, pos(lastSeqno[i]), false], ops)

input requestWithdrawal(n, i)
    eff lastSeqno[i] := lastSeqno[i] + 1;
        ops := insert([-n, i, pos(lastSeqno[i]), false], ops)

input requestBalance(i)
    eff bals := insert([i, null], bals)

output OK(i)
    choose x: OpRec
    pre x ∈ ops ∧ x.location = i ∧ ¬x.reported
    eff ops := insert(set_reported(x, true), delete(x, ops))

internal doBalance(i)
    pre [i, null] ∈ bals
    eff chosenOps := choose c where ∀ y: OpRec (y.location = i ⇒ y ∈ c)
                                    ∧ c ⊆ ops;
        bals := insert([i, define(totalAmount(chosenOps))],
                       delete([i, null], bals))

output reportBalance(n, i)
    pre [i, define(n)] ∈ bals
    eff bals := delete([i, define(n)], bals)
```

The code should be mostly self-explanatory. The operation pos in the requestDeposit and requestWithdrawal TDs represents a conversion of a natural number (an element of type Nat) so that it can be regarded as a positive natural number (an element of type Pos). Likewise, define converts an element of a type T to an element of type null[T]. totalAmount is a function that extracts and totals the amounts in a set of operation records.

We are interested in the system AEnv, which is the parallel composition of the automata A and Env. This is written using the IOA language as:

automaton AEnv
  compose A; Env

The user can state invariants of the composition AEnv, for example:

invariant of AEnv:
```
∀ x: OpRec ∀ y: OpRec (x ∈ A.ops ∧ y ∈ A.ops ⇒
    (x.location = y.location ∧ x.seqno = y.seqno ⇒ x = y)
  ∧ ∀ i: I (nat(x.seqno) ≤ A.lastSeqno[i])
  ∧ ∀ k: Pos (k ≤ x.seqno ⇒ ∃ z: OpRec (z ∈ A.ops ∧ z.seqno = k))
  ∧ (¬x.reported ⇒ Env.active[x.location])
  ∧ (∀ i: I ¬Env.active[i] ⇒ bals = {}))
```

For example, invariant 1 (counting down the list) says that the location and sequence number together identify an operation in ops uniquely. Invariant 2 implies that the variable lastSeqno[i] is greater than or equal to all sequence numbers that have ever been assigned to operations originating at location i. Invariant 3 implies that the sequence numbers assigned to operations submitted at location i form a prefix of the positive integers. Invariants 4 and 5 say that the environment's active[i] flag correctly indicates when an operation or balance query is active. Note that the names of some of the state variables in these invariants are prefaced with A or Env, indicating the component of the composition AEnv to which they belong.

The user can use the composer tool to produce IOA code for the composition AEnv. He can use the theorem prover to prove the given invariants, and the simulator or model checker to check the invariants in certain executions or in restricted cases of the system.

B.4 Intermediate Automaton $B$

Automaton B is very much like A; the only difference is that now we ensure that a balance query includes the results of all the deposits and withdrawals that completed anywhere before the balance query started. We do this by adding, for each i, a special variable mustInclude[i], which simply records the operations that must be included in a balance query at i. The doBalance(i) action is also modified, so that the set of operations it chooses includes all those in mustInclude[i].

```
automaton B
  signature
    As for A.
  states
    As for A, plus:
    mustInclude: Array[I, Set[OpRec]] := constant({})
  transitions
    As for A, except:

input requestBalance(i)
      eff bals := insert([i, null], bals);
          mustInclude[i] := choose s where
              ∀ x: OpRec (x ∈ s ⇔ x ∈ ops ∧ x.reported)

internal doBalance(i)
      pre [i, null] ∈ bals
      eff chosenOps := choose c where ∀ y: OpRec (y.location = i ⇒ y ∈ c)
                                     ∧ mustInclude[i] ⊆ c
                                     ∧ c ⊆ ops;
          bals := insert([i, define(totalAmount(chosenOps))],
                         delete([i, null], bals))
```

Here, the "As for A" statements are not part of the IOA language, but must be filled in.

```
automaton BEnv
  compose B; Env
```

It should be easy to see that the composed system BEnv implements AEnv in the sense that every trace of BEnv is also a trace of AEnv. This can be shown using a trivial forward simulation relation from BEnv to AEnv—the identity relation for the state variables of AEnv. This is expressed in IOA by:

```
forward simulation from BEnv to AEnv:
      AEnv.Env.active = BEnv.Env.active
  ∧ AEnv.A.ops = BEnv.B.ops
  ∧ AEnv.A.bals = BEnv.B.bals
  ∧ AEnv.A.lastSeqno = BEnv.B.lastSeqno
  ∧ AEnv.A.chosenOps = BEnv.B.chosenOps
```

This series of equations equates all the correspondingly-named state variables of the two automata AEnv and BEnv. Note the naming convention for the variables: each variable is prefaced by a sequence of names that designate the automata of which it is a part. In this case, this sequence begins by indicating whether the variable is part of AEnv or BEnv. In either case, since the designated automaton is a composition, the sequence continues by saying which component of the composition (the main automaton or Env) the variable belongs to. In any case where there is no ambiguity of variable names, some of the automaton names in the sequence may be suppressed. For example, here, we may write simply AEnv.ops or A.ops in place of the complete name AEnv.A.ops.

The user can use the theorem prover to show that the relation $R$ given just above is a forward simulation from BEnv to AEnv. Informally speaking, it is easy to see that initial states are $R$-related, and that steps correspond as needed. The only significant difference is that the choice of a set of operations (in doBalance) is more restrictive in BEnv than in AEnv; the definition of a forward simulation allows for such restrictions.

In order to guide the theorem prover in proving this theorem, the user of the IOA system needs to specify, for each step of BEnv, the corresponding execution fragment of AEnv. The most interesting cases are the doBalance(i) case, because of its use of a choose expression that makes a nondeterministic choice, and the OK(i) case, because of its use of a choose parameter.

First, suppose the user is given the step (sB, doBalance(i), sB') of BEnv, and a state sA of AEnv such that (sB,sA) $\in$ R. Then the user specifies that the sequence of actions of AEnv that will appear in the corresponding execution fragment is the single-action sequence doBalance(i). The state sA' that results from the execution of this action from state sA can then be determined by the system, once the user says how to resolve the nondeterministic choice in the choose statement in doBalance(i) in AEnv. The value that the user supplies for this nondeterministic choice is the same as the value that is chosen in the choose statement in BEnv. In this case, this value is recorded in the program variable sB'.chosenOps.

Second, suppose the user is given the step (sB, OK(i), sB') of BEnv, and a state sA of AEnv such that (sB,sA) $\in$ R. Then the user specifies that the sequence of actions of AEnv is the single-action sequence OK(i). Now the user needs to resolve the nondeterminism represented by the choose parameter x. The value that the user supplies for this choice is the same as the value that is chosen for the corresponding choose parameter in BEnv. In this case, this value is a designated x in ops that satisfies the precondition of OK(i) in BEnv.

Once the user has defined the execution fragment, he can use the theorem prover to verify the correspondence (i.e., to verify that the specified action and states do indeed form an execution fragment of AEnv, and that the final state is R-related to sB'). The user can also use the simulator to check whether $R$ appears to be a forward simulation relation, by carrying out a paired simulation.

B.5 Implementation $C$

Now we move to a distributed algorithm, consisting of an automaton C(i) for each i in I, plus a reliable FIFO send/receive communication channel channel(i,j) for each pair of distinct indices, i and j, in I. The state of channel(i,j) consists of one variable queue, which holds a sequence of messages.

```
automaton channel(i, j: I, M: type)
  signature
    input send(m: M, const i, const j)
    output receive(m: M, const i, const j)
  states
    queue: Seq[M] := {}
```

```
transitions
  input send(m, i, j)
    eff queue := queue ⊢ m output receive(m, i, j)
    pre queue ≠ {} ∧ m = head(queue)
    eff queue := tail(queue)
```

C(i) works locally to process deposits and withdrawals. However, a balance query triggers explicit messages to all other nodes. The responses to these messages are used to assemble the information to be returned by the balance query.

In the code below, ops is maintained in OpRec1 form, and the reported information is kept in a separate variable reports. We separate this information because the reported information need not be sent in messages. Also, balance information is never sent, it is recorded locally, in BalRec1 form. The Boolean flag reqSent[j] is used to keep track of whether a req message has been sent to j, and the Boolean flag respRcvd[j] is used to keep track of whether a response has been received. The flag reqRcvd[j] is used to record that a request has just been received from j and is waiting to be answered. Since two kinds of messages are sent in this algorithm, we define a new message type which is the union of the two individual types.

```
type Msg = union of set: Set[OpRec1], req: String automaton C(i: I)
  signature
    input
      requestDeposit(n: Int, const i) where n > 0,
      requestWithdrawal(n: Int, const i) where n > 0,
      requestBalance(const i),
      receive(m: Msg, j: I, const i) where j ≠ i
    output
      OK(const i),
      reportBalance(n: Int, const i),
      send(m: Msg, const i, j: I) where j ≠ i
    internal
      doBalance(const i)

states
    ops: Set[OpRec1] := {},
    reports: Set[Pos] := {},
    bals: Set[BalRec1] := {},
    lastSeqno: Nat := 0,
    reqSent: Array[I, Bool] := constant(false),
    respRcvd: Array[I, Bool] := constant(false),
    reqRcvd: Array[I, Bool] := constant(false)

transitions
    input requestDeposit(n, i)
      eff lastSeqno := lastSeqno + 1;
          ops := insert([n, i, pos(lastSeqno)], ops)

input requestWithdrawal(n, i)
      eff lastSeqno := lastSeqno + 1;
          ops := insert([-n, i, pos(lastSeqno)], ops)

output OK(i)
```

```
    choose x: OpRec1
      pre x ∈ ops ∧ x.location = i ∧ ¬((x.seqno) ∈ reports)
      eff reports := insert(x.seqno, reports)
  input requestBalance(i)
    eff bals := insert([null], bals);
        reqSent := constant(false);
        reqRcvd := constant(false)
  internal doBalance(i)
    pre [null] ∈ bals ∧ ∀ j: I (j ≠ i ⇒ respRcvd[j])
    eff bals := insert([define(totalAmount(ops))],
                       delete([null], bals))
  output reportBalance(n, i)
    pre [define(n)] ∈ bals
    eff bals := delete([define(n)], bals)
  output send(set(m), i, j)
    pre m = ops ∧ reqRcvd[j]
    eff reqRcvd[j] := false
  output send(req(x), i, j)
    pre ¬reqSent[j] ∧ [null] ∈ bals
    eff reqSent[j] := true
  input receive(set(m), j, i)
    eff ops := ops ∪ m;
        respRcvd[j] := true
  input receive(req(x), j, i)
    eff reqRcvd[j] := true
```

We define C1 to be the composition of all the C(i) and all the channels, with the communication actions hidden:

automaton C1
  compose
    C(i) for i: I;
    channel(i, j, type Set[OpRec1]) for i: I, j: I where i ≠ j
  hide send(m, i, j), receive(m, i, j) for m: Set[OpRec1], i: I, j: I automaton CEnv
  compose C1; Env

We would like to show that CEnv implements BEnv. The most obvious thing to try is a forward simulation relation from CEnv to BEnv; however, it turns out that in this case, it is convenient to add "history variables" mustInclude[i], i \in I to the composed automaton CEnv before defining the simulation relation. The name mustInclude[i] is suggestive of the same-named variables in BEnv; there is a slight difference in that here mustInclude[i] is a subset of OpRec1 rather than of OpRec. These history variables are maintained by means of the following modification to the transitions of the composition CEnv:

```
requestBalance(i)
  eff
    ...
    mustInclude[i] := union(j ∈ I) C(j).reports
```

Let CEnv' denote the result of augmenting the composition CEnv with these history variables. We can give some invariants involving the new history variables, for example:

invariant of CEnv':
```
∀ i: I ∀ j: I ∀ x: OpRec1
   (null ∈ C(i).bals ∧ x ∈ mustInclude[i] ∧ x.location = j ∧ j ≠ i ⇒
       x ∈ C1.C(j).ops
    ∧ (∀ m: Set[OpRec1] (m ∈ C1.channel(j, i, type Set[OpRec1]).queue ⇒ x ∈ m))
    ∧ (C1.C(i).respRcvd[j] ⇒ x ∈ C1.C(i).ops))
```

This says that, if there is an active balance query at location i, and if operation x, originating at another location j, is one of those that must be included in the query, then x must appear in certain places in the state. In particular, x must be at location j, must be in any response message in transit from j to i, and, in case i has received a message from j, must be at location i. Now we can define a forward simulation relation from CEnv' to BEnv:

forward simulation from CEnv' to BEnv:
```
    BEnv.Env.active = CEnv'.Env.active
 ∧ ∀ x: OpRec
    (x ∈ BEnv.B.ops ⇔
        (proj(x) ∈ CEnv'.C1.C(x.location).ops
      ∧ (x.reported ⇔ x.seqno ∈ CEnv'.C1.C(x.location).reports)))
 ∧ ∀ x: BalRec
    (x ∈ BEnv.B.bals ⇔ x.value ∈ CEnv'.C1.C(x.location).bals)
 ∧ ∀ i: I
    (BEnv.B.lastSeqno[i] = CEnv'.C1.C(i).lastSeqno)
 ∧ ∀ i: I ∀ x: OpRec
    (x ∈ BEnv.B.mustInclude[i] ⇔
        (proj(x) ∈ CEnv'.mustInclude[i] ∧ x.reported)
```

The user can use the theorem prover to show that this relation is a forward simulation from CEnv' to BEnv. The interesting case in this proof is the doBalance(i) action. When this action is performed in BEnv, a set of operations is selected, including all those in B.mustInclude[i], which represents the deposit and withdrawal operations completed before the balance is requested. The third conclusion of the invariant of CEnv' implies that the choice that is made for this action in CEnv' includes CEnv'.mustInclude[i], which implies that the relation is preserved.

This theorem implies that CEnv' implements BEnv. But it is also easy to see that CEnv implements CEnv', so it follows that CEnv implements BEnv, as we wanted to show.

Again, the user can check the correspondence before trying to prove it, using a paired simulation. Also, the user can use the IOA system to generate real distributed code for CEnv.

What is claimed is:

1. A method for developing a software implementation of a distributed system, comprising:
   accepting a design specification for the distributed system, including
      accepting specifications of a plurality of interacting asynchronous state machines, wherein at least some of the state machines exhibit non-deterministic behavior, and
      accepting a specification of desired properties of the distributed system, including accepting a logical property that is desired to be satisfied in any state of the state machines that can be reached during execution of the distributed system;
   applying a validation procedure to the design specification to verify that the distributed system has the desired properties, including
      applying a theorem proving procedure to the design specification, including proving that the logical property is satisfied; and
   applying a code generating procedure to the specifications of one or more of the state machines to generate software implementations for components of the distributed system.

2. The method of claim 1 wherein the plurality of state machines includes a plurality of node state machines and a channel state machine, and applying the code generating procedure to the specifications of the state machines includes, for each of the node state machines, applying a translation procedure to the specification of the node state machine to generate a software implementation of that node state machine.

3. The method of claim 1 wherein each of the specifications of the state machines includes:
   a specification of a plurality of state variables, wherein values of the state variables determine the state of the state machine; and
   a specification of a plurality of state transitions, each specification of a state transition including
      a specification of values of the state variables in a state in which the transition can be taken, and
      a specification of an effect on the values of the state variables when that transition is taken.

4. The method of claim 3 wherein the specification of the effect on the values of the state variables includes an instruction to set one of the state variables to a non-deterministic choice of values.

5. The method of claim 4 wherein the specification of the effect on the values of the state variables includes a logical constraint on the values of the state variables resulting from taking the transition.

6. The method of claim 1 wherein applying the theorem proving procedure to the design specification includes:
   automatically translating the design specification into a logical language of a theorem prover; and
   providing the translated design specification to a theorem prover.

7. The method of claim 6 wherein the theorem prover is an equational theorem prover, and each of the specifications of the state machines includes a specification of a plurality of state variables, each state variable having a data type, and values of the state variables determine the state of the state machine, wherein
   applying the theorem prover includes accepting axiomatic definitions of the data types of the state variables.

8. The method of claim 1 wherein applying the validation procedure further includes applying a simulation procedure to one of the plurality of state machines, including determining a sequence of states of the state machine, and verifying that the logical property is satisfied in each of the sequence of states.

9. The method of claim 1 wherein applying the validation procedure further includes applying a model checking procedure to one of the plurality of state machines, including enumerating the states of the state machine, and verifying that the logical property is satisfied in each of the enumerated states.

10. The method of claim 1 wherein accepting specification of a plurality of interacting asynchronous state machines includes accepting a specification of an infinite-state state machine.

11. A method for developing a software implementation of a distributed system, comprising:
    accepting a first design specification for the distributed system, including
       accepting specifications of a first plurality of state machines, and
       accepting a specification of desired properties of the first plurality of state machines;
    applying a validation procedure to the first design specification to verify that the first plurality of state machines has the desired properties, including
       applying a theorem proving procedure to the first design specification,
       determining a second design specification from the accepted design specification, wherein the second design specification has a property that the first design specification does not have, and
       applying a second validation procedure to the second design specification; and
    applying a code generating procedure to the specifications of one or more of the first plurality of state machines to generate software implementations for components of the distributed system.

12. The method of claim 11 wherein the property of the second design specification is deterministic behavior.

13. The method of claim 11 wherein the property of the second design specification is specification using a single state machine.

14. The method of claim 13 wherein determining the second design specification includes deriving a composition of the plurality of state machines including matching corresponding transitions of said state machines.

15. The method of claim 11 wherein accepting specifications of a plurality of state machines includes accepting a specification of an infinite-state state machine.

16. The method of claim 11 wherein determining the second design specification includes applying an automated procedure to the specifications of the plurality of state machines to produce the second design specification.

17. The method of claim 11 wherein determining the second design specification includes accepting the second design specification from a user.

18. The method of claim 11 further comprising accepting a software implementation of one of the plurality of state machines wherein the software implementation was determined prior to accepting the design specification for the distributed system.

19. A method for developing a software implementation of a distributed system, comprising:
    accepting a first design specification including
       accepting specifications of a first plurality of state machines, and
       accepting a specification of a first plurality of desired properties of the first plurality of state machines;

applying a first validation procedure to the first design specification to verify that the first plurality of state machines has the first desired properties, including
applying a theorem proving procedure to the first design specification; accepting a second design specification, including
accepting specifications of a second plurality of state machines, and
accepting a specification of a desired relationship between the first plurality of state machines and the second plurality of state machines;
applying a second validation procedure to the second design specification to verify that the first plurality of state machines and the second plurality of state machines have the desired relationship; and
for one or more of the second plurality of state machines, applying a code generating procedure to the specification of the state machine to generate a software implementation of that state machine.

20. The method of claim 19 further comprising:
refining the first design specification to yield the second design specification.

21. The method of claim 20 wherein refining the first design specification includes expressing the specification of the second plurality of state machines using a restricted sublanguage of the language used to express the specification of the first plurality of state machines.

22. The method of claim 21 wherein the specification of the first plurality of state machines includes a specification of non-deterministic behavior of the state machines, and the restricted sublanguage does not permit specification of non-deterministic behavior.

23. The method of claim 19 wherein accepting a specification of a desired relationship between the first plurality of state machines and the second plurality of state machines includes:
accepting a desired relationship between a first one of the first plurality of state machines and a second one of the second plurality of state machines, including
accepting an association of the states of the first state machine and states of the second state machine, and
accepting an association of state transitions of the first state machine and sequences of one or more state transitions of the second state machine.

24. The method of claim 19 further comprising accepting a software implementation of one of the second plurality of state machines wherein the software implementation was determined prior to accepting the design specification for the distributed system.

25. The method of claim 19 further comprising implementing one of the second plurality of state machines using a communication channel.

26. The method of claim 19 further comprising applying a third validation procedure to the second design specification to verify that the second plurality of state machines has second desired properties.

27. Software stored on a computer readable medium comprising instructions for causing a computer to perform the functions of:
accepting a design specification for a distributed system, including
accepting specifications of a plurality of interacting asynchronous state machines, wherein at least some of the state machines exhibit non-deterministic behavior, and
accepting a specification of desired properties of the distributed system, including accepting a logical property that is desired to be satisfied in any state of the state machines that can be reached during execution of the distributed system;
applying a validation procedure to the design specification to verify that the distributed system has the desired property, including applying a theorem proving procedure to the design specification; and
applying a code generating procedure to the specifications of the state machines to generate a plurality of software implementations for distributed components of the distributed system.

28. Software stored on a computer readable medium comprising instructions for causing a computer to perform the functions of:
accepting a first design specification for a distributed system, including
accepting specifications of a first plurality of state machines, and
accepting a specification of a first plurality of desired properties of the first plurality of state machines;
applying a first validation procedure to the first design specification to verify that the first plurality of state machines has the first desired properties, including applying a theorem proving procedure to the first design specification;
accepting a second design specification, including
accepting specifications of a second plurality of state machines, and
accepting a specification of a desired relationship between the first plurality of state machines and the second plurality of state machines;
applying a second validation procedure to the second design specification to verify that the first plurality of state machines and the second plurality of state machines have the desired relationship; and
for one or more of the second plurality of state machines, applying a code generating procedure to the specification of the state machine to generate a software implementation of that state machine.

29. A system for iterative development of a software implementation of a distributed system, comprising:
a means for accepting a first design specification for the distributed system, wherein the first design specification includes specifications of a first plurality of state machines, and includes a specification of desired properties of the plurality of first state machines;
a means for verifying that the first state machines have the desired properties;
a means for accepting a second design specification, wherein the second design specification includes specifications of a second plurality of state machines, and includes a specification of a desired relationship between the first plurality of state machines and the second plurality of state machines;
a means for verifying that the first plurality of state machines and the second plurality of state machines have the desired relationship;
a code generator for producing a plurality of software implementations of components of the distributed system from the specifications of the second plurality of state machines.

* * * * *

UNITED STATES PATENT AND TRADEMARK OFFICE
CERTIFICATE OF CORRECTION

| | | |
|---|---|---|
| PATENT NO. | : 6,289,502 B1 | Page 1 of 1 |
| DATED | : September 11, 2001 | |
| INVENTOR(S) | : Stephen J. Garland and Nancy A. Lynch | |

It is certified that error appears in the above-identified patent and that said Letters Patent is hereby corrected as shown below:

<u>Title page,</u>
Item [56], References Cited, OTHER PUBLICATIONS, please add the following reference:
-- Giegerich, On the Structure of Verifiable Code Generator Specifications, SIGPLAN Notices, Vol. 25, No. 6, ABSTRACT, 6/1990 --.

Signed and Sealed this

Fifth Day of November, 2002

Attest:

Attesting Officer

JAMES E. ROGAN
*Director of the United States Patent and Trademark Office*